US011826214B2

(12) United States Patent
Luettgen et al.

(10) Patent No.: US 11,826,214 B2
(45) Date of Patent: Nov. 28, 2023

(54) ORAL IRRIGATOR

(71) Applicant: WATER PIK, INC., Fort Collins, CO (US)

(72) Inventors: Harold A Luettgen, Windsor, CO (US); Oscar Senff, Broomfield, CO (US); Brian Woodard, Fort Collins, CO (US); Blaine Hanson, Fort Collins, CO (US); Jonathan Huber, Longmont, CO (US)

(73) Assignee: WATER PIK, INC., Fort Collins, CO (US)

( * ) Notice: Subject to any disclaimer, the term of this patent is extended or adjusted under 35 U.S.C. 154(b) by 632 days.

(21) Appl. No.: 16/877,081

(22) Filed: May 18, 2020

(65) Prior Publication Data

US 2020/0276003 A1 Sep. 3, 2020

Related U.S. Application Data

(63) Continuation of application No. 14/956,017, filed on Dec. 1, 2015, now abandoned.
(Continued)

(51) Int. Cl.
*A61C 17/02* (2006.01)
*F04B 17/03* (2006.01)
(Continued)

(52) U.S. Cl.
CPC .......... *A61C 17/0202* (2013.01); *F04B 17/03* (2013.01); *F04B 19/22* (2013.01);
(Continued)

(58) Field of Classification Search
CPC ..... A61C 17/0202; A61C 17/02; A61C 17/16; A61C 17/028; A61C 17/26; A61C 17/34;
(Continued)

(56) References Cited

U.S. PATENT DOCUMENTS 555,588 A 3/1896 Spencer
1,278,225 A 9/1918 Schamberg
(Continued)

FOREIGN PATENT DOCUMENTS

CA 851479 9/1970
CH 655237 4/1986
(Continued)

OTHER PUBLICATIONS

US RE27,274 E, 01/1972, Mattingly (withdrawn)
(Continued)

*Primary Examiner* — Cris L. Rodriguez
*Assistant Examiner* — Drew S Folgmann
(74) *Attorney, Agent, or Firm* — Dorsey & Whitney LLP

(57) ABSTRACT

In one embodiment, an oral irrigator including a reservoir, a tip fluidly connected to the reservoir, a motor having a drive shaft, and a pump. The pump includes a pump body including a pump inlet fluidly connected to the reservoir and a pump outlet fluidly connected to the tip, a spiral pinion gear including a plurality of pinion gear teeth that curve along their length, and a spiral driven gear including a plurality of driven gear teeth that mesh with the pinion gear teeth. The pump also may include a connecting rod eccentrically connected to the driven gear and a piston and received within the pump body. Movement of the drive shaft causes the pinion gear to rotate, causing the driven gear to rotate, translating the connecting rod and moving the piston laterally within the pump body to pull fluid from the reservoir and push the fluid to the tip.

18 Claims, 34 Drawing Sheets

Related U.S. Application Data

(60) Provisional application No. 62/132,319, filed on Mar. 12, 2015, provisional application No. 62/086,051, filed on Dec. 1, 2014.

(51) Int. Cl.
  *F04B 19/22* (2006.01)
  *F04B 23/02* (2006.01)
  *F04B 53/14* (2006.01)
  *F04B 53/16* (2006.01)
  *A61C 17/028* (2006.01)

(52) U.S. Cl.
  CPC .............. *F04B 23/02* (2013.01); *F04B 53/14* (2013.01); *F04B 53/16* (2013.01); *A61C 17/028* (2013.01)

(58) Field of Classification Search
  CPC ..... A61C 17/36; A61C 17/38; A61C 17/0217; F04B 17/03; F04B 19/22; F04B 23/02; F04B 53/14; F04B 53/16
  USPC ................................................... 92/98 R, 99
  See application file for complete search history.

(56) References Cited

U.S. PATENT DOCUMENTS

| | | |
|---|---|---|
| 1,452,258 A | 4/1923 | Smith |
| 1,464,419 A | 8/1923 | Gill |
| 1,480,310 A | 1/1924 | Smith |
| 1,498,267 A | 6/1924 | Hachman |
| 1,602,742 A | 10/1926 | Bennet |
| 1,650,686 A | 11/1927 | Binks |
| 1,669,889 A | 5/1928 | Andrews et al. |
| 1,681,320 A | 8/1928 | Bergl et al. |
| 1,933,454 A | 10/1933 | Sidney |
| 1,940,111 A | 12/1933 | Austin |
| D93,019 S | 8/1934 | Hose |
| 1,977,782 A | 10/1934 | Roy |
| 2,107,686 A | 2/1938 | Bramsen et al. |
| 2,421,498 A | 6/1947 | Guedel |
| D159,872 S | 8/1950 | Skold |
| 2,531,730 A | 11/1950 | Henderson |
| 2,595,666 A | 5/1952 | Hutson |
| 2,669,233 A | 2/1954 | Friend |
| 2,709,227 A | 5/1955 | Foley et al. |
| 2,733,713 A | 2/1956 | Kabnick |
| 2,783,919 A | 3/1957 | Ansell |
| 2,794,437 A | 6/1957 | Tash |
| 2,870,932 A | 1/1959 | Davis |
| 2,984,452 A | 5/1961 | Hooper |
| 3,089,490 A | 5/1963 | Goldberg |
| 3,096,913 A | 7/1963 | Jousson |
| 3,144,867 A | 8/1964 | Trupp et al. |
| D202,041 S | 8/1965 | Burzlaff |
| 3,200,320 A | 8/1965 | Mallory |
| 3,209,956 A | 10/1965 | MCKenzie |
| 3,216,619 A | 11/1965 | Richards et al. |
| 3,225,759 A | 12/1965 | Drapen et al. |
| 3,227,158 A | 1/1966 | Mattingly |
| 3,266,623 A | 8/1966 | Poferl |
| 3,297,558 A | 1/1967 | Hillquist |
| D208,778 S | 10/1967 | Koch |
| D209,202 S | 11/1967 | Fulton et al. |
| D209,203 S | 11/1967 | Mattingly et al. |
| D209,204 S | 11/1967 | St. Clair et al. |
| D209,395 S | 11/1967 | Gilbert |
| D210,018 S | 1/1968 | Mattingly et al. |
| D210,019 S | 1/1968 | Johnson et al. |
| 3,370,214 A | 2/1968 | Aymar |
| 3,391,696 A | 7/1968 | Woodward |
| 3,393,673 A | 7/1968 | Mattingly et al. |
| 3,400,999 A | 9/1968 | Goldstein |
| 3,418,552 A | 12/1968 | Holmes |
| 3,420,228 A | 1/1969 | Kalbfeld |
| 3,425,410 A | 2/1969 | Cammack |
| 3,453,969 A | 7/1969 | Mattingly |
| 3,465,751 A | 9/1969 | Powers |
| 3,467,083 A | 9/1969 | Mattingly |
| 3,467,286 A | 9/1969 | Ostrowsky |
| D215,920 S | 11/1969 | McCarty et al. |
| 3,487,828 A | 1/1970 | Troy |
| 3,489,268 A | 1/1970 | Meierhoefer |
| 3,495,587 A | 2/1970 | Freedman |
| 3,496,933 A | 2/1970 | Lloyd |
| 3,499,440 A | 3/1970 | Gibbs |
| 3,500,824 A | 3/1970 | Gilbert |
| 3,501,203 A | 3/1970 | Falk |
| 3,502,072 A | 3/1970 | Stillman |
| 3,517,669 A | 6/1970 | Buono et al. |
| D218,270 S | 8/1970 | Soper |
| 3,522,801 A | 8/1970 | Robinson |
| 3,532,221 A | 10/1970 | Kaluhiokalani et al. |
| 3,536,065 A | 10/1970 | Moret |
| 3,537,444 A | 11/1970 | Garn |
| 3,538,950 A | 11/1970 | Porteners |
| 3,547,110 A | 12/1970 | Balamuth |
| 3,561,433 A | 2/1971 | Kovach |
| D220,334 S | 3/1971 | Mackay et al. |
| 3,570,525 A | 3/1971 | Borsum |
| 3,572,375 A | 3/1971 | Rosenberg |
| 3,578,884 A | 5/1971 | Jacobson |
| D220,996 S | 6/1971 | Irons |
| 3,583,609 A | 6/1971 | Oppenheimer |
| 3,590,813 A | 7/1971 | Roszyk |
| 3,608,548 A | 9/1971 | Lewis |
| 3,612,045 A | 10/1971 | Dudas |
| D222,862 S | 1/1972 | Cook |
| 3,636,947 A | 1/1972 | Balamuth |
| 3,651,576 A | 3/1972 | Massa |
| 3,669,101 A | 6/1972 | Kleiner |
| 3,703,170 A | 11/1972 | Ryckman, Jr. |
| 3,718,974 A | 3/1973 | Buchtel et al. |
| 3,747,595 A | 7/1973 | Grossan |
| 3,768,472 A | 10/1973 | Hodosh et al. |
| 3,771,186 A | 11/1973 | Moret et al. |
| 3,783,364 A | 1/1974 | Gallanis et al. |
| 3,809,506 A | 5/1974 | Malcosky |
| 3,809,977 A | 5/1974 | Balamuth et al. |
| 3,811,432 A | 5/1974 | Moret |
| 3,820,532 A | 6/1974 | Eberhardt et al. |
| 3,827,147 A | 8/1974 | Condon |
| 3,840,795 A | 10/1974 | Roszyk et al. |
| 3,847,145 A | 11/1974 | Grossan |
| 3,854,209 A | 12/1974 | Franklin et al. |
| 3,863,628 A | 2/1975 | Vit |
| 3,871,560 A | 3/1975 | Crippa |
| 3,874,506 A | 4/1975 | Hill et al. |
| 3,911,796 A | 10/1975 | Hull |
| 3,912,125 A | 10/1975 | Acklin |
| 3,943,628 A | 3/1976 | Kronman et al. |
| 3,973,558 A | 8/1976 | Stouffer et al. |
| 3,977,084 A | 8/1976 | Sloan |
| 4,001,526 A | 1/1977 | Olson |
| 4,004,302 A | 1/1977 | Hori |
| 4,007,739 A | 2/1977 | Bron et al. |
| 4,013,227 A | 3/1977 | Herrera |
| 4,022,114 A | 5/1977 | Hansen, III |
| 4,052,002 A | 10/1977 | Stouffer et al. |
| D246,667 S | 12/1977 | Mackay et al. |
| D246,668 S | 12/1977 | Mackay et al. |
| 4,060,870 A | 12/1977 | Cannarella |
| 4,075,761 A | 2/1978 | Behne et al. |
| 4,078,558 A | 3/1978 | Woog et al. |
| 4,089,079 A | 5/1978 | Nicholson |
| 4,094,311 A | 6/1978 | Hudson |
| 4,108,167 A | 8/1978 | Hickman et al. |
| 4,108,178 A | 8/1978 | Betush |
| 4,109,650 A | 8/1978 | Peclard |
| 4,122,845 A | 10/1978 | Stouffer et al. |
| 4,133,971 A | 1/1979 | Boyd et al. |
| 4,135,501 A | 1/1979 | Leunissan |
| 4,141,352 A | 2/1979 | Ebner et al. |
| 4,144,646 A | 3/1979 | Takemoto et al. |

(56) References Cited

U.S. PATENT DOCUMENTS

| | | |
|---|---|---|
| 4,149,315 A | 4/1979 | Page, Jr. et al. |
| 4,154,375 A | 5/1979 | Bippus |
| 4,160,383 A | 7/1979 | Rauschenberger |
| 4,171,572 A | 10/1979 | Nash |
| 4,182,038 A | 1/1980 | Fleer |
| 4,200,235 A | 4/1980 | Monschke |
| 4,201,200 A | 5/1980 | Hubner |
| 4,210,380 A | 7/1980 | Brzostek |
| 4,215,476 A | 8/1980 | Armstrong |
| 4,219,618 A | 8/1980 | Leonard |
| 4,227,878 A | 10/1980 | Lohn |
| 4,229,634 A | 10/1980 | Hickman et al. |
| 4,236,889 A | 12/1980 | Wright |
| D258,097 S | 2/1981 | Wistrand |
| 4,248,589 A | 2/1981 | Lewis |
| 4,249,899 A | 2/1981 | Davis |
| 4,257,458 A | 3/1981 | Kondo et al. |
| 4,262,799 A | 4/1981 | Perrett |
| 4,266,934 A | 5/1981 | Pernot |
| 4,276,023 A | 6/1981 | Phillips et al. |
| 4,276,880 A | 7/1981 | Malmin |
| 4,302,186 A | 11/1981 | Cammack et al. |
| 4,303,064 A | 12/1981 | Buffa |
| 4,303,070 A | 12/1981 | Ichikawa et al. |
| 4,306,862 A | 12/1981 | Knox |
| 4,315,741 A | 2/1982 | Reichl |
| 4,319,568 A | 3/1982 | Tregoning |
| 4,331,422 A | 5/1982 | Heyman |
| 4,337,040 A | 6/1982 | Cammack et al. |
| 4,340,365 A | 7/1982 | Pisanu |
| 4,340,368 A | 7/1982 | Lococo |
| D266,117 S | 9/1982 | Oberheim |
| 4,353,694 A | 10/1982 | Pelerin |
| 4,363,626 A | 12/1982 | Schmidt et al. |
| 4,365,376 A | 12/1982 | Oda et al. |
| 4,370,131 A | 1/1983 | Banko |
| 4,374,354 A | 2/1983 | Petrovic et al. |
| 4,382,167 A | 5/1983 | Maruyama et al. |
| 4,382,786 A | 5/1983 | Lohn |
| D270,000 S | 8/1983 | Ketler |
| 4,396,011 A | 8/1983 | Mack et al. |
| 4,412,823 A | 11/1983 | Sakai et al. |
| 4,416,628 A | 11/1983 | Cammack |
| 4,442,830 A | 4/1984 | Markau |
| 4,442,831 A | 4/1984 | Trenary |
| 4,452,238 A | 6/1984 | Kerr |
| 4,454,866 A | 6/1984 | Fayen |
| 4,512,769 A | 4/1985 | Kozam et al. |
| 4,517,962 A | 5/1985 | Heckele |
| 4,531,912 A | 7/1985 | Schuss et al. |
| 4,531,913 A | 7/1985 | Taguchi |
| 4,534,340 A | 8/1985 | Kerr et al. |
| 4,552,130 A | 11/1985 | Kinoshita |
| 4,561,214 A | 12/1985 | Inoue |
| D283,374 S | 4/1986 | Cheuk-Yiu |
| 4,585,415 A | 4/1986 | Hommann |
| 4,591,777 A | 5/1986 | McCarty et al. |
| 4,592,728 A | 6/1986 | Davis |
| 4,602,906 A | 7/1986 | Grunenfelder |
| 4,607,627 A | 8/1986 | Leber et al. |
| 4,613,074 A | 9/1986 | Schulze |
| 4,619,009 A | 10/1986 | Rosenstatter |
| 4,619,612 A | 10/1986 | Weber et al. |
| 4,629,425 A | 12/1986 | Detsch |
| 4,636,198 A | 1/1987 | Stade |
| 4,642,037 A | 2/1987 | Fritchman |
| 4,644,937 A | 2/1987 | Hommann |
| 4,645,488 A | 2/1987 | Matukas |
| 4,647,831 A | 3/1987 | O'Malley et al. |
| 4,648,838 A | 3/1987 | Schlachter |
| 4,650,475 A | 3/1987 | Smith et al. |
| 4,655,198 A | 4/1987 | Hommann |
| 4,669,453 A | 6/1987 | Atkinson et al. |
| 4,672,953 A | 6/1987 | DiVito |
| 4,673,396 A | 6/1987 | Urbaniak |
| D291,354 S | 8/1987 | Camens |
| 4,716,352 A | 12/1987 | Hurn et al. |
| 4,749,340 A | 6/1988 | Ikeda et al. |
| 4,770,632 A | 9/1988 | Ryder et al. |
| D298,565 S | 11/1988 | Kohler, Jr. et al. |
| 4,783,321 A | 11/1988 | Spence |
| 4,787,845 A | 11/1988 | Valentine |
| 4,787,847 A | 11/1988 | Martin et al. |
| 4,798,292 A | 1/1989 | Hauze |
| 4,803,974 A | 2/1989 | Powell |
| 4,804,364 A | 2/1989 | Dieras et al. |
| 4,810,148 A | 3/1989 | Aisa et al. |
| 4,818,229 A | 4/1989 | Vasile |
| 4,820,152 A | 4/1989 | Warrin et al. |
| 4,821,923 A | 4/1989 | Skorka |
| 4,824,368 A | 4/1989 | Hickman |
| 4,826,431 A | 5/1989 | Fujimura et al. |
| 4,827,551 A | 5/1989 | Maser et al. |
| 4,832,683 A | 5/1989 | Idemoto et al. |
| 4,854,869 A | 8/1989 | Lawhorn |
| 4,861,340 A | 8/1989 | Smith et al. |
| 4,862,876 A | 9/1989 | Lih-Sheng |
| 4,864,918 A | 9/1989 | Martin |
| 4,869,720 A | 9/1989 | Chernack |
| 4,880,382 A | 11/1989 | Moret et al. |
| 4,886,452 A | 12/1989 | Lohn |
| 4,900,252 A | 2/1990 | Liefke et al. |
| 4,902,225 A | 2/1990 | Lohn |
| 4,903,687 A | 2/1990 | Lih-Sheng |
| 4,906,187 A | 3/1990 | Amadera |
| 4,907,744 A | 3/1990 | Jousson |
| 4,915,304 A | 4/1990 | Campani |
| 4,925,450 A | 5/1990 | Imonti et al. |
| 4,928,675 A | 5/1990 | Thornton |
| 4,930,660 A | 6/1990 | Porteous |
| 4,941,459 A | 7/1990 | Mathur |
| 4,950,159 A | 8/1990 | Hansen |
| 4,958,629 A | 9/1990 | Peace et al. |
| 4,958,751 A | 9/1990 | Curtis et al. |
| 4,959,199 A | 9/1990 | Brewer |
| 4,961,698 A | 10/1990 | Vlock |
| 4,966,551 A | 10/1990 | Betush |
| 4,969,874 A | 11/1990 | Michel et al. |
| 4,973,246 A | 11/1990 | Black |
| 4,973,247 A | 11/1990 | Varnes et al. |
| 4,973,250 A | 11/1990 | Milman |
| 4,975,054 A | 12/1990 | Esrock |
| 4,979,503 A | 12/1990 | Chernack |
| 4,979,504 A | 12/1990 | Mills |
| 4,989,590 A | 2/1991 | Baum et al. |
| 4,998,880 A | 3/1991 | Nerli |
| 5,013,241 A | 5/1991 | Von Gutfeld et al. |
| 5,014,884 A | 5/1991 | Wunsch |
| 5,019,054 A | 5/1991 | Clement et al. |
| 5,027,798 A | 7/1991 | Primiano |
| 5,029,576 A | 7/1991 | Evans, Sr. |
| 5,033,617 A | 7/1991 | Hartwein et al. |
| 5,033,961 A | 7/1991 | Kankler et al. |
| D318,918 S | 8/1991 | Hartwein |
| 5,046,486 A | 9/1991 | Grulke et al. |
| 5,049,071 A | 9/1991 | Davis et al. |
| 5,060,825 A | 10/1991 | Palmer et al. |
| 5,061,180 A | 10/1991 | Wiele |
| 5,062,795 A | 11/1991 | Woog |
| 5,064,168 A | 11/1991 | Raines et al. |
| D322,314 S | 12/1991 | Ohbayashi |
| 5,071,346 A | 12/1991 | Domaas |
| 5,082,115 A | 1/1992 | Hutcheson |
| 5,082,443 A | 1/1992 | Lohn |
| 5,085,317 A | 2/1992 | Jensen et al. |
| 5,086,756 A | 2/1992 | Powell |
| 5,095,893 A | 3/1992 | Rawden, Jr. |
| 5,098,291 A | 3/1992 | Curtis et al. |
| 5,098,676 A | 3/1992 | Brooks, Jr. |
| 5,100,319 A | 3/1992 | Baum |
| 5,117,871 A | 6/1992 | Gardner et al. |
| 5,125,835 A | 6/1992 | Young |
| 5,127,831 A | 7/1992 | Bab |
| 5,142,723 A | 9/1992 | Lustig et al. |

(56) References Cited

U.S. PATENT DOCUMENTS

| | | |
|---|---|---|
| 5,150,841 A | 9/1992 | Silvenis et al. |
| 5,172,810 A | 12/1992 | Brewer |
| 5,173,273 A | 12/1992 | Brewer |
| 5,183,035 A | 2/1993 | Weir |
| 5,197,458 A | 3/1993 | Ito et al. |
| 5,197,460 A | 3/1993 | Ito et al. |
| 5,199,871 A | 4/1993 | Young |
| 5,203,697 A | 4/1993 | Malmin |
| 5,203,769 A | 4/1993 | Clement et al. |
| 5,204,004 A | 4/1993 | Johnston et al. |
| 5,208,933 A | 5/1993 | Lustig et al. |
| 5,215,193 A | 6/1993 | Dennis |
| 5,218,956 A | 6/1993 | Handler et al. |
| 5,220,914 A | 6/1993 | Thompson |
| 5,228,646 A | 7/1993 | Raines |
| 5,230,624 A | 7/1993 | Wolf et al. |
| 5,232,687 A | 8/1993 | Geimer |
| 5,235,968 A | 8/1993 | Woog |
| 5,241,714 A | 9/1993 | Barry |
| 5,246,367 A | 9/1993 | Ito et al. |
| 5,252,064 A | 10/1993 | Baum et al. |
| D341,200 S | 11/1993 | Yoshimoto |
| 5,257,933 A | 11/1993 | Jousson |
| 5,261,448 A | 11/1993 | Furuya et al. |
| D341,943 S | 12/1993 | Si-Hoe |
| 5,267,586 A | 12/1993 | Jankavaara |
| 5,269,684 A | 12/1993 | Fischer |
| 5,281,137 A | 1/1994 | Jousson |
| 5,281,139 A | 1/1994 | Frank et al. |
| 5,282,745 A | 2/1994 | Wiltrout et al. |
| 5,286,192 A | 2/1994 | Dixon |
| 5,286,201 A | 2/1994 | Yu |
| 5,295,832 A | 3/1994 | Evans |
| 5,297,962 A | 3/1994 | O'Connor et al. |
| D346,212 S | 4/1994 | Hosl |
| 5,301,381 A | 4/1994 | Klupt |
| 5,302,123 A | 4/1994 | Bechard |
| 5,317,691 A | 5/1994 | Traeger |
| 5,321,865 A | 6/1994 | Kaeser |
| 5,323,770 A | 6/1994 | Ito et al. |
| 5,331,704 A | 7/1994 | Rosen et al. |
| 5,344,317 A | 9/1994 | Pacher et al. |
| 5,346,677 A | 9/1994 | Risk |
| 5,349,896 A | 9/1994 | Delaney, III |
| D351,892 S | 10/1994 | Wolf et al. |
| 5,360,338 A | 11/1994 | Waggoner |
| 5,368,548 A | 11/1994 | Jousson |
| 5,370,534 A | 12/1994 | Wolf et al. |
| D354,168 S | 1/1995 | Hartwein |
| D354,559 S | 1/1995 | Knute |
| 5,378,149 A | 1/1995 | Stropko |
| 5,380,201 A | 1/1995 | Kawata |
| D356,864 S | 3/1995 | Woog |
| 5,399,089 A | 3/1995 | Eichman et al. |
| D358,883 S | 5/1995 | Vos |
| 5,456,672 A | 10/1995 | Diederich et al. |
| 5,465,445 A | 11/1995 | Yeh |
| 5,467,495 A | 11/1995 | Boland et al. |
| 5,468,148 A | 11/1995 | Ricks |
| 5,470,305 A | 11/1995 | Arnett et al. |
| 5,474,450 A | 12/1995 | Chronister |
| 5,474,451 A | 12/1995 | Dalrymple et al. |
| 5,476,379 A | 12/1995 | Disel |
| 5,484,281 A | 1/1996 | Renow et al. |
| 5,487,877 A | 1/1996 | Choi |
| 5,490,779 A | 2/1996 | Malmin |
| 5,505,916 A | 4/1996 | Berry, Jr. |
| D369,656 S | 5/1996 | Vos |
| D370,125 S | 5/1996 | Craft et al. |
| 5,525,058 A | 6/1996 | Gallant et al. |
| 5,526,841 A | 6/1996 | Detsch et al. |
| 5,540,587 A | 7/1996 | Malmin |
| 5,547,374 A | 8/1996 | Coleman |
| D373,631 S | 9/1996 | Maeda et al. |
| 5,554,014 A | 9/1996 | Becker |
| 5,554,025 A | 9/1996 | Kinsel |
| 5,556,001 A | 9/1996 | Weissman et al. |
| 5,564,629 A | 10/1996 | Weissman et al. |
| D376,893 S | 12/1996 | Gornet |
| D377,091 S | 12/1996 | Scott, Sr. |
| 5,613,259 A | 3/1997 | Craft et al. |
| 5,616,028 A | 4/1997 | Hafele et al. |
| 5,626,472 A | 5/1997 | Pennetta |
| 5,634,791 A | 6/1997 | Matsuura et al. |
| 5,636,987 A | 6/1997 | Serfaty |
| 5,640,735 A | 6/1997 | Manning |
| D382,407 S | 8/1997 | Craft et al. |
| 5,653,591 A | 8/1997 | Loge |
| 5,659,995 A | 8/1997 | Hoffman |
| 5,667,483 A | 9/1997 | Santos |
| D386,576 S | 11/1997 | Wang et al. |
| 5,683,192 A | 11/1997 | Kilfoil |
| 5,685,829 A | 11/1997 | Allen |
| 5,685,851 A | 11/1997 | Murphy et al. |
| 5,697,784 A | 12/1997 | Hafele et al. |
| D388,612 S | 1/1998 | Stutzer et al. |
| D388,613 S | 1/1998 | Stutzer et al. |
| D389,091 S | 1/1998 | Dickinson |
| 5,709,545 A | 1/1998 | Johnston et al. |
| D390,934 S | 2/1998 | McKeone |
| 5,716,007 A | 2/1998 | Nottingham et al. |
| 5,718,668 A | 2/1998 | Arnett et al. |
| 5,746,595 A | 5/1998 | Ford |
| 5,749,726 A | 5/1998 | Kinsel |
| 5,759,502 A | 6/1998 | Spencer et al. |
| 5,779,471 A | 7/1998 | Tseng et al. |
| 5,779,654 A | 7/1998 | Foley et al. |
| 5,795,153 A | 8/1998 | Rechmann |
| 5,796,325 A | 8/1998 | Lundell et al. |
| 5,833,065 A | 11/1998 | Burgess |
| 5,836,030 A | 11/1998 | Hazeu et al. |
| D402,744 S | 12/1998 | Zuege |
| 5,851,079 A | 12/1998 | Horstman et al. |
| D403,511 S | 1/1999 | Serbinski |
| D406,334 S | 3/1999 | Rosenthal et al. |
| 5,876,201 A | 3/1999 | Wilson et al. |
| D408,511 S | 4/1999 | Allen et al. |
| 5,901,397 A | 5/1999 | Häfele et al. |
| 5,934,902 A | 8/1999 | Abahusayn |
| D413,975 S | 9/1999 | Maeda |
| D416,999 S | 11/1999 | Miyamoto |
| D417,082 S | 11/1999 | Classen et al. |
| 5,993,402 A | 11/1999 | Sauer et al. |
| 6,030,215 A | 2/2000 | Ellion et al. |
| 6,038,960 A | 3/2000 | Fukushima et al. |
| 6,039,180 A | 3/2000 | Grant |
| 6,041,462 A | 3/2000 | Marques |
| 6,047,429 A | 4/2000 | Wu |
| D424,181 S | 5/2000 | Caplow |
| D425,615 S | 5/2000 | Bachman et al. |
| D425,981 S | 5/2000 | Bachman et al. |
| 6,056,548 A | 5/2000 | Neuberger et al. |
| 6,056,710 A | 5/2000 | Bachman et al. |
| D426,633 S | 6/2000 | Bachman et al. |
| 6,089,865 A | 7/2000 | Edgar |
| 6,116,866 A | 9/2000 | Tomita et al. |
| 6,120,755 A | 9/2000 | Jacobs |
| 6,124,699 A | 9/2000 | Suzuki et al. |
| D434,500 S | 11/2000 | Pollock et al. |
| 6,159,006 A | 12/2000 | Cook et al. |
| 6,164,967 A | 12/2000 | Sale et al. |
| D435,905 S | 1/2001 | Bachman et al. |
| D437,049 S | 1/2001 | Hartwein |
| 6,193,512 B1 | 2/2001 | Wallace |
| 6,193,932 B1 | 2/2001 | Wu et al. |
| 6,199,239 B1 | 3/2001 | Dickerson |
| 6,200,134 B1 | 3/2001 | Kovac |
| D439,781 S | 4/2001 | Spore |
| 6,217,835 B1 | 4/2001 | Riley et al. |
| D441,861 S | 5/2001 | Hafliger |
| 6,230,717 B1 | 5/2001 | Marx et al. |
| 6,233,773 B1 | 5/2001 | Karge et al. |
| 6,234,205 B1 | 5/2001 | D'Amelio et al. |
| 6,237,178 B1 | 5/2001 | Krammer et al. |

(56) References Cited

U.S. PATENT DOCUMENTS

| | | |
|---|---|---|
| 6,238,211 B1 | 5/2001 | Esrock |
| 6,247,929 B1 | 6/2001 | Bachman et al. |
| 6,280,190 B1 | 8/2001 | Hoffman |
| D448,236 S | 9/2001 | Murray |
| 6,293,792 B1 | 9/2001 | Hanson |
| D449,884 S | 10/2001 | Tobin et al. |
| 6,299,419 B1 | 10/2001 | Hunklinger |
| D453,453 S | 2/2002 | Lun |
| D455,201 S | 4/2002 | Jones |
| D455,203 S | 4/2002 | Jones |
| 6,363,565 B1 | 4/2002 | Paffrath |
| D457,949 S | 5/2002 | Krug |
| D464,799 S | 10/2002 | Crossman et al. |
| 6,468,482 B1 | 10/2002 | Frieze et al. |
| 6,475,173 B1 | 11/2002 | Bachman et al. |
| 6,485,451 B1 | 11/2002 | Roberts et al. |
| 6,497,375 B1 | 12/2002 | Srinath et al. |
| 6,497,572 B2 | 12/2002 | Hood et al. |
| D468,422 S | 1/2003 | McCurrach |
| 6,502,584 B1 | 1/2003 | Fordham |
| D470,660 S | 2/2003 | Schaber |
| 6,532,837 B1 | 3/2003 | Magussen, Jr. |
| 6,558,344 B2 | 5/2003 | McKinnon et al. |
| 6,561,808 B2 | 5/2003 | Neuberger et al. |
| D475,346 S | 6/2003 | McCurrach et al. |
| D476,743 S | 7/2003 | D'Silva |
| 6,589,477 B1 | 7/2003 | Frieze et al. |
| 6,602,071 B1 | 8/2003 | Ellion et al. |
| 6,632,091 B1 | 10/2003 | Cise et al. |
| D482,451 S | 11/2003 | Page et al. |
| 6,640,999 B2 | 11/2003 | Peterson |
| 6,647,577 B2 | 11/2003 | Tam |
| 6,659,674 B2 | 12/2003 | Carlucci et al. |
| 6,663,386 B1 | 12/2003 | Moelsgaard |
| 6,669,059 B2 | 12/2003 | Mehta |
| D484,971 S | 1/2004 | Hartwein |
| 6,681,418 B1 | 1/2004 | Bierend |
| D486,573 S | 2/2004 | Callaghan et al. |
| 6,689,078 B1 | 2/2004 | Rehkemper et al. |
| 6,699,208 B2 | 3/2004 | Bachman et al. |
| 6,719,561 B2 | 4/2004 | Gugel et al. |
| D489,183 S | 5/2004 | Akahori et al. |
| 6,739,782 B1 | 5/2004 | Rehkemper et al. |
| 6,740,053 B2 | 5/2004 | Kaplowitz |
| D490,899 S | 6/2004 | Gagnon |
| D491,728 S | 6/2004 | Jimenez |
| D492,996 S | 7/2004 | Rehkemper et al. |
| 6,761,324 B2 | 7/2004 | Chang |
| 6,766,549 B2 | 7/2004 | Klupt |
| D495,142 S | 8/2004 | Berde |
| D495,143 S | 8/2004 | Berde |
| 6,779,216 B2 | 8/2004 | Davies et al. |
| 6,783,004 B1 | 8/2004 | Rinner |
| 6,783,505 B1 | 8/2004 | Lai |
| 6,796,796 B2 | 9/2004 | Segal |
| 6,808,331 B2 | 10/2004 | Hall et al. |
| D498,643 S | 11/2004 | Pryor |
| 6,814,259 B1 | 11/2004 | Foster et al. |
| D499,885 S | 12/2004 | Xi |
| 6,835,181 B2 | 12/2004 | Hippensteel |
| D500,599 S | 1/2005 | Callaghan |
| 6,836,917 B2 | 1/2005 | Blaustein et al. |
| 6,837,708 B2 | 1/2005 | Chen et al. |
| 6,884,069 B2 | 4/2005 | Goldman |
| 6,902,337 B1 | 6/2005 | Kuo |
| 6,907,879 B2 | 6/2005 | Drinan et al. |
| D509,585 S | 9/2005 | Kling et al. |
| D513,638 S | 1/2006 | Pan |
| D515,215 S | 2/2006 | Wang |
| D522,652 S | 6/2006 | Massey |
| 7,080,980 B2 | 7/2006 | Klupt |
| D529,661 S | 10/2006 | Schmidt |
| D530,010 S | 10/2006 | Luettgen et al. |
| 7,117,555 B2 | 10/2006 | Fattori et al. |
| D532,570 S | 11/2006 | Vizcarra |
| 7,131,838 B2 | 11/2006 | Suzuki et al. |
| D533,720 S | 12/2006 | Vu |
| 7,147,468 B2 | 12/2006 | Snyder et al. |
| D538,474 S | 3/2007 | Sheppard et al. |
| D548,334 S | 8/2007 | Izumi |
| D550,097 S | 9/2007 | Lepoitevin |
| D553,980 S | 10/2007 | VerWeyst |
| 7,276,035 B2 | 10/2007 | Lu |
| 7,314,456 B2 | 1/2008 | Shaw |
| D563,674 S | 3/2008 | Beedham |
| D565,175 S | 3/2008 | Boyd et al. |
| 7,344,510 B1 | 3/2008 | Yande |
| D565,713 S | 4/2008 | Gao |
| 7,367,803 B2 | 5/2008 | Egeresi |
| D574,952 S | 8/2008 | Boyd et al. |
| 7,414,337 B2 | 8/2008 | Wilkinson et al. |
| D577,198 S | 9/2008 | Jimenez |
| D577,814 S | 9/2008 | Seki et al. |
| D581,279 S | 11/2008 | Oates |
| 7,455,521 B2 | 11/2008 | Fishburne, Jr. |
| 7,469,440 B2 | 12/2008 | Boland et al. |
| D585,132 S | 1/2009 | Pukall |
| D588,262 S | 3/2009 | Pukall |
| 7,500,584 B2 | 3/2009 | Schutz |
| D590,492 S | 4/2009 | Powell |
| D592,748 S | 5/2009 | Boulton |
| D595,136 S | 6/2009 | Canamasas Puigbo |
| D601,694 S | 10/2009 | Rocklin |
| D601,697 S | 10/2009 | Sobeich et al. |
| D603,708 S | 11/2009 | Handy |
| D608,430 S | 1/2010 | Slothower |
| 7,670,141 B2 | 3/2010 | Thomas et al. |
| 7,677,888 B1 | 3/2010 | Halm |
| D613,550 S | 4/2010 | Picozza et al. |
| D621,949 S | 8/2010 | Seki et al. |
| D622,928 S | 9/2010 | Griebel |
| D623,376 S | 9/2010 | Griebel |
| D625,105 S | 10/2010 | Winkler |
| D625,406 S | 10/2010 | Seki et al. |
| 7,814,585 B1 | 10/2010 | Reich |
| D629,884 S | 12/2010 | Stephens |
| 7,857,623 B2 | 12/2010 | Grez |
| 7,862,536 B2 | 1/2011 | Chen et al. |
| 7,959,597 B2 | 6/2011 | Baker et al. |
| D640,872 S | 7/2011 | Nanda |
| D648,539 S | 11/2011 | Wai |
| D648,941 S | 11/2011 | Leung |
| D651,409 S | 1/2012 | Papenfu |
| D651,805 S | 1/2012 | Hay |
| D653,340 S | 1/2012 | Goerge et al. |
| 8,113,832 B2 | 2/2012 | Snyder et al. |
| D655,380 S | 3/2012 | Taylor |
| D658,381 S | 5/2012 | Gebski |
| 8,220,726 B2 | 7/2012 | Qiu et al. |
| D666,912 S | 9/2012 | Kawai |
| 8,256,979 B2 | 9/2012 | Hilscher et al. |
| D668,339 S | 10/2012 | Luoto |
| D669,169 S | 10/2012 | Washington et al. |
| 8,297,534 B2 | 10/2012 | Li et al. |
| D670,373 S | 11/2012 | Taylor et al. |
| D670,958 S | 11/2012 | Picozza et al. |
| D671,637 S | 11/2012 | Gebski et al. |
| D672,018 S | 12/2012 | Bucher |
| 8,366,024 B2 | 2/2013 | Leber et al. |
| 8,403,577 B2 | 3/2013 | Khoshnevis |
| 8,403,665 B2 | 3/2013 | Thomas et al. |
| 8,408,483 B2 | 4/2013 | Boyd et al. |
| 8,418,300 B2 | 4/2013 | Miller et al. |
| D686,311 S | 7/2013 | Mori |
| D694,378 S | 11/2013 | Bates |
| D694,398 S | 11/2013 | Taylor |
| D700,343 S | 2/2014 | Liu |
| D702,819 S | 4/2014 | Garland |
| D702,821 S | 4/2014 | Garland |
| D707,350 S | 6/2014 | Woodard |
| D709,183 S | 7/2014 | Kemlein |
| 8,801,667 B2 | 8/2014 | Taylor |
| D714,929 S | 10/2014 | Kim et al. |
| D714,930 S | 10/2014 | Kim et al. |

(56) References Cited

U.S. PATENT DOCUMENTS

| | | |
|---|---|---|
| D717,412 S | 11/2014 | Bucher |
| D717,427 S | 11/2014 | Kim |
| D717,547 S | 11/2014 | Adriaenssen |
| D718,855 S | 12/2014 | Kim et al. |
| D719,737 S | 12/2014 | Adriaenssen |
| D723,387 S | 3/2015 | Fath |
| D725,770 S | 3/2015 | Kim et al. |
| D731,640 S | 6/2015 | Kim et al. |
| 9,050,157 B2 | 6/2015 | Boyd et al. |
| D735,305 S | 7/2015 | Obara |
| D740,936 S | 10/2015 | Kim et al. |
| D745,329 S | 12/2015 | Ong |
| D746,975 S | 1/2016 | Schenck |
| D747,464 S | 1/2016 | Taylor |
| D754,330 S | 4/2016 | Kim et al. |
| D756,122 S | 5/2016 | Taylor |
| D764,051 S | 8/2016 | Wang |
| D766,423 S | 9/2016 | Kim et al. |
| D772,396 S | 11/2016 | Kim et al. |
| D772,397 S | 11/2016 | Kim et al. |
| D773,822 S | 12/2016 | Sikora |
| D776,253 S | 1/2017 | Li |
| D782,326 S | 3/2017 | Fath |
| D782,657 S | 3/2017 | Williams |
| 9,642,677 B2 | 5/2017 | Luettgen et al. |
| D788,907 S | 6/2017 | Kim |
| D798,059 S | 7/2017 | McGarry |
| D798,440 S | 9/2017 | Kim |
| D799,217 S | 10/2017 | Massee |
| 2002/0090252 A1 | 7/2002 | Hall et al. |
| 2002/0108193 A1 | 8/2002 | Gruber |
| 2002/0119415 A1 | 8/2002 | Bailey |
| 2002/0152565 A1 | 10/2002 | Klupt |
| 2003/0060743 A1 | 3/2003 | Chang |
| 2003/0098249 A1 | 5/2003 | Rollock |
| 2003/0162146 A1* | 8/2003 | Shortt ............... A61C 17/221 433/118 |
| 2003/0204155 A1 | 10/2003 | Egeresi |
| 2003/0213075 A1 | 11/2003 | Hui et al. |
| 2004/0045107 A1 | 3/2004 | Egeresi |
| 2004/0076921 A1 | 4/2004 | Gofman et al. |
| 2004/0122377 A1 | 6/2004 | Fischer et al. |
| 2004/0126730 A1 | 7/2004 | Panagotacos |
| 2004/0180569 A1 | 10/2004 | Chiou |
| 2004/0209222 A1 | 10/2004 | Snyder |
| 2005/0004498 A1 | 1/2005 | Klupt |
| 2005/0049620 A1 | 3/2005 | Chang |
| 2005/0064371 A1 | 3/2005 | Soukos et al. |
| 2005/0101894 A1 | 5/2005 | Hippensteel |
| 2005/0102773 A1 | 5/2005 | Obermann et al. |
| 2005/0144745 A1 | 7/2005 | Russell |
| 2005/0177079 A1 | 8/2005 | Pan |
| 2005/0271531 A1 | 12/2005 | Brown et al. |
| 2006/0008373 A1 | 1/2006 | Schutz |
| 2006/0010624 A1 | 1/2006 | Cleland |
| 2006/0021165 A1 | 2/2006 | Boland et al. |
| 2006/0026784 A1 | 2/2006 | Moskovich et al. |
| 2006/0057539 A1 | 3/2006 | Sodo |
| 2006/0078844 A1 | 4/2006 | Goldman et al. |
| 2006/0079818 A1 | 4/2006 | Yande |
| 2006/0207052 A1 | 9/2006 | Tran |
| 2007/0082316 A1 | 4/2007 | Zhadanov et al. |
| 2007/0082317 A1 | 4/2007 | Chuang |
| 2007/0113360 A1 | 5/2007 | Tsai |
| 2007/0202459 A1 | 8/2007 | Boyd et al. |
| 2007/0203439 A1 | 8/2007 | Boyd et al. |
| 2007/0254260 A1 | 11/2007 | Alden |
| 2008/0008979 A1 | 1/2008 | Thomas et al. |
| 2008/0189951 A1 | 8/2008 | Molema et al. |
| 2008/0213719 A1 | 9/2008 | Giniger et al. |
| 2008/0253906 A1 | 10/2008 | Strong |
| 2008/0307591 A1 | 12/2008 | Farrell et al. |
| 2009/0070949 A1 | 3/2009 | Sagel et al. |
| 2009/0071267 A1 | 3/2009 | Mathus et al. |
| 2009/0082706 A1 | 3/2009 | Shaw |
| 2009/0124945 A1 | 5/2009 | Reich et al. |
| 2009/0139351 A1 | 6/2009 | Reichmuth |
| 2009/0163839 A1 | 6/2009 | Alexander |
| 2009/0188780 A1 | 7/2009 | Watanabe |
| 2009/0281454 A1 | 11/2009 | Baker et al. |
| 2010/0010524 A1 | 1/2010 | Barrington |
| 2010/0015566 A1 | 1/2010 | Shaw |
| 2010/0049177 A1 | 2/2010 | Boone, III et al. |
| 2010/0190132 A1 | 7/2010 | Taylor et al. |
| 2010/0239998 A1 | 9/2010 | Snyder et al. |
| 2010/0261134 A1 | 10/2010 | Boyd et al. |
| 2010/0261137 A1 | 10/2010 | Boyd et al. |
| 2010/0266982 A1 | 10/2010 | Klecker et al. |
| 2010/0326536 A1 | 12/2010 | Nan |
| 2010/0330527 A1 | 12/2010 | Boyd et al. |
| 2011/0027749 A1 | 2/2011 | Syed |
| 2011/0076090 A1 | 3/2011 | Wu et al. |
| 2011/0097683 A1 | 4/2011 | Boyd et al. |
| 2011/0139826 A1 | 6/2011 | Hair et al. |
| 2011/0144588 A1 | 6/2011 | Taylor et al. |
| 2011/0184341 A1 | 7/2011 | Baker et al. |
| 2011/0247156 A1* | 10/2011 | Schmid ............... A63F 13/245 15/105 |
| 2011/0307039 A1 | 12/2011 | Cornell |
| 2012/0021374 A1 | 1/2012 | Cacka et al. |
| 2012/0045730 A1 | 2/2012 | Snyder et al. |
| 2012/0064480 A1 | 3/2012 | Hegemann |
| 2012/0077145 A1 | 3/2012 | Tsurukawa |
| 2012/0141952 A1 | 6/2012 | Snyder et al. |
| 2012/0179118 A1 | 7/2012 | Hair |
| 2012/0266396 A1 | 10/2012 | Leung |
| 2012/0277663 A1 | 11/2012 | Millman et al. |
| 2012/0277677 A1 | 11/2012 | Taylor et al. |
| 2012/0277678 A1 | 11/2012 | Taylor et al. |
| 2012/0279002 A1 | 11/2012 | Sokol et al. |
| 2012/0295220 A1 | 11/2012 | Thomas et al. |
| 2013/0025394 A1* | 1/2013 | Fan ............... B23F 17/005 74/417 |
| 2013/0089832 A1 | 4/2013 | Lee |
| 2013/0125326 A1 | 5/2013 | Schmid et al. |
| 2013/0193915 A1 | 8/2013 | Jung et al. |
| 2013/0295520 A1 | 11/2013 | Hsieh |
| 2014/0106296 A1 | 4/2014 | Woodard et al. |
| 2014/0193774 A1 | 7/2014 | Snyder et al. |
| 2014/0259474 A1 | 9/2014 | Sokol et al. |
| 2014/0272769 A1 | 9/2014 | Luettgen et al. |
| 2014/0272782 A1 | 9/2014 | Luettgen et al. |
| 2014/0352088 A1 | 12/2014 | Wu |
| 2015/0004559 A1 | 1/2015 | Luettgen et al. |
| 2015/0147717 A1 | 5/2015 | Taylor et al. |
| 2015/0173850 A1 | 6/2015 | Garrigues et al. |
| 2015/0182319 A1 | 7/2015 | Wagner et al. |
| 2016/0100921 A1 | 4/2016 | Ungar |
| 2016/0151133 A1 | 6/2016 | Luettgen et al. |
| 2017/0239132 A1 | 8/2017 | Luettgen et al. |

FOREIGN PATENT DOCUMENTS

| | | |
|---|---|---|
| CN | 203693808 | 7/2014 |
| CN | 204049908 | 12/2014 |
| DE | 1466963 | 5/1969 |
| DE | 1566490 | 11/1970 |
| DE | 2019003 | 11/1971 |
| DE | 2409752 | 9/1975 |
| DE | 2714876 | 10/1978 |
| DE | 2910982 | 2/1980 |
| DE | 3346651 | 7/1985 |
| DE | 2545936 | 4/1997 |
| DE | 10033919 | 2/2002 |
| DE | 20200015767 | 1/2006 |
| EP | 0023672 | 7/1980 |
| EP | 0515983 | 2/1992 |
| EP | 1825827 | 8/2007 |
| EP | 2621050 A1 * | 7/2013 ........... A61C 17/224 |
| FR | 2556954 | 6/1985 |
| FR | 2654627 | 5/1991 |
| GB | 838564 | 6/1960 |
| GB | 1182031 | 2/1970 |
| GB | 2018605 | 10/1979 |

(56) References Cited

FOREIGN PATENT DOCUMENTS

| GB | 2237505 | 5/1991 |
|---|---|---|
| JP | 2-134150 | 5/1990 |
| JP | 2009-39455 | 2/2009 |
| KR | 20120126265 | 11/2012 |
| WO | WO95/016404 | 6/1995 |
| WO | WO01/10327 | 2/2001 |
| WO | WO01/019281 | 3/2001 |
| WO | WO04/021958 | 3/2004 |
| WO | WO04/039205 | 5/2004 |
| WO | WO2004/062518 | 7/2004 |
| WO | WO2004060259 A2 | 7/2004 |
| WO | WO2008/070730 | 6/2008 |
| WO | WO2008157585 A1 | 12/2008 |
| WO | WO2011/075581 | 6/2011 |
| WO | WO2013/095462 | 6/2013 |
| WO | WO2013/124691 | 8/2013 |
| WO | WO2014145890 | 9/2014 |

OTHER PUBLICATIONS

The Right Tool, Electron Fusion Devices, Inc., 2 pages, at least as early as Feb. 1991.
Japanese Packaging, 2 pages, at least as early as Dec. 2002.
Japanese Instruction Brochure, 20 pages, at least as early as Dec. 2002.
Brochure: Woog International, "You have a 98% chance of getting gum disease. Unless you read this.", Lancaster, Pennsylvania, 5 pages, Feb. 1987.
Brochure: Woog International, "We put the control of home dental care back into the hands of the professional", Lancaster, Pennsylvania, 2 pages, Feb. 1987.
Brochure: Woog International, "Products at a Glance: Home Dental Care System" Woog Orajet, 3 pages, at least as early as Dec. 18, 1998.
WEBSITE: http://www.just4teeth.com/product/Panasonic/Panasonic_Portable_Irrigator.htm, 2 pages, at least as early as Jun. 20, 2003.
WEBSITE: http://www.videodirectstore.com/store/merchant.mv?Screen=PROD&Product_Code=EW1'. . . , 2 pages, at least as early as Jun. 20, 2003.
WEBSITE: http://products.consumerguide.com/cp/family/review/index.cfm/id/18742, 2 pages, at least as early as Jun. 20, 2003.
WEBSITE: http://www.racekarteng.com/images/walbroparts.gif and http://www.muller.net/mullermachine/docs/walbro1.html, 4 pages, at least as early as Jun. 20, 2003.
European Search Report, EPO Application No. 07250799.9, dated Jul. 5, 2007.
European Search Report, EPO Application No. 07252693.2, 14 pages, dated Apr. 28, 2008.
European Examination Report, EPO Application No. 07250799.9, dated Feb. 5, 2009.
International Search Report, Application No. PCT/US2010/028180, 2 pages, dated May 18, 2010.
International Search Report, PCT/US2010/060800, 2 pages, dated Feb. 11, 2011.
International Search Report, PCT/US2011/052795, 10 pages, dated Jan. 17, 2012.
Waterpik SinuSense WEBSITE: http://www.insightsbyapril.com/2012/03/waterpik-natural-remedy-for-sinus.html, 8 pages, retrieved on May 31, 2012.
Waterpik WP350W Oral Irrigator. Dentist.net. Copyright date 2013. Date accessed: Mar. 30, 2017, 2 pages <http://www.dentalhoo.com/waterpik-wp350.asp>.
IPik Portable Oral Irrigator. AliExpress. Date reviewed: Oct. 5, 2016. <https://www.allexpress.com/...e-Oral-Care-Product-Nasal-Irrigator-Tooth-Flosser-Water/1525541997.html?aff_platform=aaf&cpt=1490913714609&sk=yfAeyJa&aff_trace_key=c5a300c4f02e46d08c042f5292e1762f-1490913714609-07517-yfAeyJa>, 18 pages.
Brite Leafs Professional Portable 2-in-1 Nasal Sinus & Oral Irrigator. Brite Leafs. Copyright date 2012, <http://www.briteleafs.com/product6.html>, 1 page.
AliExpress. Date reviewed: Jan. 12, 2017. <https://www.aliexpress.com/item/Cordless-Water-Floss-Portable-Oral-Irrigator-Dental-Water-Flosser-Waterpic-Whatpick-Dental-Water-Pic-Whater-Pick/32769416341.html?spm=2114.40010308.4.75.Owuzfj>.
Suvo. "Helical Gears vs Spur Gears—Advantages and Disadvantages Compared." Brighthub Engineering, Aug. 18, 2010, www.brighthubengineering.com/manufacturing-technology/33535-helical-gears-vs-spur-gears/., 7 pages.
Waterpik ADA Accepted WP-663, posted at amazon.com, earliest date reviewed on Feb. 6, 2014, [online], acquired on Feb. 12, 2018. Available from Internet, <URL: https://www.amazon.com/Waterpik-Accepted-WP-663-Aquarius-Flosser/dp/B072JFVXSY/ref=cm_cr_arp_d_product_top?ie=UTF8&th=1> (Year: 2014).
Waterpik Classic Professional Water Flosser, WP-72, posted at amazon.com, earliest date reviewed on Mar. 5, 2016, [online], acquired on Feb. 23, 2018. Available from Internet, <URL: https://www.amazon.com/Waterpik-Classic-Professional-Flosser-WP-72/dp/B00HFQQOU6/ref=cm_cr_arp_d_product_top?ie=UTF8> (Year: 2016).
Waterpik Complete Care 5.0 Toothbrush, posted at amazon.com, earliest date reviewed on Mar. 14, 2016, [online], acquired on Feb. 23, 2018. Available from Internet, <URL: https://www.amazon.com/Waterpik-Complete-Toothbrush-Water-Flosser/dp/B01CRZ939Y/ref=cm_cr arp_d_product_top?ie=UTF8> (Year: 2016).
Extended European Search Report dated Oct. 4, 2019, in European Application No. 19157292.4, 20 pages.
European Partial Search Report dated Jul. 5, 2019, in European Application No. 19157292.4, 15 pages.

* cited by examiner

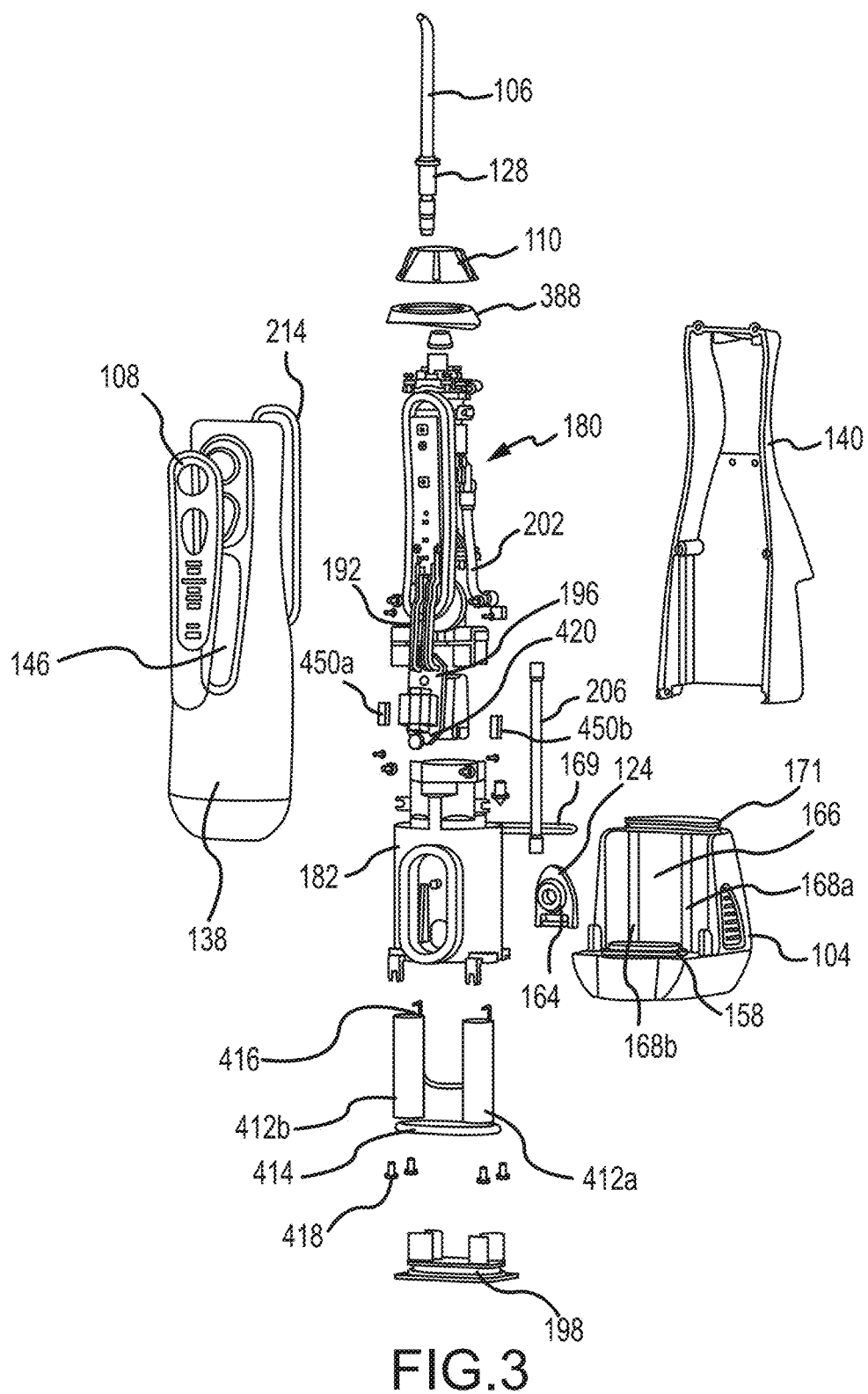

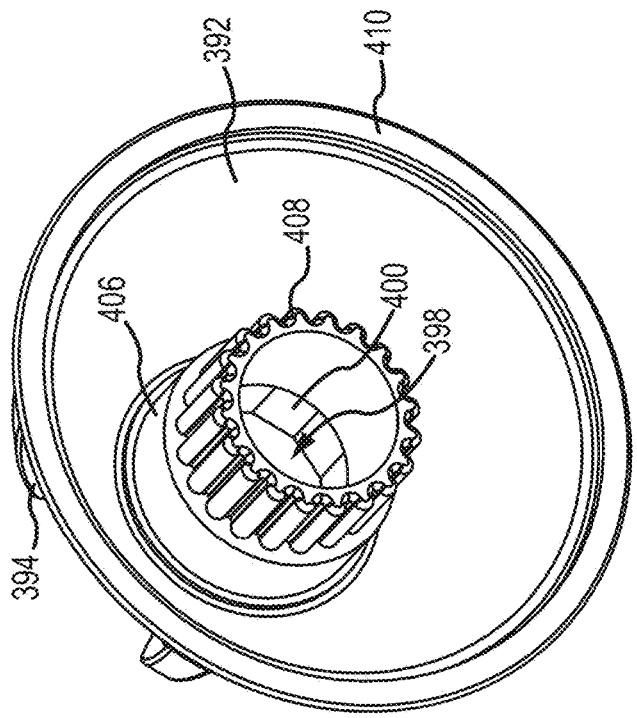
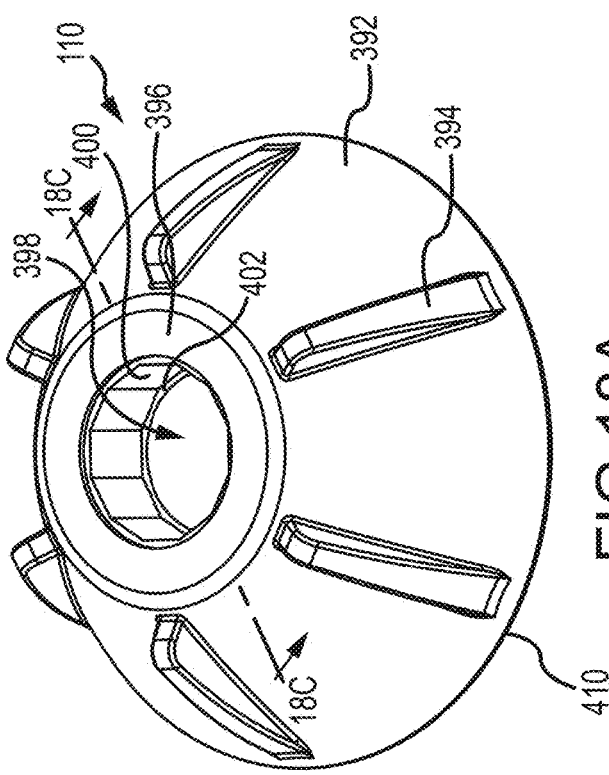
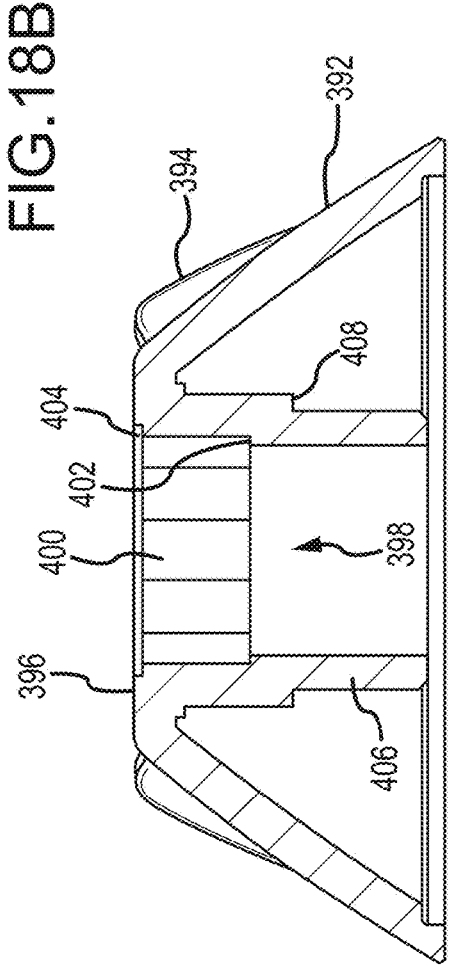
FIG.18B
FIG.18C
FIG.18A

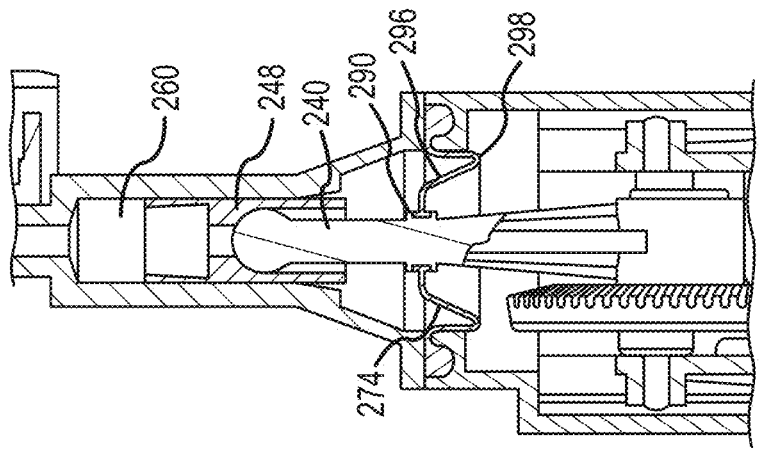
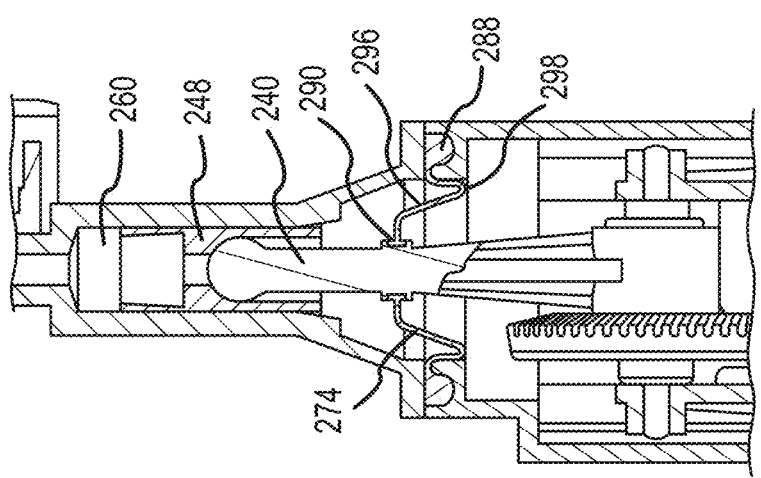
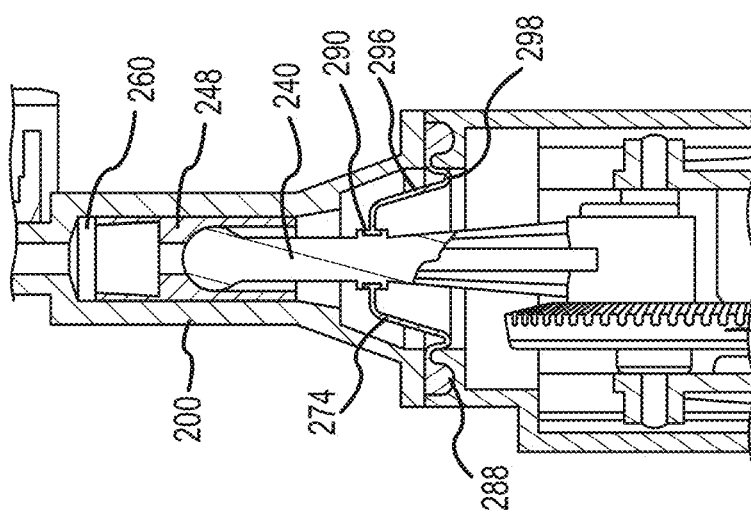

ORAL IRRIGATOR

CROSS REFERENCE TO RELATED APPLICATIONS

This application is a continuation of U.S. Non-Provisional application Ser. No. 14/956,017, filed Dec. 1, 2015, entitled "Oral Irrigator," which claims priority to U.S. Provisional Application No. 62/086,051, filed Dec. 1, 2014, entitled "Waterproof Cordless Oral Irrigator," and to U.S. Provisional Application No. 62/132,319 filed Mar. 12, 2015, entitled "Waterproof Cordless Oral Irrigator," the disclosures of which are hereby incorporated by reference in their entireties.

TECHNICAL FIELD

The present disclosure relates to health and personal hygiene equipment and more particularly, to oral irrigators.

BACKGROUND

Oral irrigators typically are used to clean a user's teeth and gums by discharging a pressurized fluid stream into a user's oral cavity. The fluid impacts the teeth and gums to remove debris. Many oral irrigators include electrical components, such as batteries, a motor, or the like. For example, typically oral irrigators include a motor driven pump that pumps fluid from a reservoir to the tip. Often oral irrigators are used in a wet environment, such as a bathroom and some users may even take the irrigators into the shower or bath, but conventional oral irrigators are not waterproof, merely water resistant. Hence, conventional oral irrigators may be protected from splashes and incidental fluid contact, but as they are not waterproof may not protect electronic components when submersed in water or exposed to large amounts of water. When water and other fluids reach the electronic components, the fluids can cause the oral irrigator to malfunction and may even prevent the oral irrigator from operating completely. As such, there is a need for an oral irrigator that is waterproof.

SUMMARY

One example of the present disclosure may take the form of an oral irrigator pump. The oral irrigator pump may include a motor, a pump body, a connecting rod, and a diaphragm seal. The connecting rod may be at least partially received within the pump body and movably connected to the motor and the motor moves the connecting rod between a first position and a second position within the pump body. As the connecting rod moves from the first position to the second position, the diaphragm seal deforms from a first orientation to a second orientation.

Another example of the present disclosure may take the form of an oral irrigator. The oral irrigator may include a reservoir, a tip fluidly connected to the reservoir, a motor having a drive shaft, and a pump fluidly connected to the reservoir and the tip. The pump may include a pump body including a pump inlet fluidly connected to the reservoir and a pump outlet fluidly connected to the tip, a pinion gear placed on the drive shaft and including a plurality of pinion gear teeth that curve along their length, and a driven gear including a plurality of driven gear teeth that mesh with the pinion gear teeth. In this embodiment, the pinion gear teeth and the driven gear teeth are spiral gears with beveled edges. The pump may also include a connecting rod eccentrically connected to the driven gear and a piston connected to a first end of the connecting rod and received within the pump body. In operation, movement of the drive shaft of the motor causes the pinion gear to rotate, which causes the driven gear to rotate, translating the connecting rod and moving the piston laterally within the pump body to pull fluid from the reservoir and push the fluid to the tip.

Yet another example of the present disclosure may take the form of an oral irrigator including a handle fluidly connected to a reservoir and a tip latch assembly connected to the handle. The tip latch assembly may include a latch with an integrally formed biasing structure and at least one prong selectively movable from an engaged position to a disengaged position. The tip latch assembly may also include a tip release button engaging at least one surface of the latch. To operate the latch, a user exerts a force on the tip release button, which causes the tip release button to exert a force against the at least one surface of the latch, overcoming a biasing force exerted by the biasing structure and causing the at least one prong to move from the engaged position to the disengaged position. When the user removes the force from the tip release button, the biasing structure exerts the biasing force on the tip release button as the at least one prong moves from the disengaged position back to the engaged position.

Another example of the present disclosure may take the form of a waterproof oral irrigator. The waterproof oral irrigator may include a body including a front shell and a rear shell connected together to define a cavity, an interior housing received within the cavity, and a control assembly connected to an outer surface of the interior housing and positioned between an interior surface of the front shell and the interior housing. The waterproof oral irrigator may also include a first sealing member connected to the front shell and the interior housing, where the first sealing member surrounds the control assembly.

Yet another example of the present disclosure may take the form of an oral irrigation assembly including an oral irrigator and a charging unit. The oral irrigator includes a housing, at least one rechargeable battery received within the housing, and at least one housing magnet connected to the housing. The charging unit is selectively connectable to the housing of the oral irrigator and is configured to provide a charge to the at least one rechargeable battery. The charging unit includes at least one charger magnet connected to the charging unit, such that the at least one housing magnet and the at least one charger magnet cooperate to removably connect the charging unit to the housing of the oral irrigator.

While multiple examples are disclosed, still other examples of the present invention will become apparent to those skilled in the art from the following detailed description, which shows and describes illustrative examples of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

FIG. 3 is an exploded view of the oral irrigator.

FIG. 18A is a top isometric view of a tip collar for the tip latch assembly for the oral irrigator.

FIG. 18B is a bottom isometric view of the tip collar of FIG. 18A.

FIG. 18C is a cross-section view of the tip collar taken along line 18C-18C in FIG. 18A.

FIG. 23A is a partial cross-section enlarged view of the oral irrigator similar to FIG. 12 during an upstroke of the pumping assembly.

FIG. 23B is a partial cross-section enlarged view similar to FIG. 23A during a transition between the upstroke position and down-stroke position.

FIG. 23C is a partial cross-section enlarged view similar to FIG. 23A during a down-stroke of the pumping assembly.

DETAILED DESCRIPTION

Figure 1A:
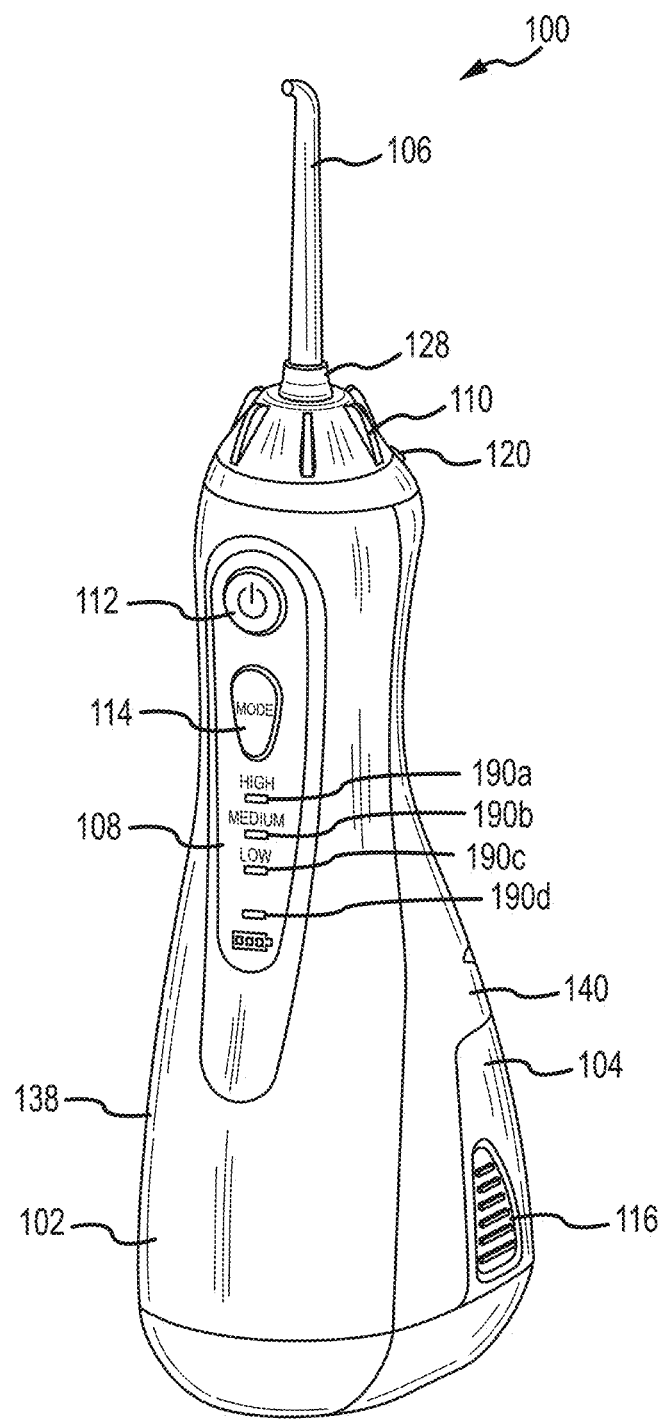
FIG. 1A is a front isometric view of an oral irrigator.

Some examples of the present disclosure include a cordless oral irrigator. The cordless oral irrigator may include an integrated handle and reservoir to allow the irrigator to be held in a user's hand without requiring cords or hoses extending to a base station to provide fluid communication to a reservoir and/or electrical communication to a power source. The oral irrigator of the present disclosure may include a body, a tip, a reservoir, a control panel, a power source, and a drive assembly. The power source in many embodiments will be a battery or other rechargeable component that can provide portable electricity to the drive assembly. However, it should be noted that multiple aspects of the present disclosure can be incorporated into a countertop oral irrigator.

The oral irrigator may include a number of waterproofing elements that help to ensure that water (and other fluids) do not enter into certain compartments or reach certain components, e.g., the motor and battery. In one example, the oral irrigator may include three separate waterproof compartments, one for the control assembly, one for a charging assembly, and one for the motor and batteries. The waterproofing elements may allow the oral irrigator to be waterproof and be able to function even if dropped into a meter or more of water. The waterproofing elements seal the outer surface of the oral irrigator to prevent water from entering into the internal compartments, as well seal internal compartments within the irrigator, so that if there are internal leaks within the oral irrigator, fluid from the reservoir, pump, and/or tip does not damage any electrical components. The waterproofing elements are discussed in more detail below, but some examples include seals between the control panel and the body or housing, overmolded buttons on the control panel, and ultrasonically welding a portion of the control panel to the body of the oral irrigator. Alternatively or additionally, the oral irrigator may include components that are coated with a super-hydrophobic coating to help protect electronic components from damage. The waterproofing elements allow the oral irrigator to receive an IPX7 waterproof rating under the International Protection Marking standard, which means that the device is suitable in immersion in fluid up to 1 meter.

In some embodiments the drive assembly may include a motor, a pump, and a linkage connecting the pump to the motor. The linkage may include a pinion gear and a driven gear, with the pinion gear being received around a drive shaft of the motor and the driven gear meshing with the pinion gear. In one example the driven gear and the pinion gear are bevel gears mounted on shafts arranged approximately 90 degrees relative to one another. The gears of the linkage may be configured to transmit an eccentric motion to the pump, which will be discussed in more detail below. In one embodiment, both the pinion gear and the driven gear may include helical or spiral-shaped gear teeth. That is, the gear teeth on both gears may be curved along their length. The spiral shape of the pinion gear and the driven gear of the present disclosure, although they may be more difficult to machine and manufacture, have a reduced noise level as compared to straight teeth gears.

Conventional oral irrigating devices typically include gears, such as crown gears, with substantially straight gear teeth having a 90 degree pitch cone. Crown gears are relatively easy to manufacture, allow larger tolerances, and have a high efficiency, but with crown gears only one set of teeth carries the load at a time. In particular, with straight cut gears (such as crown gears), the load cannot be distributed. On the contrary, with the spiral shape of the gears of the present disclosure, multiple teeth can carry the load at a time, which increases the load that can be handled by the linkage, as well as makes the gears less susceptible to failure.

The spiral shape of the gear teeth further have effectively larger sized teeth as compared to a similarly sized crown gear since the teeth extend diagonally rather than straight across. Also, the angle of the teeth of the gears engages more gradually, since the pitch is less than 90 degrees. The gradual engagement of the teeth of the spiral gears reduces the noise, as well as allows the gears to mesh more smoothly. Spiral gears have an increased durability as compared to crown gears and therefore have improved reliability and create less noise. However, spiral gears require tight tolerances to manufacture as the axial, radial, and vertical positions, as well as the shaft angle, should be correct to allow the gear to run smoothly and avoid excessive wear. Further, spiral gears have a greater sliding friction as compared to crown gears and therefore may be less efficient than crown gears.

In some embodiments, the oral irrigator may include a diaphragm seal that seals the pump from the electrical components of the oral irrigator (e.g., the motor and the power source). The diaphragm seal connects to a piston rod or connecting rod of the pump that moves a piston to pump fluid from the reservoir to the tip. The diaphragm seal includes a rod aperture through which the piston rod is received. The diaphragm seal is secured to the position rod and is secured to a pump body or other location along an exterior of the pump. The diaphragm is connected so that as the connecting rod moves to drive the piston, the diaphragm moves correspondingly, but does not rub against any surfaces as it moves. This increases the durability of the diaphragm as it reduces wear due to friction and, because the diaphragm does not experience friction during use, the diaphragm does not reduce the efficiency of the pump.

The oral irrigator may also include a removably attachable charging device. The charging device may selectively attach to the body and charge the power source, such as the battery, when connected. As an example, the charging device may include one or more magnets that magnetically couple to one or more body magnets positioned with the body of the oral irrigator. When the charging device is connected to the body, a first induction coil of the charging device is positioned to align with a second induction coil in the body of the oral irrigator so as to induce a current flow in the second induction coil. In some embodiments, the charging device may generally conform to the shape of the oral irrigator body. This allows the charging device to more securely connect to the body, as well as provide an aesthetically pleasing uniform appearance between the body of the oral irrigator and the charger. Further, the charger may also include a plurality of cooling grooves defined on a side of the charger housing. The cooling grooves allow airflow between the oral irrigator and the charger when the oral irrigator is charging, which dissipates heat and helps to prevent damage to components, such as the housing of the irrigator and/or charger, due to the heat generated by the coils during charging.

Overview of the Oral Irrigator

Figure 1B:
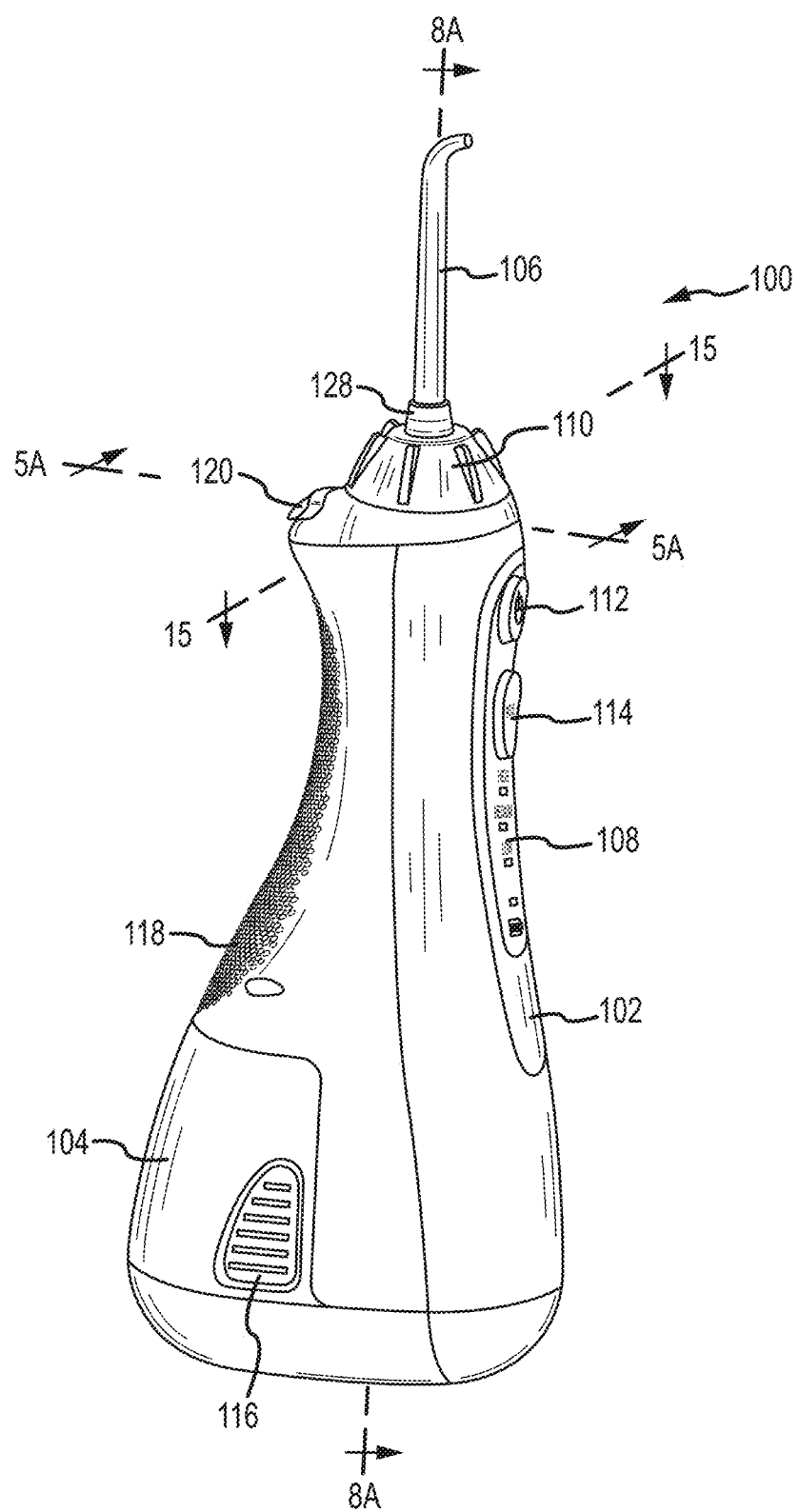
FIG. 1B is a side elevation view of the oral irrigator.
Figure 1C:
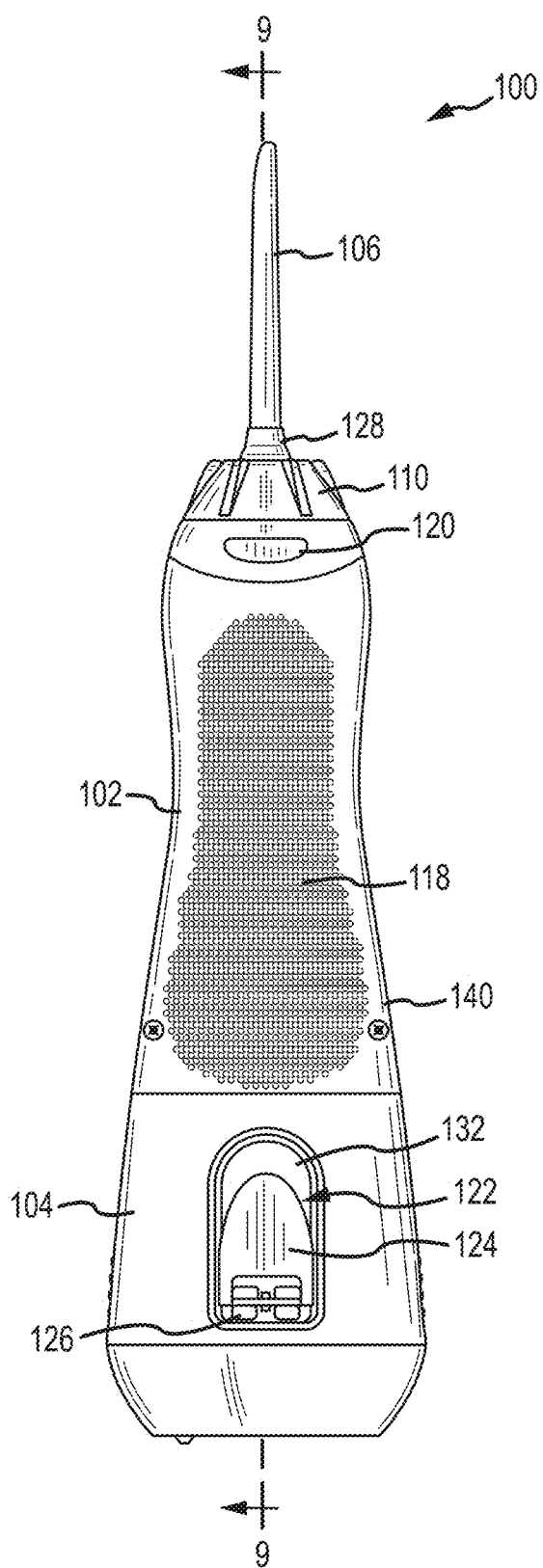
FIG. 1C is a rear elevation view of the oral irrigator.
Figure 2A:
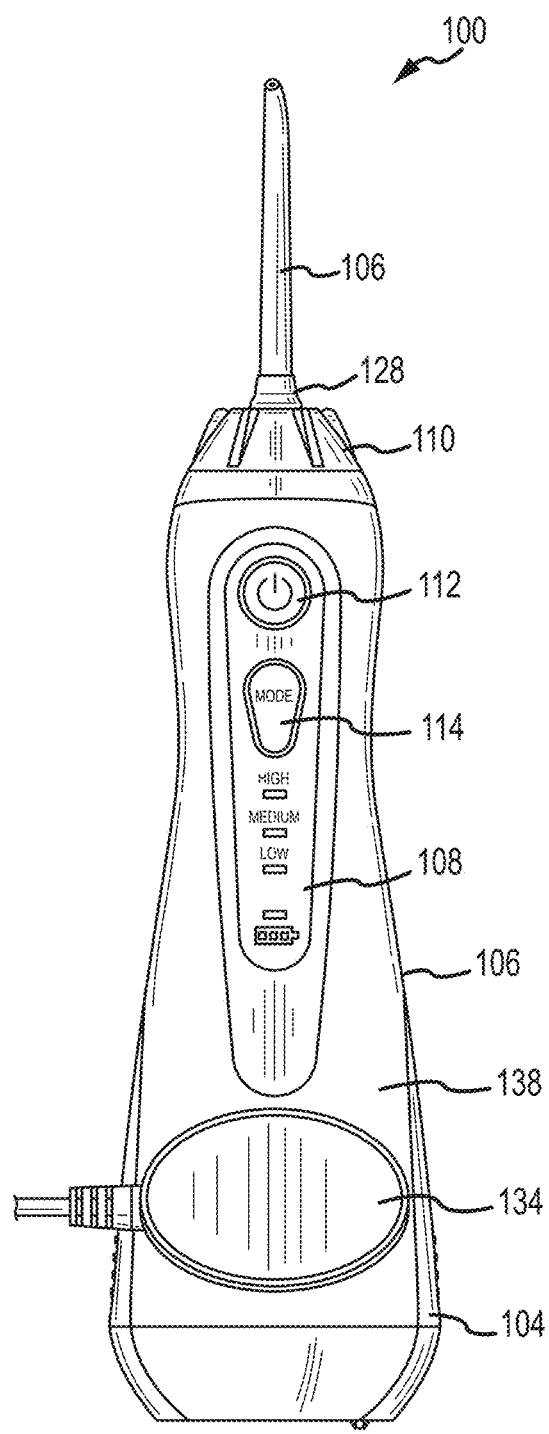
FIG. 2A is a front elevation view of the oral irrigator with a charging unit connected thereto.
Figure 2B:
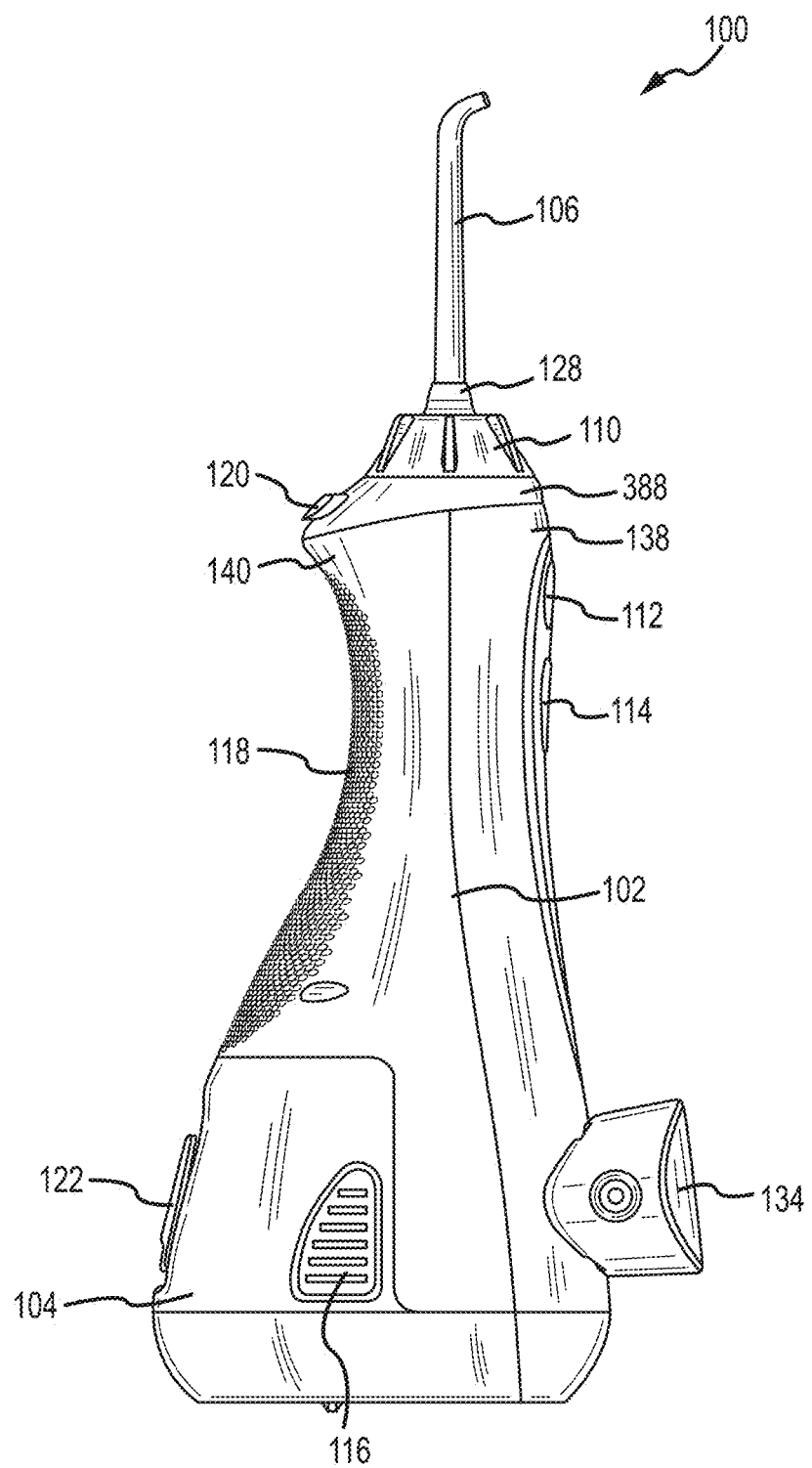
FIG. 2B is a side elevation view of the oral irrigator with the charging unit connected thereto.

Turning to the figures, FIGS. 1A-1C illustrate various views of an oral irrigator 100 in accordance with the present disclosure, FIGS. 2A and 2B illustrate the oral irrigator 100 with a removable charger attached thereto, FIG. 3 is an exploded view of the oral irrigator 100 of FIG. 1A. With reference now to FIGS. 1A-1C, the oral irrigator 100 may include a body 102, a reservoir 104, a tip 106, and a control panel 108. The removable tip 106 connects to the body 102 and is releasable through a tip release button 120. A tip collar 110 may surround the tip 106 at the connection to the body 102. The various components of the oral irrigator will be discussed in more detail below.

The body 102 may be contoured to comfortably fit in the hand of a user. For example, as shown in FIGS. 1A-1C the body 102 may include a broad bottom that tapers upward to form a waist having a smaller diameter than the bottom, the body 102 then expands outwards again to form a top portion. The location of the waist may be selected so as to be about three-quarters of the height from the bottom of the body 102, or in other locations that may be desired or determined comfortable for a user's hand to grip the irrigator 100. The shape of the body 102 may also be selected to be a shape that is aesthetically appealing, while still allowing a user to comfortably grip the body 102.

The body 102 may also include one or more gripping elements. As one example, the body 102 may include a grip surface 118 (see FIG. 10) on a back surface of the body 102. The grip surface 118 includes a plurality of raised ridges, bumps, or other features, that increase the friction coefficient of the body 102 to help a user hold the body 102 without slipping. Other gripping features may be defined on other elements of the irrigator 100, such as the reservoir 104, tip collar 110, and so on, as discussed in more detail below.

With reference to FIG. 3, the body 102 may include a front shell 138 and a back shell 140 that connect together to form the outer housing for the irrigator 100. The two shells 138, 140 may be connected together to define a cavity that receives various internal components of the oral irrigator 100, e.g., the drive assembly and power assembly. The shells 138, 140 may be configured with various internal features that are configured to receive and support various components of the irrigator 100, as well as features that allow the two shells to connect together in a sealing manner. In one embodiment, the front shell 138 may be somewhat longer than the rear shell 140 as the rear shell 140 is shaped to accommodate the reservoir 104. However, in other embodiments, the two shells may be substantially the same length and/or shape.

Figure 4:
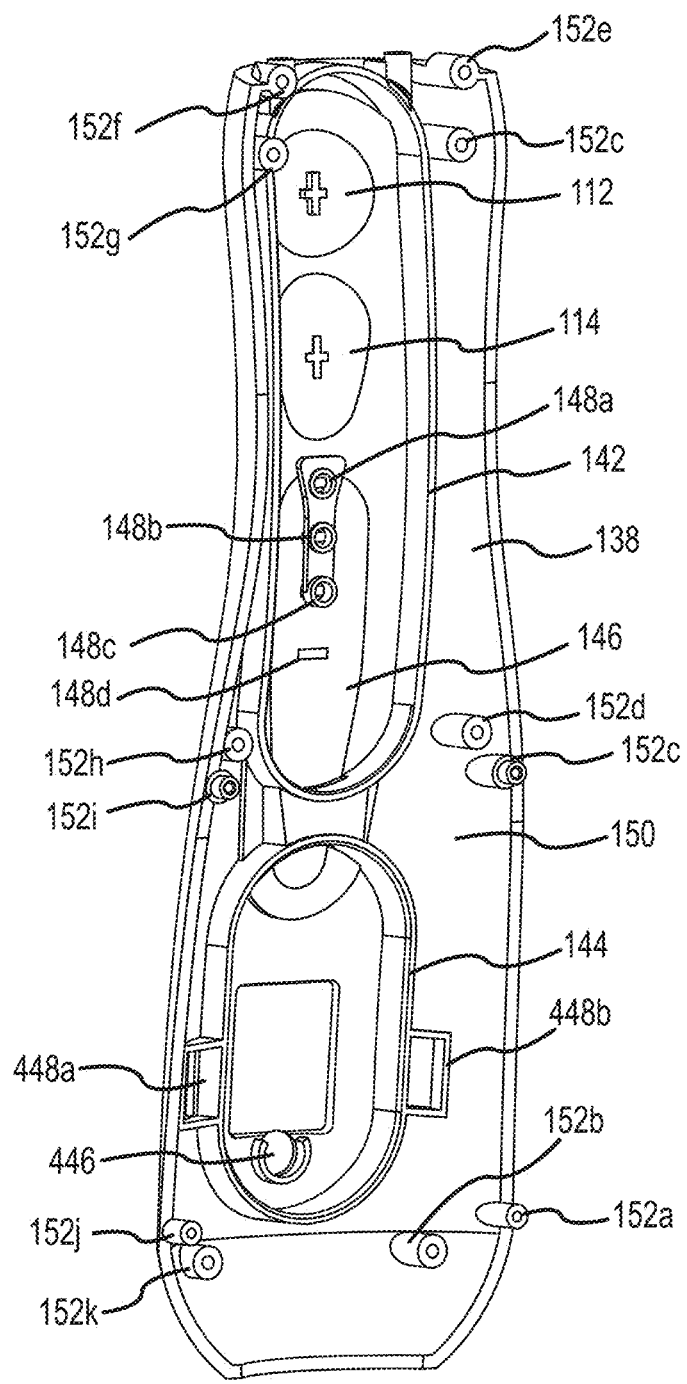
FIG. 4 is a rear isometric view of a front shell for the oral irrigator.

The front shell 138 will now be discussed in more detail. FIG. 4 is a rear isometric view of the front shell 138 of the body 102. With reference to FIGS. 1A, 3, and 4, the front shell 138 may include one or more sealing features 142, 144 extending from an interior surface 150 of the front shell 138. The sealing features 142, 144 may be generally oval shaped and define a compartment for receiving one or more components of the oral irrigator 100, e.g., the control and power assemblies. The sealing features 142, 144 also are configured to accommodate one or more sealing gaskets, such as O-rings or other sealing members, to protect the components positioned within the sealing features 142, 144 from fluid.

The front shell 138 may further include a plurality of connecting posts 152a-152k. The connecting posts 152a-152k may assist in aligning the front shell 138 with the back shell 140 as well as connecting the two shells 138, 140 together. For example, the connecting posts 152a-152k may be configured to align with corresponding posts on the rear shell 140 and receive fasteners, e.g., press fit pins, screws, or other mechanisms, to secure the posts 152a-152k of the front shell 138 with those on the rear shell 140. Some of the connecting posts 152a-152k may instead be used to connect various internal components as well.

With continued reference to FIGS. 1A, 3, and 4, the front shell 138 of the body 102 may also include a window panel 146. The window panel 146 seats within an aperture formed in the front shell 138 and connects along an edge to the front shell 138. Additionally, the front shell 138 includes a plurality of light windows 148a, 148b, 148c, 148d. The light windows 148a, 148b, 148c, 148d may include a transparent material positioned in front or otherwise allow light to be transmitted therethrough. The window panel 146 may be welded ultrasonically to the body 102 once the control assembly and power assembly have been electrically connected together, as discussed in more detail below. Thus, the window panel 146 allows select components of the oral irrigator to be connected together and accessible during assembly, but after assembly, the panel 146 can be ultrasonically welded to the front shell 138 to prevent fluids from leaking into the body 102.

With reference to FIG. 4, the front shell 138 may also include a plurality of cavities to receive one or more magnets which, as described in more detail below, are used to selectively connect the charger to the oral irrigator 100 and/or to activate the charger. For example, a first magnet recess 446 may be defined on an interior of the shell 138 within a portion surrounded by the second sealing feature 144. Two magnet pockets 448a, 448b may be defined on opposing longitudinal sides of the sealing feature 144. It should be noted that the magnet pockets 448a, 448b may be defined in any location as desired, but typically will be located adjacent the location of the power assembly and circuit board 196 (see FIG. 6), so as to align the charger unit 134 with the induction coils and other related components.

The control panel 108 may be connected to the front shell 138 of the body 102. With reference to FIGS. 1A, 2A, and 3, the control panel 108 includes a power button 112 and a mode button 114 that provide an input mechanism to allow a user to operate the oral irrigator 100. The two buttons 112, 114 are connected to and extend away from the front shell 138. The two buttons 112, 114 may be compressed to selectively change a state of the oral irrigator 100, such as turning the irrigator 100 on or off or changing the mode of the irrigator 100, as will be discussed in more detail below. In one embodiment, the buttons 112, 114 are overmolded with the front shell 138, which helps to further waterproof the oral irrigator 100. For example the buttons 112, 114 may be formed of a thermoplastic elastomer material and the front shell 138 may be a thermoplastic material so that when the buttons 112, 114 are molded to the front shell 138 a chemical bond is formed so that the seal between the buttons 112, 114 and the front shell 138 is waterproof. The buttons 112, 114 may also include raised areas that form contacts for switches on the control assembly as will be discussed in more detail below.

Figure 5A:
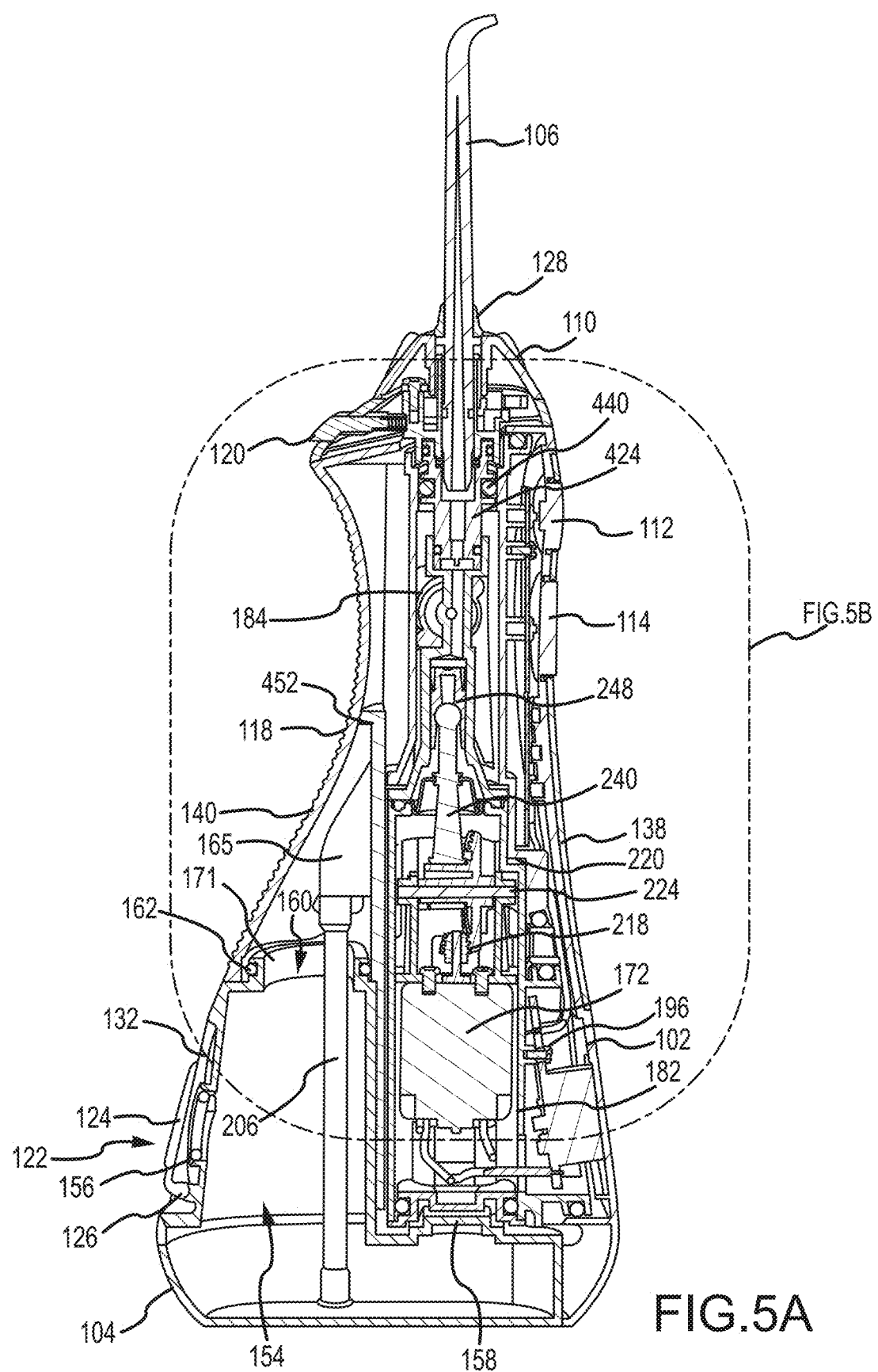
FIG. 5A is a cross-section view of the oral irrigator taken along line 5A-5A in FIG. 1B.
Figure 5B:
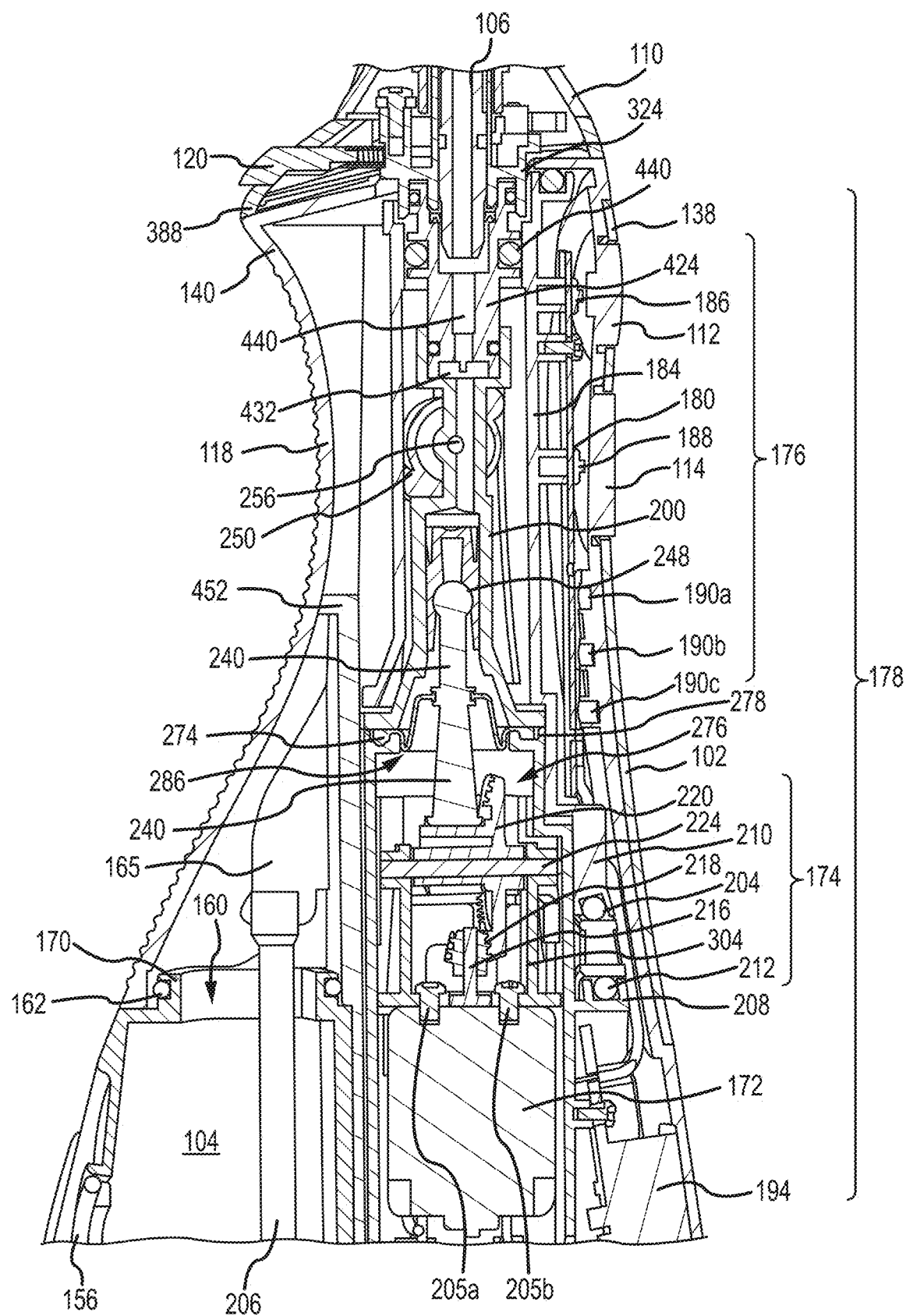
FIG. 5B is an enlarged view of the cross-section view of FIG. 5A.
Figure 25:
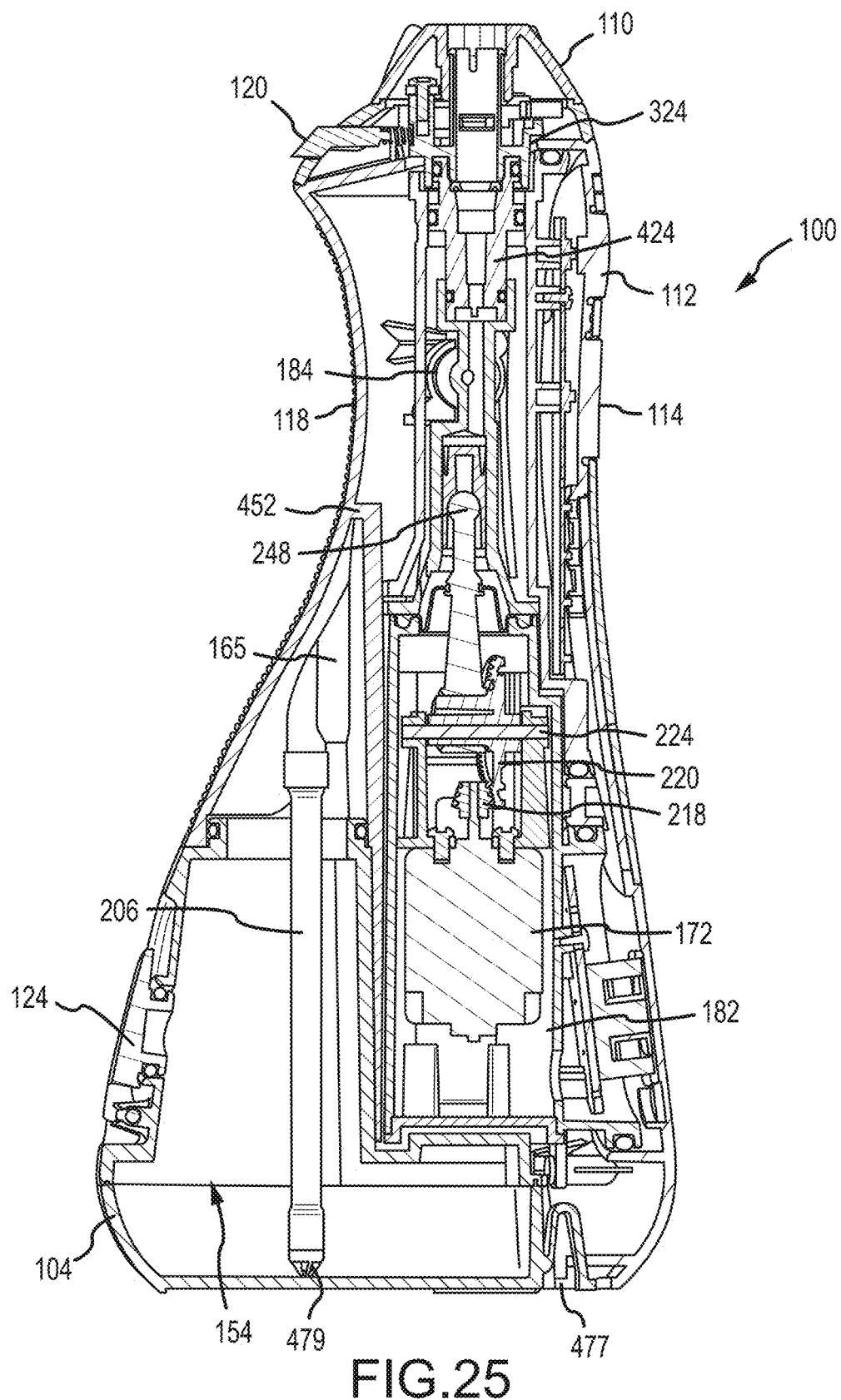
FIG. 25 is a cross-section view of another example of the oral irrigator of FIG. 1 taken along line similar to line 5A-5A in FIG. 1B.

The reservoir 104 of the oral irrigator 100 will now be discussed in more detail. FIG. 5A is a cross-section view of the oral irrigator 100 taken along line 5A-5A in FIG. 1B. FIG. 5B is an enlarged view of FIG. 5A. With reference to FIGS. 1B, 10, 3, 5A, and 5B, the reservoir 104 may be removable from the body 102 or may be formed integrally therewith. In embodiments where the reservoir 104 is removable, the user may refill the reservoir 104 while it is connected to the body 102 through a fill port 122 or may remove the reservoir 104 to refill it through the port or an aperture defined on a top end of the reservoir 104. The reservoir 104 may have a generally L-shape body that defines a fluid cavity 154. The horizontal extension of the reservoir 104 may include a stepped platform 158 extending from the top surface which helps to increase the capacity of the reservoir. In one embodiment, see, e.g., FIG. 25, the reservoir 104 may further include a latch 477 that assists a user in removing the reservoir 104 from the oral irrigator 100.

The refill port 122 is defined as an aperture through an outer sidewall of the reservoir 104. A port recess 132 may surround the refill port 122 and define a generally oval shape recessed compartment in the outer surface of the reservoir 104. A lid 124 is movably connected to the reservoir 104 by a hinge 126. The lid 124 extends over the refill port 122 and includes a flange 164 that is received into the port recess 132. An O-ring 156 (see FIG. 5A) sits around the flange 164 to seal against the walls of the refill port 122.

With reference to FIGS. 3 and 5A, the reservoir 104 may include an outer sidewall 166 with two alignment grooves 168a, 168b (see FIG. 3) defined longitudinally along its height. The top surface of the reservoir 104 defines a main port 160 that is fluidly connected to the reservoir cavity 154. A reservoir lip 170 extends upwards from the top surface of the reservoir 104 and surrounds the main port 160. The main port 160 defines a larger diameter aperture to allow the reservoir 104, when removed, to be filed more quickly than through the refill port 122. Additionally, the main port 160 fluidly connects the rear shell 140 to the reservoir 104.

Figure 6:
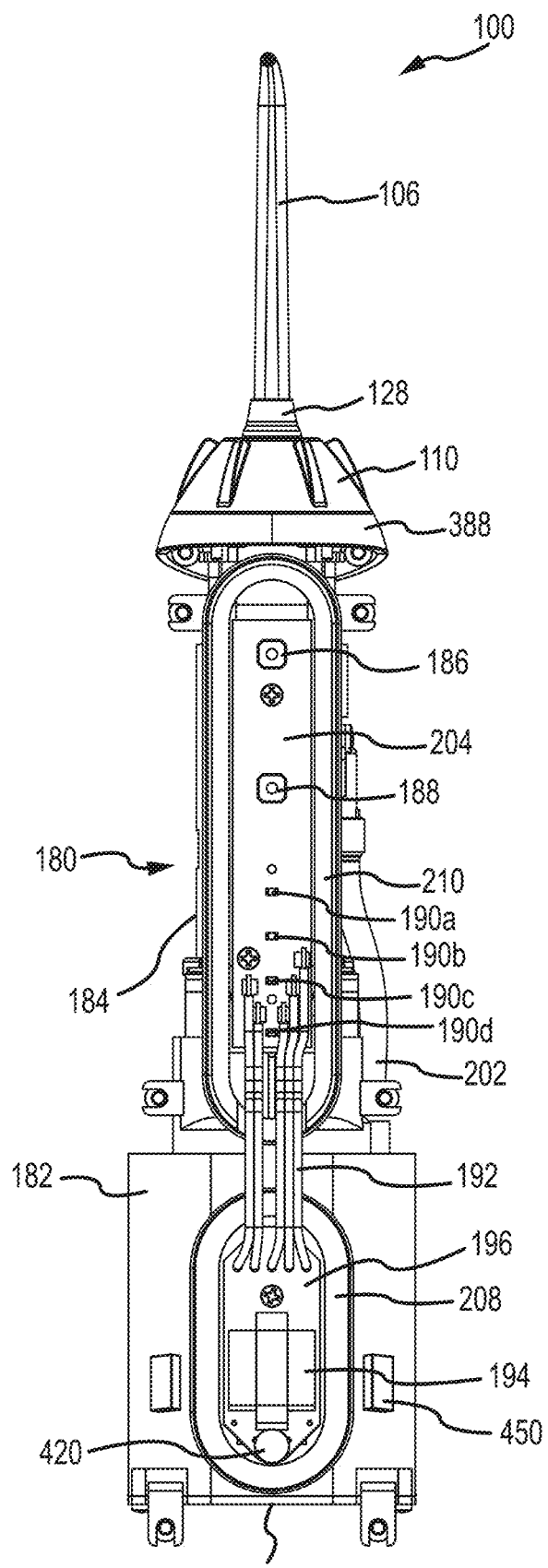
FIG. 6 is a front elevation view of the oral irrigator with select elements removed.

The oral irrigator 100 may further include a reservoir hose 206 that extends into the reservoir 104 from a tube protrusion feature 165 extending from a surface of the rear shell and a tube 202 that fluidly connects a pump body 200 to a reservoir hose 206 (see FIG. 6). With brief reference to FIG. 25, in some embodiments, a filter 479 may be connected to a bottom end of the reservoir hose 206. The filter 479 may filter the fluid from the reservoir 104 prior to the fluid being provided to the tip 106.

With reference to FIG. 1B, the reservoir 104 may also include one or more finger grips 116 defined on the outer surface. The finger grips 116 may be recessed from the outer surface and optionally may include one or more raised elements, such as ridges, that assist a user in griping the reservoir 104. The finger grips 116 assist a user in removing the reservoir 104 from the body 102 and in griping the reservoir 104 when refilling it. It should be noted that in other embodiments, the finger grips 116 may be omitted from the oral irrigator 100 or may be positioned at other locations on the outer surface of the irrigator.

Figure 7:
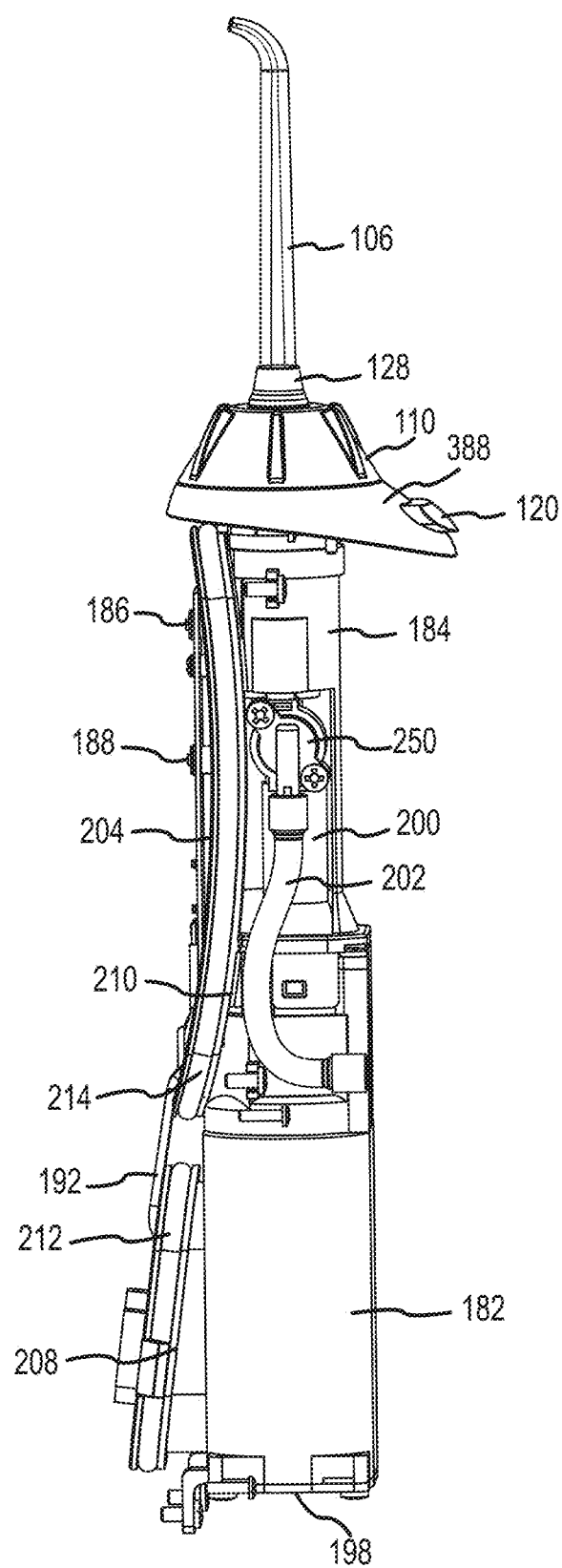
FIG. 7 is a side elevation view of the oral irrigator of FIG. 6.

The internal components of the oral irrigator 100 will now be discussed in more detail. FIG. 6 is a front elevation view of the oral irrigator of FIG. 1A with the front shell 138 and the back shell 140 removed for clarity. FIG. 7 is a side elevation view of the oral irrigator of FIG. 6. With reference to FIGS. 6 and 7, the oral irrigator 100 may include an upper housing 184 and a lower housing 182. The two housings 182, 184 define interior compartments for receiving various elements of the oral irrigator 100, as well as provide a chassis structure for anchoring components to the outer walls thereof. Each of the housings 182, 184 may include a raised flange 208, 210 extending from a sidewall configured to receive a sealing member, such as gaskets 212, 214 or O-rings. The two housings 182, 184 are configured to be connected together and received within the body 102 and act as a chassis for the irrigator, supporting the various components within the body.

Figure 12:
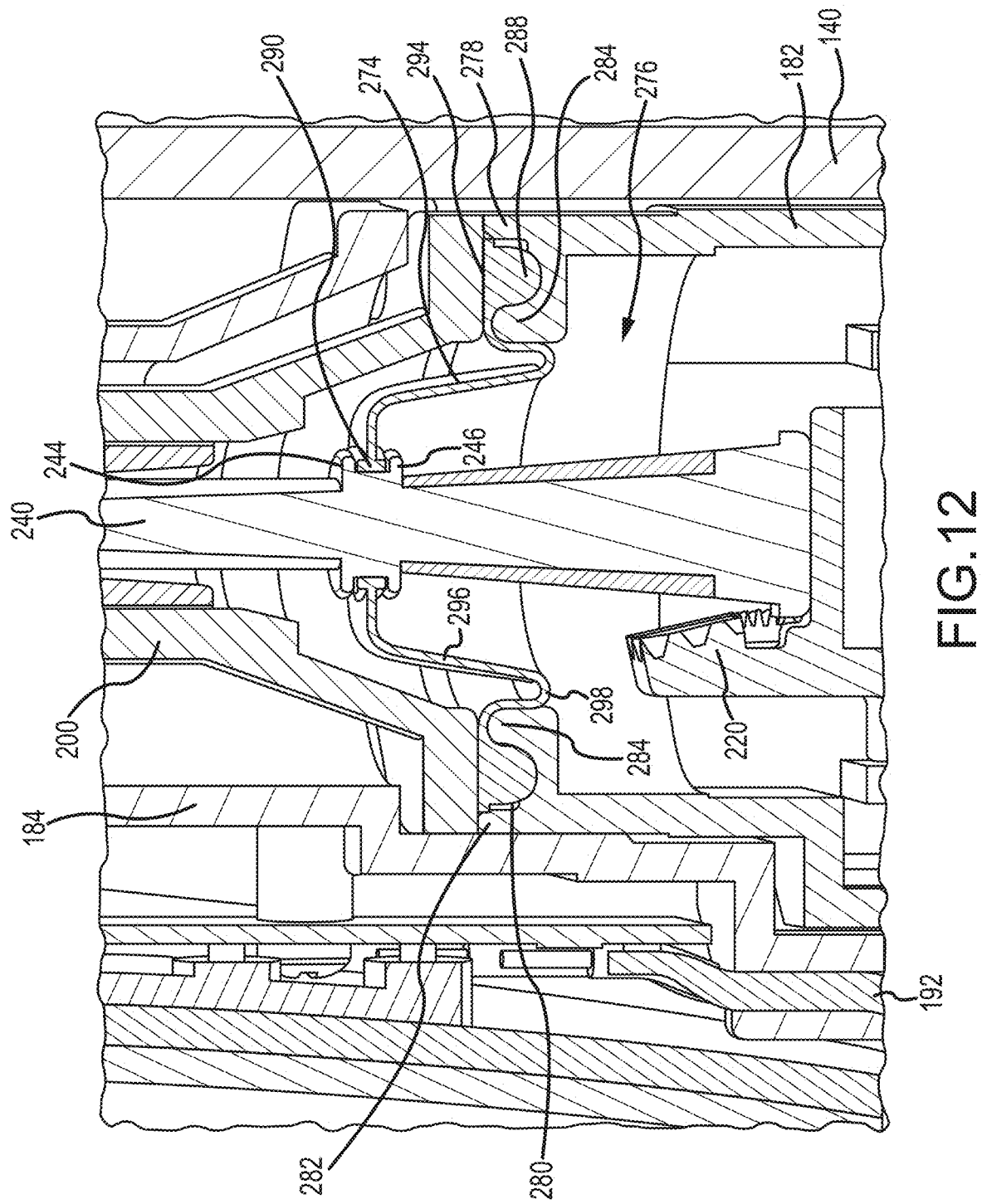
FIG. 12 is an enlarged cross-section view of the oral irrigator similar to FIG. 5A.

With reference to FIGS. 5A, 5B, and 12, the lower housing 182 may define a dry compartment 276 that receives components of the pump assembly 176 and the drive assembly 178. The lower housing 182 may be fluidly sealed from the wet components of the pump assembly 176, discussed in more detail below. The wet and dry compartments may be aligned so as to be generally parallel with one another, which reduces the form factor and diameter of the oral irrigator. The lower housing 182 includes a sealing end 278 defined on a terminal end of the lower housing 182. The sealing end 278 includes an annular groove 280 defined in a top surface thereof. The annular groove 280 defines an outer wall 282 and an inner wall 284 on the sealing end 278 of the lower housing 182. The sealing end 278 further defines a rod aperture 286 extending through the top surface thereof and in communication with the dry compartment 276 of the lower housing 182.

With continued reference to FIG. 5B, the oral irrigator 100 may also include a drive mount 304. The drive mount 304 is configured to support the motor 172 and other components of the drive assembly 178 as discussed in more detail below. The drive mount 304 may be a somewhat rigid member received within the lower housing 182 and secured thereto. In other embodiments, the drive mount 304 may be omitted and the lower housing 182 may include integral features that may be used to secure the motor 172 to the lower housing 182.

With reference again to FIG. 6, the oral irrigator 100 may include a first circuit board 204 having a power switch 186, a mode switch 188, a plurality of indicator lights 190a, 190b, 190c, 190d and may include a processing element, such as a microprocessor. The power switch 186 and the mode switch 188 are selected by the user to selectively activate the irrigator 100 and to change the mode of the irrigator 100, respectively. The indicator lights 190a, 190b, 190c, 190d, illuminate and/or vary an emitted light color to indicate a change in status of the irrigator 100. The indicator lights 190a, 190b, 190c, 190d may be light emitting diodes, organic light emitting diodes, or substantially any other type of light emitting component.

The oral irrigator 100 may include a second circuit board 196 in electrical communication with the first circuit board 204 via a plurality of connection wires 192. The second circuit board 196 may include a secondary coil assembly 194 and other components, such as one or more electrical components (e.g., capacitors, resistors, microprocessor, or the like), for charging the oral irrigator 100, discussed in more detail below.

Drive and Pump Assemblies

Figure 8A:
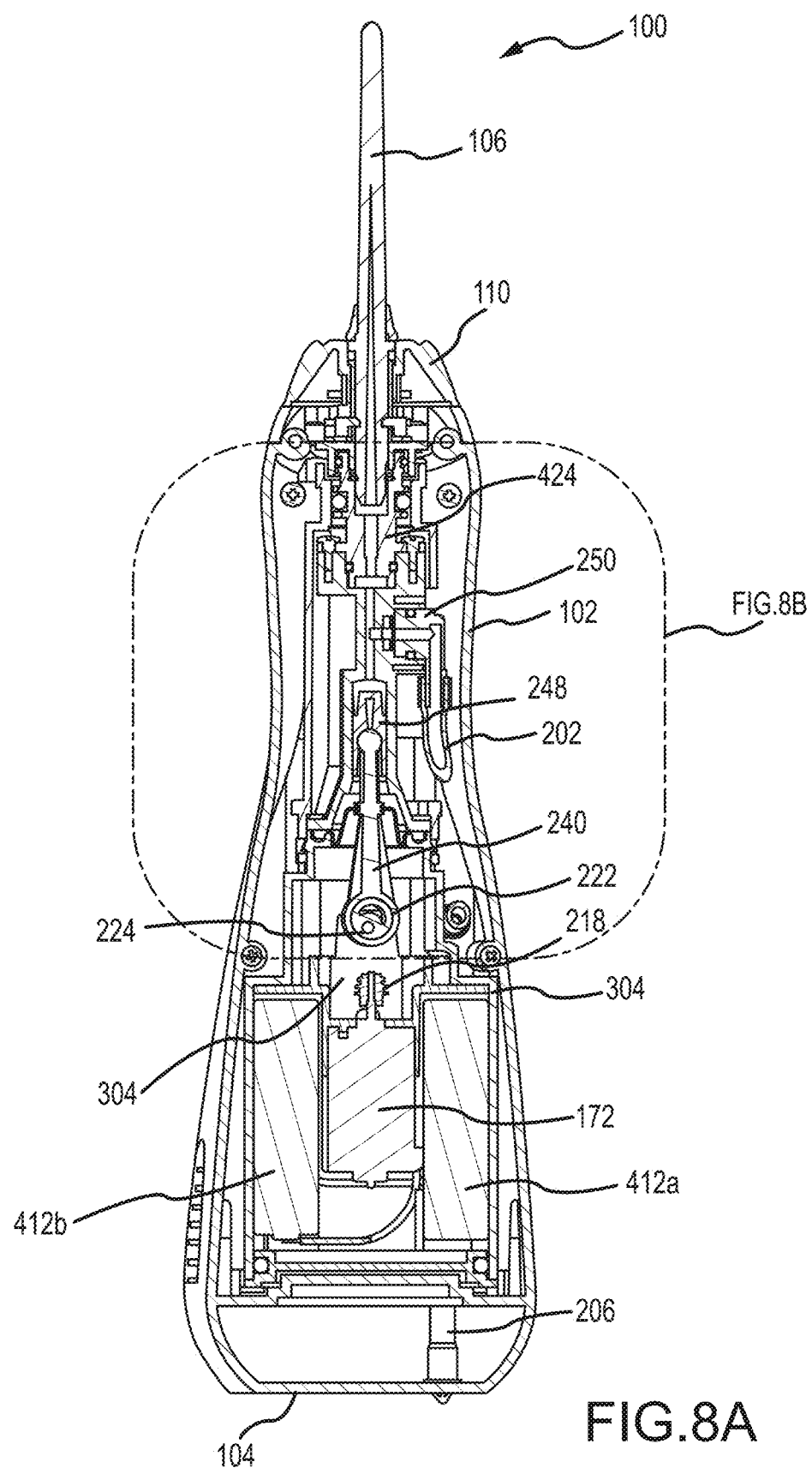
FIG. 8A is a cross-section view of the oral irrigator taken along line 8A-8A in FIG. 1A.
Figure 8B:
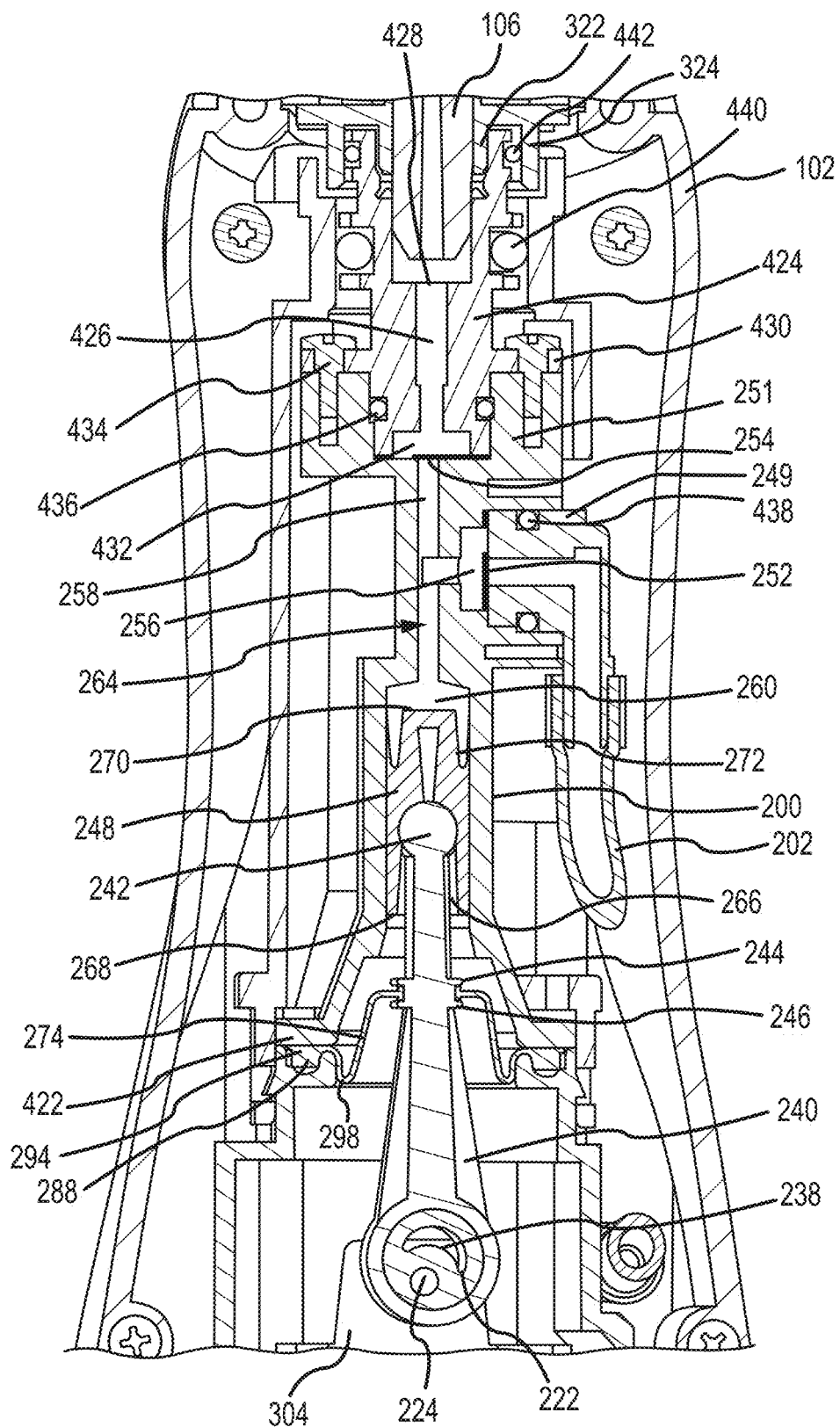
FIG. 8B is an enlarged view of the cross-section view of FIG. 8A.
Figure 9:
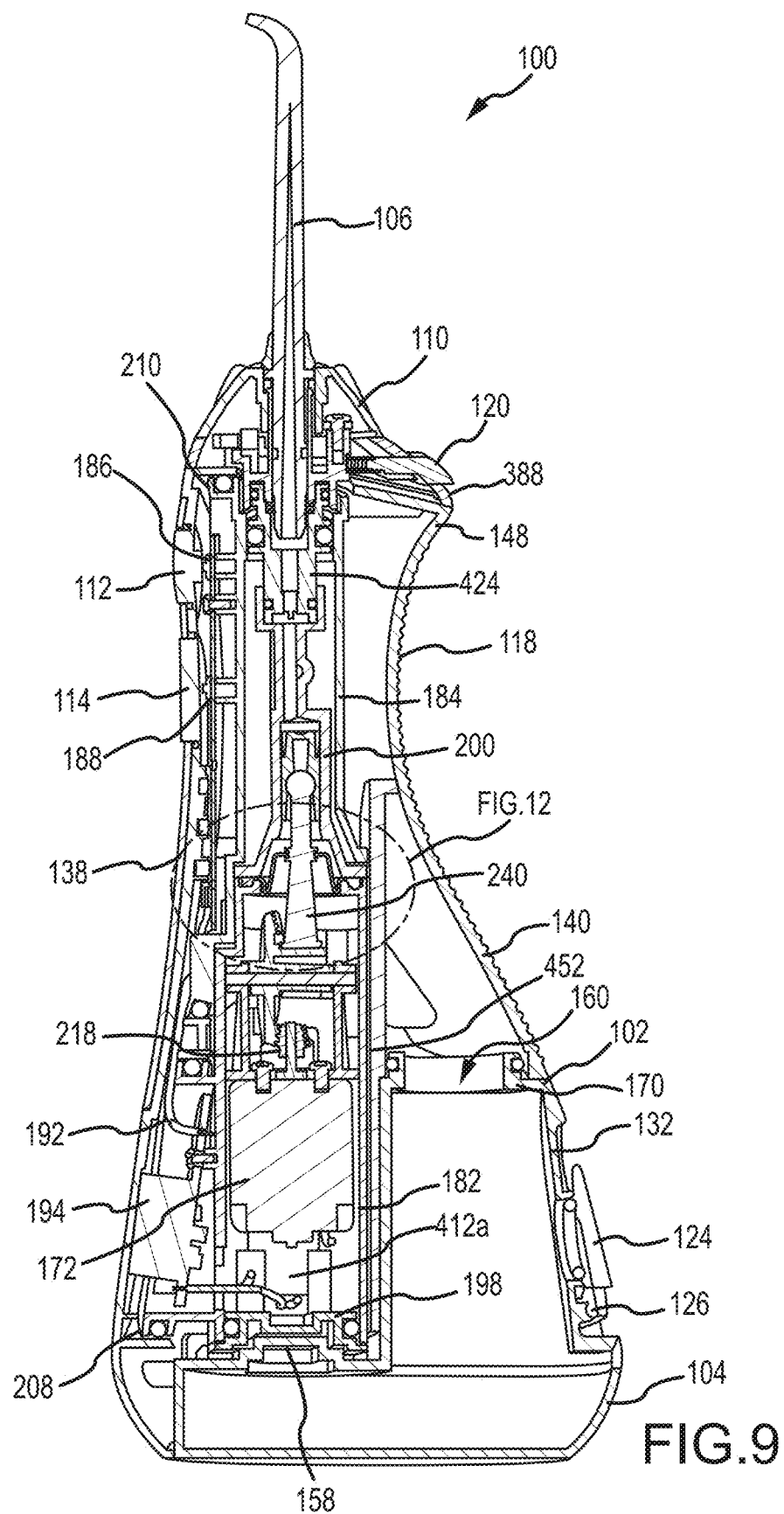
FIG. 9 is a cross-section view of the oral irrigator taken along line 9-9 in FIG. 10.
Figure 10A:
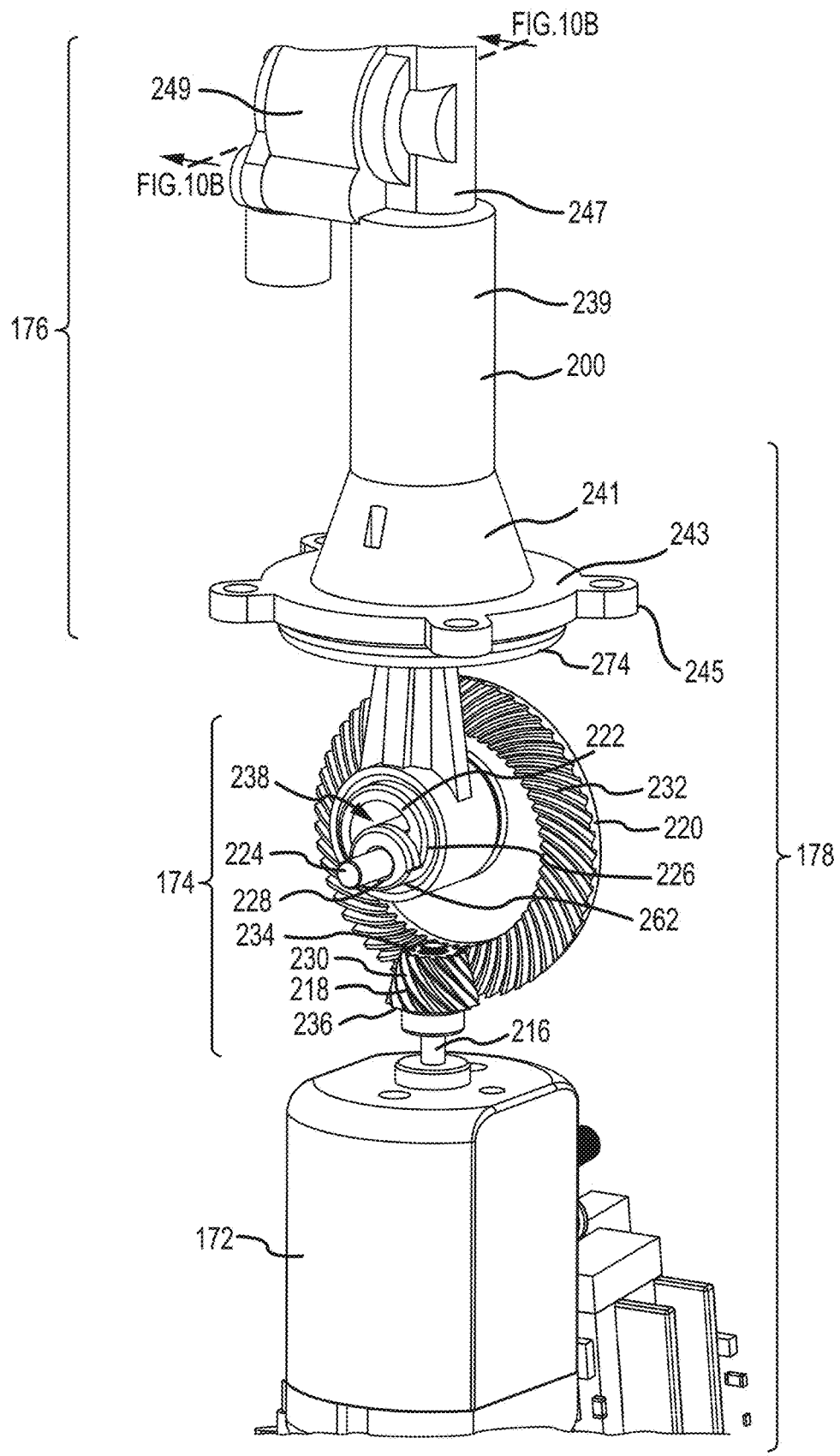
FIG. 10A is an isometric view of the drive assembly and the pump assembly with certain elements removed from clarity.
Figure 10B:
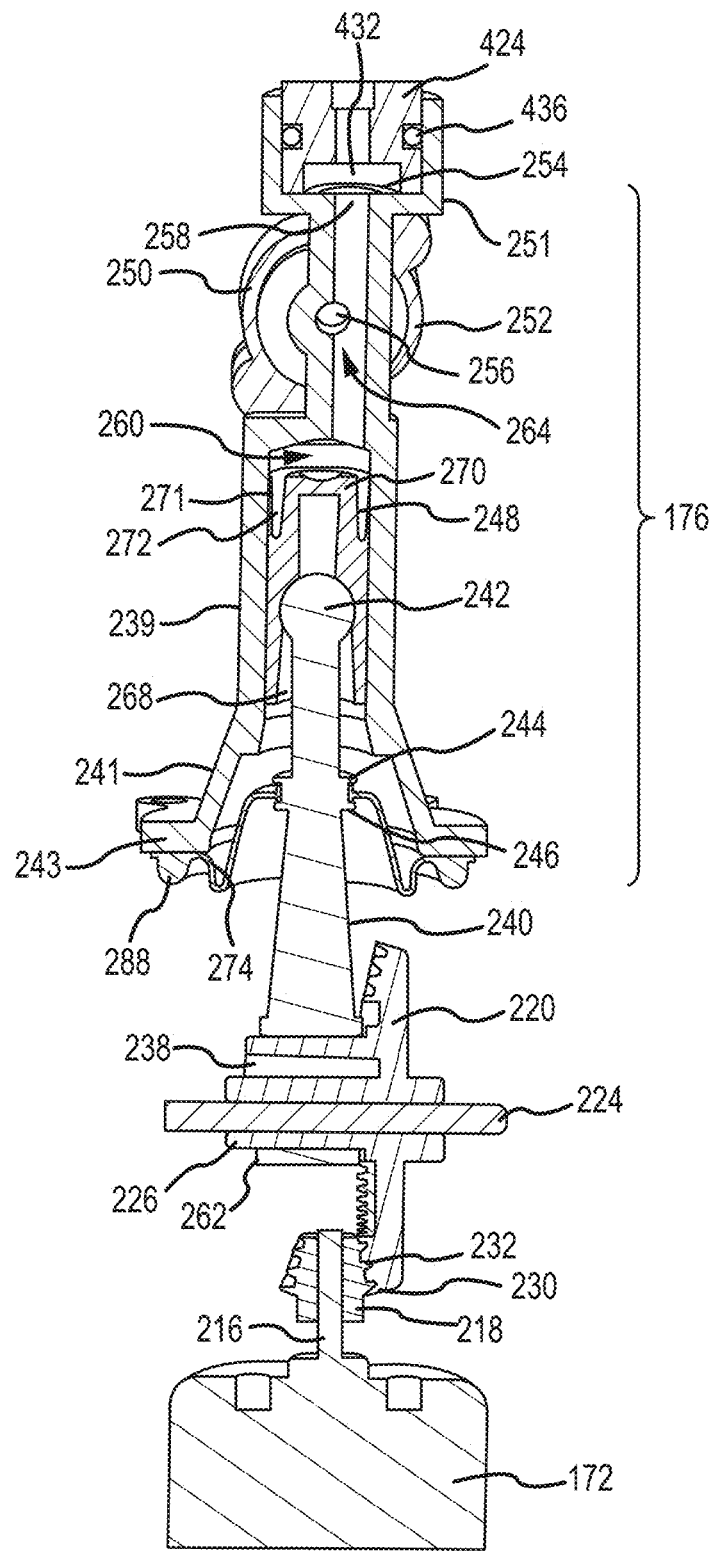
FIG. 10B is a cross-section view of the drive and pump assemblies taken along line 10B-10B in FIG. 10A.

The drive assembly 178 will now be discussed in more detail. FIG. 8A is a cross-section view of the oral irrigator taken along line 8A-8A in FIG. 1B. FIG. 8B is an enlarged view of the oral irrigator of FIG. 8A. FIG. 9 is a cross-section of the oral irrigator taken along line 9-9 in FIG. 10. FIG. 10A is an isometric view of the drive assembly with select elements removed for clarity. FIG. 10B is a cross-section view of the drive assembly taken along line 10B-10B in FIG. 10A. With reference to FIGS. 8A-10B, the drive assembly 178 is configured to pump fluid from the reservoir 104 to the tip 106. The drive assembly 178 may include a pump assembly 176, a motor 172, and a linkage 174 interconnected between the pump assembly 176 and the motor 172.

The motor 172 includes a drive shaft 216 connected thereto which is rotatably driven by the motor 172. The motor 172 may be any type of suitable motor depending on the desired output of the oral irrigator. The linkage 174 or transmission includes a drive or pinion gear 218, a driven gear 220, and a gear pin 224. As will be discussed in more detail below, the linkage 174 transforms the rotational movement of the drive shaft 216 to longitudinal movement of a piston of the pump assembly 176.

The pinion gear 218 includes a plurality of gear teeth 230 on an outer surface or engagement surface thereof. The gear teeth 230 are spiral shape and extend along a curve from a top edge 234 of the outer surface to a bottom edge 236 of the outer surface. In other words, rather than extending in a substantially straight line, the gear teeth 230 wrap around a portion of the outer perimeter of the pinion gear 218. Additionally, the pinon gear 218 may include a frustum or conical shape having a larger bottom end diameter than a top end diameter, i.e., the pinon gear may have a tapered shape that narrows towards the top end of the component. The shape of the pinion gear may allow the gear teeth to mesh as desired with the driven gear.

The driven gear 220 may be oriented at substantially a 90 degree angle with respect to the pinion gear 218. The driven gear 220 includes a plurality of gear teeth 232 extending outwards from an engagement surface of the driven gear 220. In some embodiments, the gear teeth 232 may also extend outwards relative to the center of the driven gear 220 such that the outer perimeter of the gear 220 expands from the beginning of the teeth to an end point of the teeth. The gear teeth 232 are configured to mesh with the gear teeth 230 of the pinion gear 218. Similar to the pinion gear 218, the gear teeth 232 of the driven gear 220 may be helically shape and may extend at a curve from the interior of the driven gear 220 towards an outer edge of the driven gear 220. In this manner, the gear teeth 232 start and end at an angle with respect to each other.

In other examples, the gears 218, 220 may be hypoid gears having curved teeth, but with shaft axes that are offset from one another. Also, it should be noted that in some embodiments, different types of gears may be used together. For example, the pinion gear 218 may be a helical gear whereas the driven gear 220 may be a face gear.

The driven gear 220 may also include an eccentric shaft 226 including a cam surface 222 and a gear pin aperture 228 defined through a center of the driven gear 220. The eccentric shaft 226 is offset from a center (and gear pin aperture) of the driven gear 220, the offset depends on the desired fluid pressure delivery, the pump characteristics, and/or the rotational speed of the motor 172. For example, as shown in FIG. 10B, the eccentric shaft 226 may be positioned closer to one edge of the driven gear 220 to define the eccentricity. The eccentric shaft 226 may include a crescent shaped opening 238 therethrough. The crescent shaped opening 238 assists in controlling the rotational inertia of the driven gear 220 as it rotates by reducing the total inertia of the gear, as well as simplifies the manufacture of the gear 220 and reduces material costs. The pin aperture 228 receives the gear pin 224 and is used to secure the driven gear 220 in position and forms an axle about which the gear rotates. The eccentric shaft 226 may be formed integrally with the driven gear 220 or may be a separate component connected thereto. Typically, the eccentric shaft 226 will have a larger width than the width of the driven gear 220.

With reference to FIGS. 8B, 10A, and 10B, the pump assembly 176 will now be discussed. The pump assembly 176 may include a pump body 200, a connecting rod 240, a piston 248, an inlet valve body 250 having an inlet reed valve 252, and an outlet valve body 424 having an outlet reed valve 254. The pump assembly 176 is driven by the drive assembly 178 to pump fluid from the reservoir 104 to the tip 106.

The connecting rod 240 or piston rod is driven by the driven gear 220 and connects to the piston 248. The connecting rod 240 may include a ball 242 on a first end and a gear aperture 262 on a second end. The gear aperture 262 is defined by a cylindrical wall extending from the second end of the connecting rod 240 and is configured to be placed around the eccentric shaft 226 of the gear. The gear aperture 262 includes a radius that substantially matches a radius of the eccentric shaft 226 of the driven gear 220 so as to form a tight connection with the eccentric shaft 226, such that the connecting rod will move with the eccentric shaft rather than rotate about the connecting shaft. The connecting rod 240 may include a first securing rib 244 and a second securing rib 246 spaced apart from and below the first securing rib 244 along the shaft of the connecting rod 240. The two ribs 244, 246 extend around an outer perimeter of the connecting rod 240 shaft and are annular shaped following the outer surface of the connecting rod. The two ribs 244, 246 may be positioned in the middle or upper portion of the connector rod 240. In other embodiments, the connecting rod 240 may include other types of securing features, other than ribs, such as, but not limited to, protrusions, nubs, apertures, fasteners, adhesive, or the like.

The pump body 200 defines a volume as pump chamber 260 for receiving fluid from the reservoir and is configured to receive the piston 248 and a portion of the connecting rod 240. The pump body 200 includes a pump inlet 256 and a pump outlet 258 arranged substantially perpendicularly to the pump inlet 256. The pump body 200 includes a piston section 239 having a substantially cylindrical shape that terminates in a receiving section 241 having a frustum shape terminating in a connecting flange 243. The connecting flange 243 forms the bottom end of the pump body 200 and includes a plurality of fastening brackets 245 configured to receive fasteners that secure the pump body 200 to the lower housing. The connecting flange 243 also acts to better seal the pump chamber and fluid passageways within the pump.

The top end of the pump body 200 includes a pump head 247 defining the pump inlet 256 and pump outlet 258, optionally, the pump head 247 includes a connecting portion that receives one or more fasteners to secure the top end of the pump body 200 to the outlet valve body 424. A valve receiving section 251 is defined on a top end of the pump head 247 and defines a valve chamber for receiving an outlet valve. The valve receiving section 251 may include a cylindrical wall extending upwards from a bottom wall that defines the outlet 258. Below and oriented perpendicular to the pump outlet, an inlet valve receiving section 249 is formed on the side of the pump head 247. The inlet valve receiving section 249 is configured to receive and connect to the inlet valve 250. For example, the inlet valve receiving section 249 may include a wall structure that mates with or receives the inlet valve 250 to fluidly connect the valve to the inlet of the pump. The pump body 200 is configured to have a pump chamber and other components that are substantially aligned with one another to allow the oral irrigator to have a smaller diameter and thus easier to be held by users having smaller hands (e.g., children).

A pump fluid passage 264 is defined within the pump body 200 and fluidly connects the pump inlet 256 to a pump chamber 260 and fluidly connects the pump chamber 260 to the pump outlet 258. In one embodiment, the fluid passageway 264 extends longitudinally along a length of the pump body 200 and the pump chamber 260 is located at a first end of the fluid passageway 264 and the pump outlet 258 is located at a second end of the fluid passageway 264 with the pump inlet 256 being positioned between the pump chamber 260 and the pump outlet 258. In this embodiment, the pump inlet 256 may define an intersection in the fluid passageway 264 creating a T-shape lumen through the pump body 200. In this example, the pump inlet 256 is substantially perpendicularly oriented relative to the pump outlet and pump chamber 260. Additionally, in some embodiments, the pump inlet 256 may be positioned lower on the pump body 200 as compared to the pump outlet which is formed at the top end of the pump body 200, such that as fluid is pumped out of the pump body 200, the fluid passes the fluid inlet into the pump body 200.

The inlet reed valve 252 is positioned in or on the inlet valve body 250 at the pump inlet 256. The inlet reed valve 252 is selectively opened and closed to regulate the flow of fluid to and from the pump body 200. The inlet reed valve 252 includes a flap that opens inwards toward the fluid passageway 264 of the pump body 200. The outlet reed valve 254 is positioned on top of the pump outlet 258 and selectively controls flow into and out of the pump body 200. The outlet reed valve 254 may be substantially similar to the inlet reed valve 252 and may include a flap that opens outwards away from a top end of the pump body 200. Operation of the reed valves will be discussed in more detail below during a discussion of the operation of the oral irrigator 100. Other types of inlet and outlet one-way valves may be used as well.

With reference to FIGS. 8B and 10B, the piston 248 has a generally cylindrically shaped body with a rod cavity 266 defined on a bottom end 268 and configured to receive a portion of the connecting rod 240. The piston 248 also includes a sealed top end 270 forming a pedestal with an annular groove 272 defined on the top surface. The groove 272 defines a flexible top wall 271 for the piston that expands outwards to form a seal against the internal walls of the pump, while still allowing the piston to move smoothly within the pump, as discussed in more detail below. The piston 248 is configured to selectively pull and push fluid within the pump body 200 as it is moved by the connecting rod 240. In some embodiments, the piston may have a diameter that varies in shape along its length, the shape is selected based on the shape of the pump body and allows the piston to seal against the walls of the pump, while still move within the pump.

With reference to FIGS. 7 and 8B, the inlet valve body 250 may be substantially cylindrically shaped having an integrated tube or a tube connector extending downward perpendicularly from the top surface. The inlet valve body 250 defines a fluid passageway that is in selective communication with the pump fluid passageway 264. The inlet valve body 250 may also include fastening apertures to receive fasteners to secure the inlet valve body 250 to the pump body 200.

The outlet valve body 424 may be a somewhat tube shaped member having a plurality of grooves and flanges defined an outer surface thereof, as shown in FIG. 8B. The outlet valve body 424 may define a main outlet pathway 426 that is fluidly connected to an inlet chamber 432 fluidly connected to the pump outlet 258. The inlet chamber 432 may have a larger diameter than the outlet pathway 426. The outlet pathway 426 varies in diameter along its length and at top end expands outward to form the tip cavity 428 that is configured to receive a portion of the tip 106. The annular grooves on the outer surface of the outlet valve body 424 may be configured to receive one or more sealing members 436, 440, 442, such as O-rings, seal-cups, or the like. Additionally, a bottom end of the outlet valve body 424 may include a flange 430 that is used to secure to the outlet valve body 424 to the pump body 200 as will be discussed below.

Figure 11A:
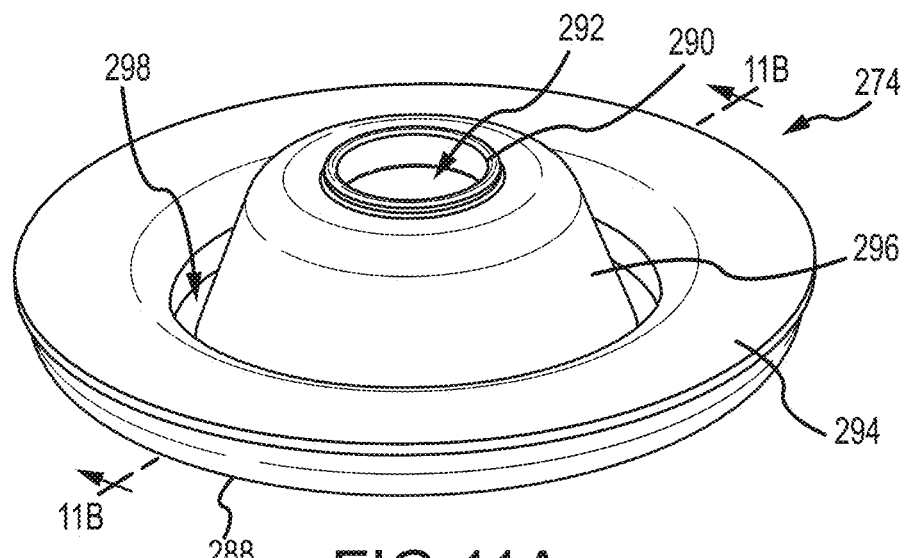
FIG. 11A is a top isometric view of a diaphragm seal of the oral irrigator.
Figure 11B:
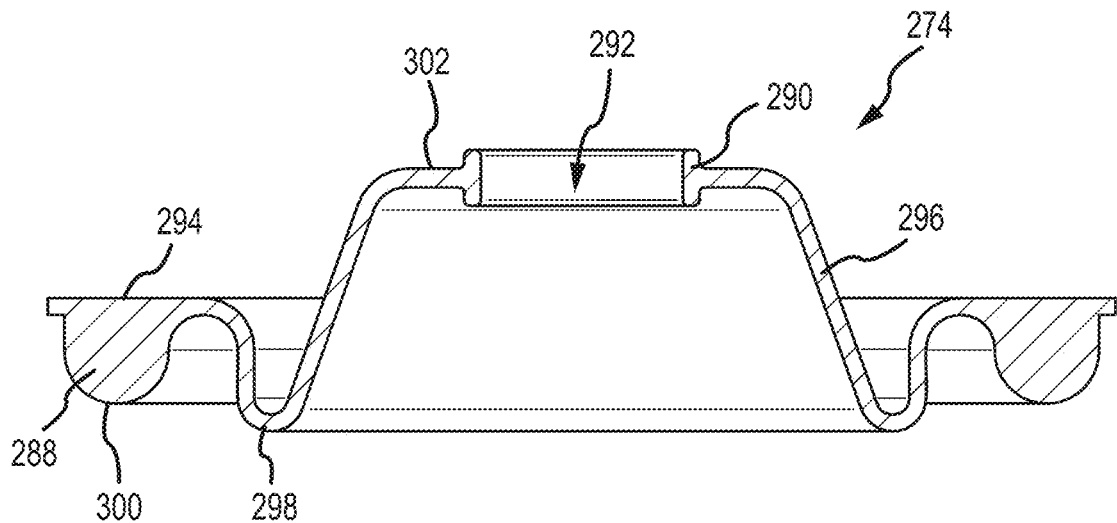
FIG. 11B is a cross-section view of the diaphragm seal taken along line 11B-11B in FIG. 11A.

The oral irrigator 100 may also include one or more sealing members that seal the pump from the electrical components of the power assembly. FIG. 11A is a top isometric view of a diaphragm seal for the oral irrigator. FIG. 11B is a cross-section view of the diaphragm seal taken along line 11B-11B in FIG. 11A. FIG. 12 is an enlarged view of a portion of FIG. 9. With reference to FIGS. 11A-12, the oral irrigator 100 may include a diaphragm seal 274 that seals the pump assembly 176 from the lower housing 182. The diaphragm seal 274 may be formed of a flexible and waterproof material. For example, in some embodiments the diaphragm seal 274 may be elastomeric, rubber (one example being nitrile butadiene rubber), or a thermoplastic elastomer (TPE). In embodiments where the diaphragm seal 274 is a TPE material, the seal may be overmolded to one or more components of the pump assembly 176, such as to the connecting rod and/or lower housing, as discussed in more detail below.

The diaphragm seal 274 includes a seal top surface 302 with a rod aperture 292 defined through a center thereof. The seal top surface 302 extends radially outwards from the rod aperture 292 and then downwards at an angle to define a flexible skirt 296. The skirt 296 may be conical or frustum shaped and may define a hollow space in the seal 274. The skirt 296 is flexible and is configured to deform and resiliently return to its original shape. At a bottom end of the skirt 296, a crease 298 or bend is defined as the diaphragm seal 278 extends back upwards and outwards. As will be discussed in more detail below, the depth of the crease 298 varies as the seal is deformed during operation of the pump. A beaded flange 288 extends radially outwards from a top end of the crease 298. The beaded flange 288 has a substantially flat top surface 294 while the bottom surface 300 is convexly curved forming an annular bead on the bottom surface. The top surface 294 may be substantially flat and configured to be received between the pump body and the lower housing 182.

With continued reference to FIGS. 11A-12, the diaphragm seal 274 further includes an engagement wall 290 surrounding and defining the rod aperture 292. The engagement wall 290 forms a sidewall conforming to the shape of the rod aperture 292 and extends partially above the seal top surface 302 and extends partially into the hollow space defined by the flexible skirt 296. In this manner, the engagement wall 290 defines a cylindrically shaped flange that is seated within the rod aperture 292.

Figure 11C:
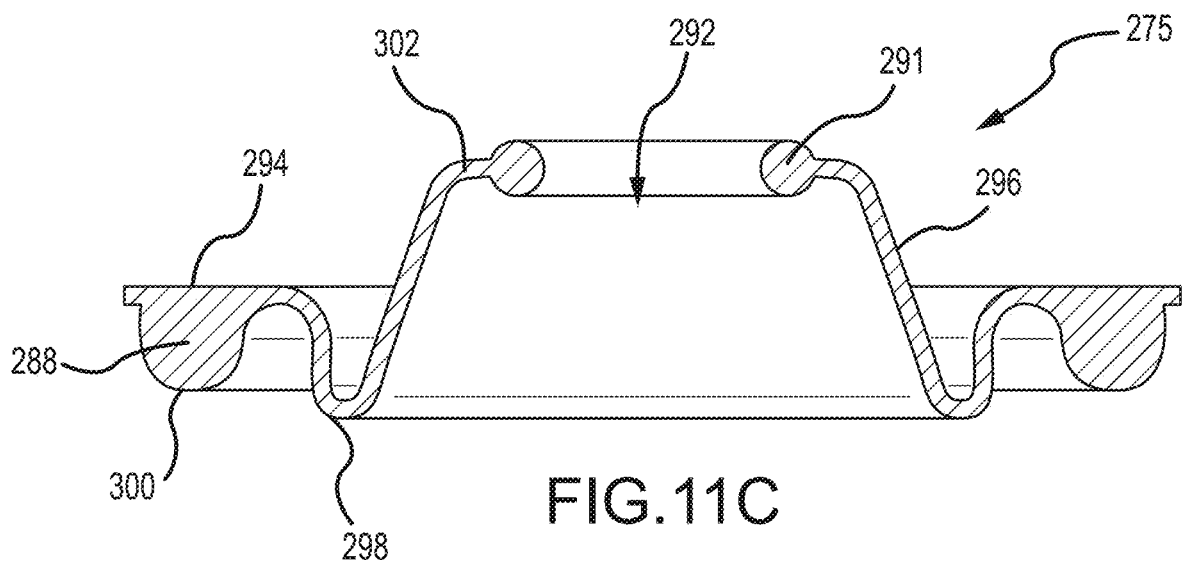
FIG. 11C is a cross-section view of a diaphragm seal included a beaded engagement wall taken along a line similar to 11B-11B in FIG. 11A.

In the embodiment shown in FIGS. 11A-12, the engagement wall 290 of the diaphragm seal 274 is a cylindrically shaped flange. However, in other embodiments, the engagement wall 290 may take other forms, in order to create a better seal and/or match the configuration of the connecting rod. FIG. 11C illustrates a cross-section view of another example of the diaphragm seal 274. With reference to FIG. 11C, the diaphragm seal 275 may be substantially the same as the diaphragm seal 274 of FIGS. 11A and 11B. However, in this example, the engagement wall 291 is a bead extending around and defining the rod aperture 292. In particular, the engagement wall 291 bead includes a rounded outer surface, similar to an O-ring, rather than the relatively straight edges of the engagement wall 290.

Tip Latch Assembly

Figure 13A:
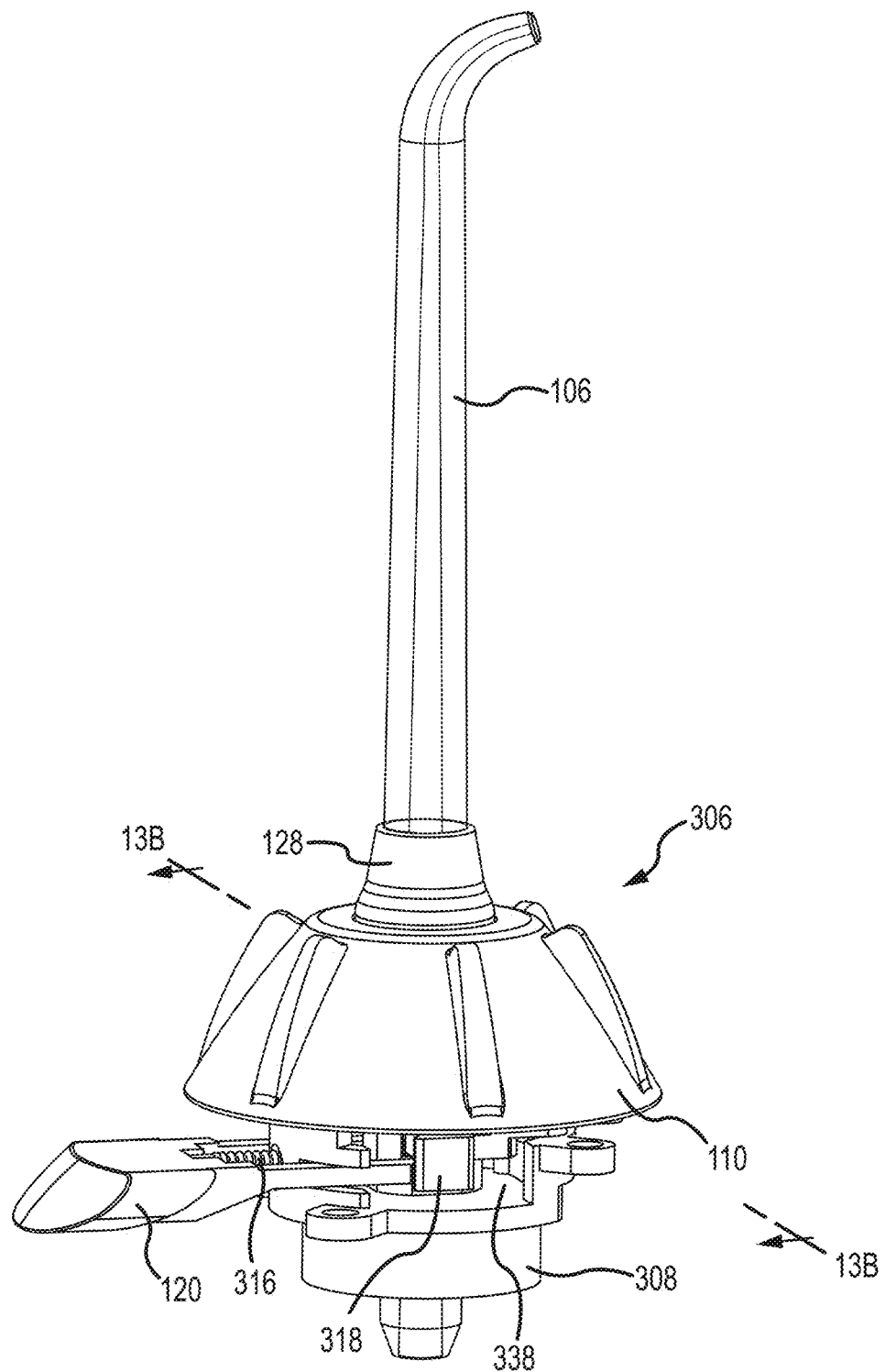
FIG. 13A is an isometric view of a tip latch assembly for the oral irrigator.
Figure 13B:
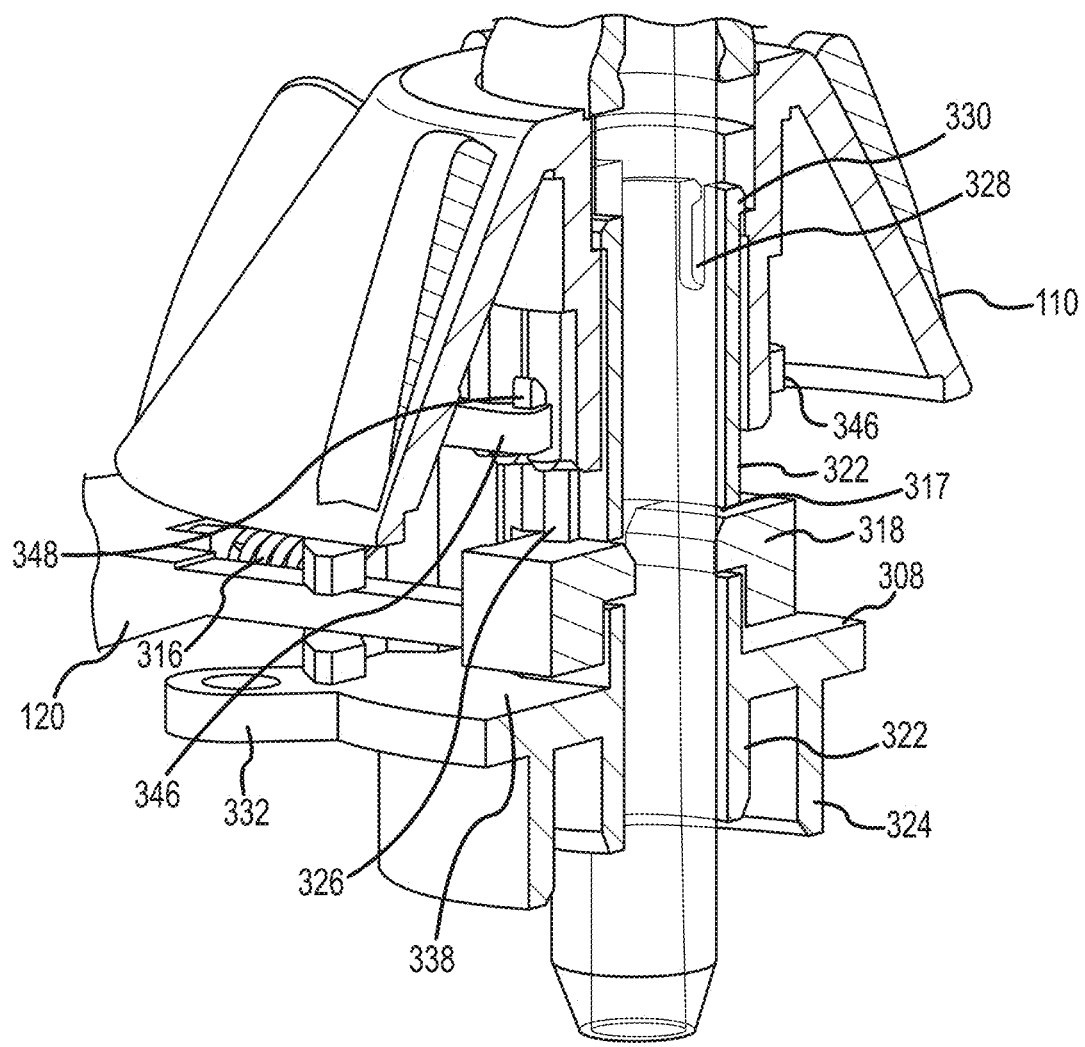
FIG. 13B is a cross-section view of the tip latch assembly taken along line 13B-13B in FIG. 13A.
Figure 14:
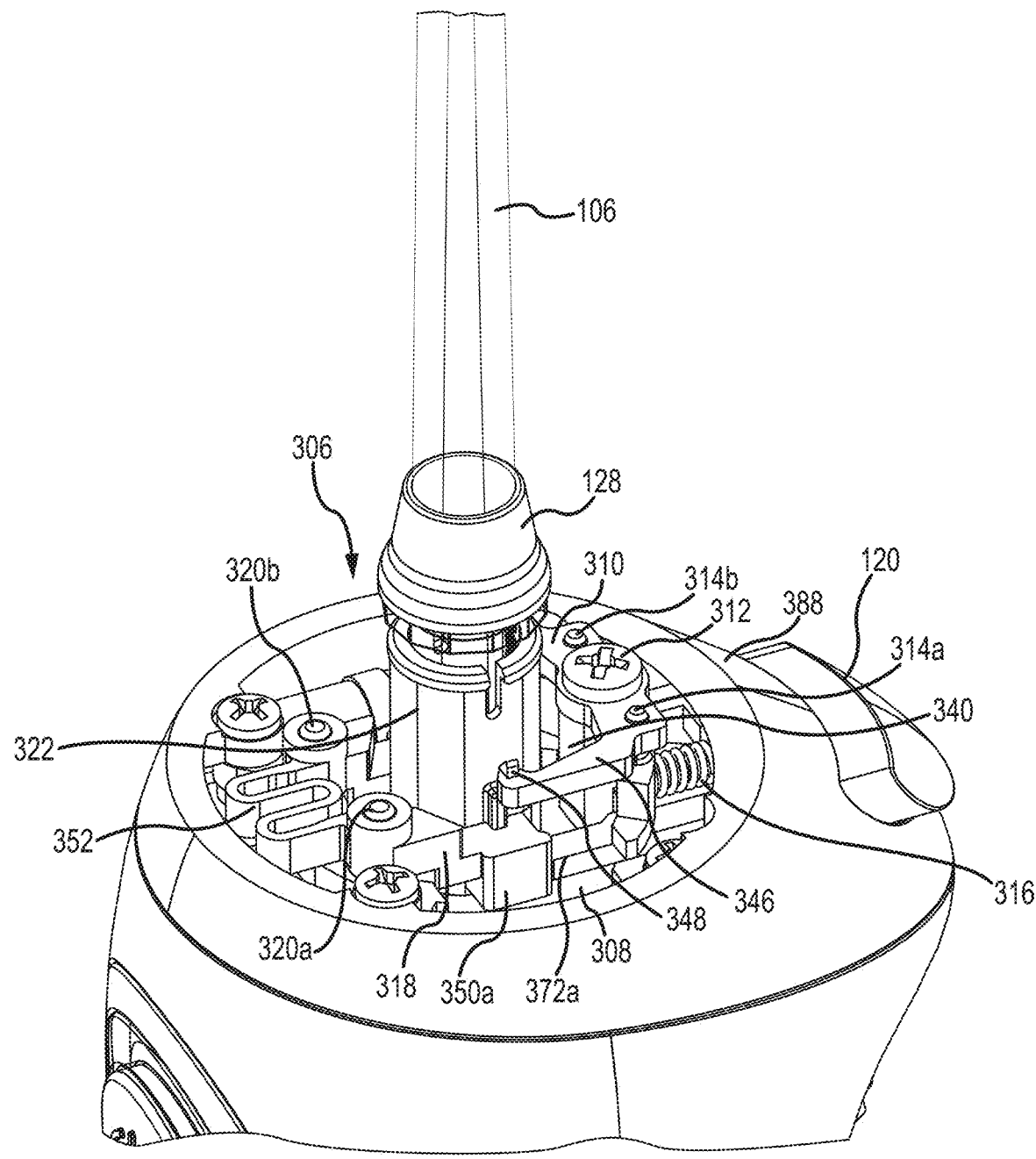
FIG. 14 is an enlarged top isometric view of the oral irrigator with the tip collar removed for clarity.

The tip latch assembly will now be discussed in more detail. FIG. 13A is a side elevation view of the tip latch assembly for the oral irrigator 100. FIG. 13B is a cross-section of the tip latch assembly taken along line 13B-13B in FIG. 13A. FIG. 14 is a top isometric view of the oral irrigator with the tip collar removed to illustrate certain features. With reference to FIGS. 13A-14, the tip latch assembly 306 releasably secures the tip 106 to the oral irrigator 100. The tip latch assembly 306 allows a user to remove a tip, insert a new tip 106, as well as rotate the tip 106. The tip latch assembly 306 may include a latch 318, a tip release 120, a latch chassis 308, a return spring 316, a detent spring 310, and the tip collar 110.

Figure 16A:
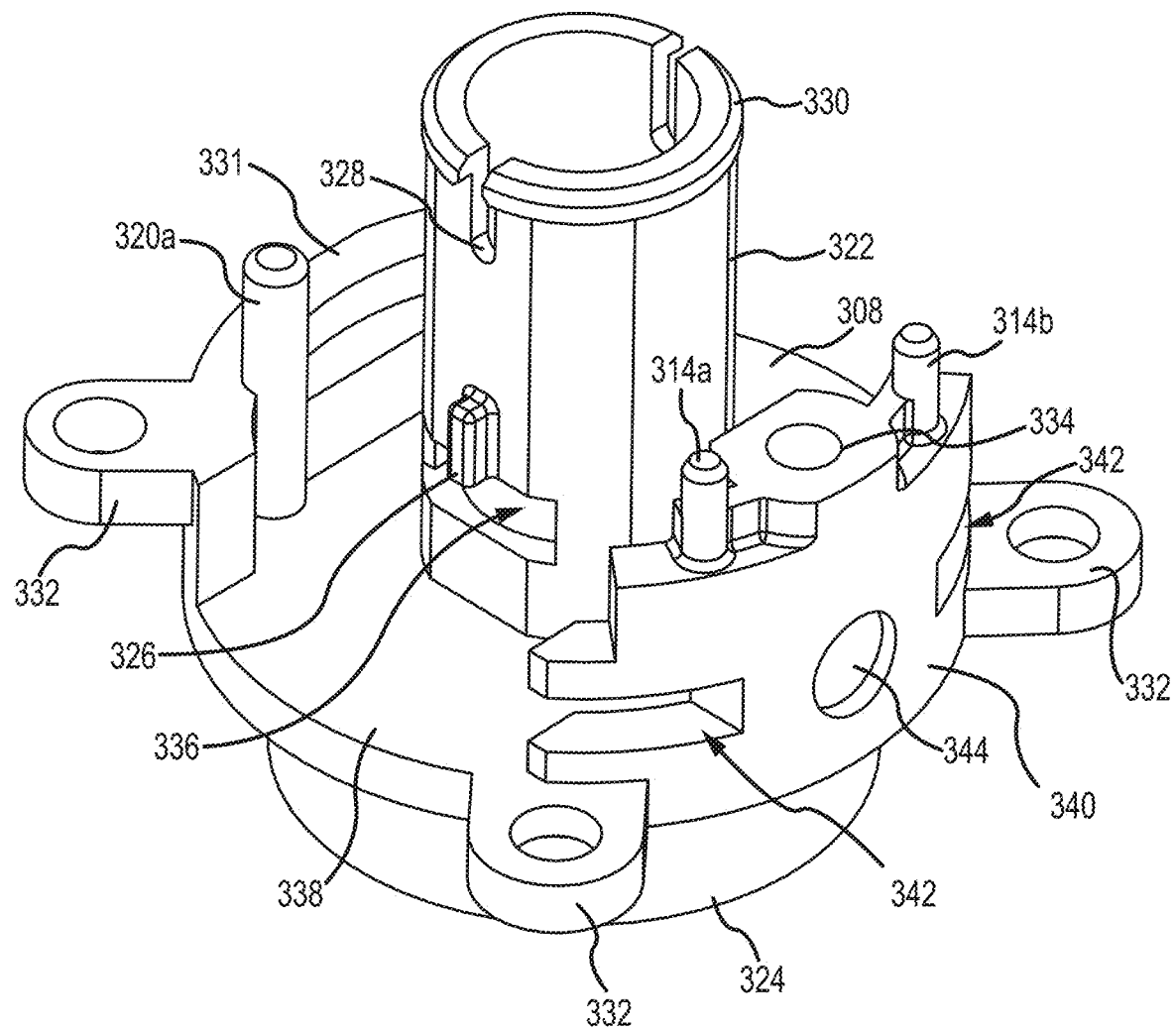
FIG. 16A is an isometric view of a latch chassis for the tip latch assembly for the oral irrigator.

The latch chassis 308 supports various components of the tip latch assembly 306 to the oral irrigator 100. FIG. 16A is a top isometric view of the tip latch chassis. With reference to FIGS. 13A, 13B, and 16A, the latch chassis 308 includes a support plate 338 with a tip support column 322 extending above and below the support plate 338. The tip support column 322 defines a passage in which the tip 106 may be received. A top end of the tip support column 322 includes two slots 328 defined as U-shaped cutouts positioned across from one another on the column 322. Additionally, two latch windows 336 are defined through the sidewalls of the column 322. The latch windows 336 are aligned with one another and may be rectangular shaped cutouts configured to receive tangs of the latch 318, discussed in more detail below. Two alignment ribs 326 extend longitudinally along a portion of a length of the tip column 322 and are positioned approximately above a center of the latch windows 336 on the outer surface of the tip column 322. An outer wall 324 extends downwards from the support plate 338 and surrounds the tip support column 322. The outer wall 324 is separated from the tip support column 322 to define an annular compartment between the outer wall 324 and the column 322.

With reference to FIG. 16A, the latch chassis 308 may also include a brace 340 extending upwards from an edge of the support plate 338. The brace 340 is a curved wall that follows the curvature of the support plate 338. The brace 340 includes two leg notches 342 defined as cutouts through a sidewall to the brace 340 and extending inwards towards a center portion of the brace 340. Two posts 314a, 314b extend upwards from a top end of the brace 340 and a fastening aperture 334 is defined between the two posts 314a, 314b. A spring recess 344 is defined as a generally circular recess in the outer surface of the brace 340.

With reference to FIGS. 14 and 16A, the latch chassis 308 includes two latch posts 320a, 320b extending upwards from the support plate 338 on an opposite edge of the plate 338 from the brace 340. The latch chassis 308 may further include a plurality of fastener brackets 332 extending outwards from a support bracket 331 of the support plate 338. The fastener brackets 332 may include fastening apertures and may be configured to connect to fastening mechanisms to secure the chassis to the oral irrigator 100. As such, the configuration, size, and location of the fasteners brackets 332 may be varied based on the type of fastening mechanisms used.

With reference again to FIG. 14, the detent spring 310 may be a U-shaped resilient member that includes two spring arms 346. The spring arms 346 extend substantially parallel to each other and include a detent 348 formed on a terminal end thereof.

Figure 15:
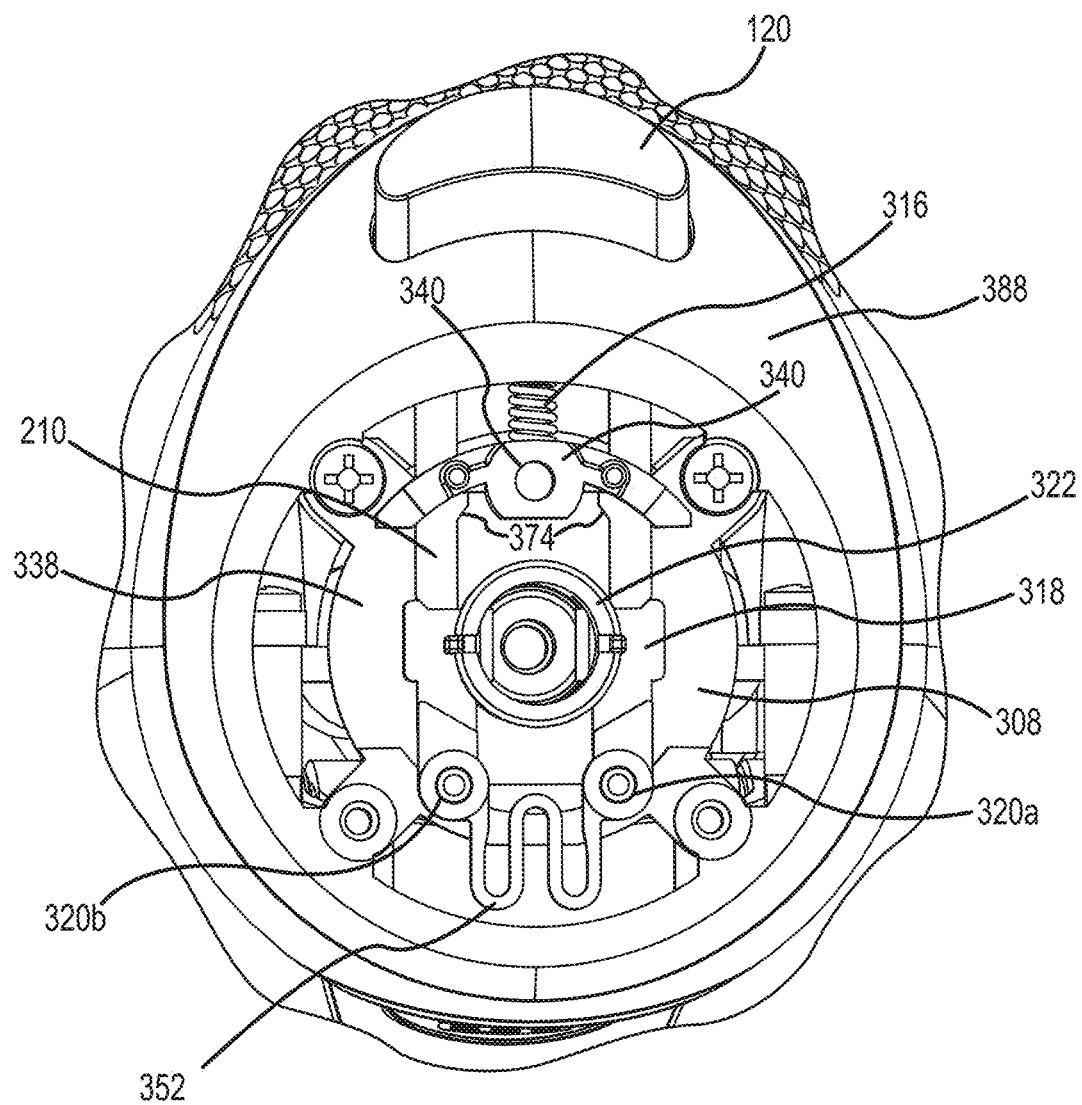
FIG. 15 is a top plan view of the oral irrigator of FIG. 14.
Figure 16B:
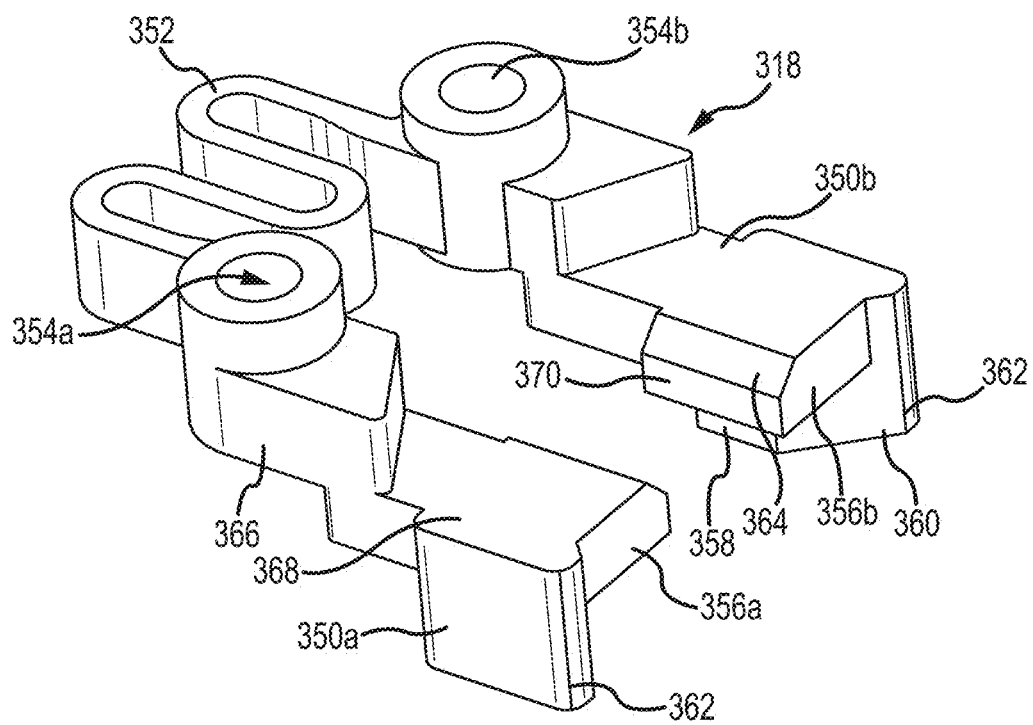
FIG. 16B is an isometric view of a latch for the tip latch assembly for the oral irrigator.
Figure 16C:
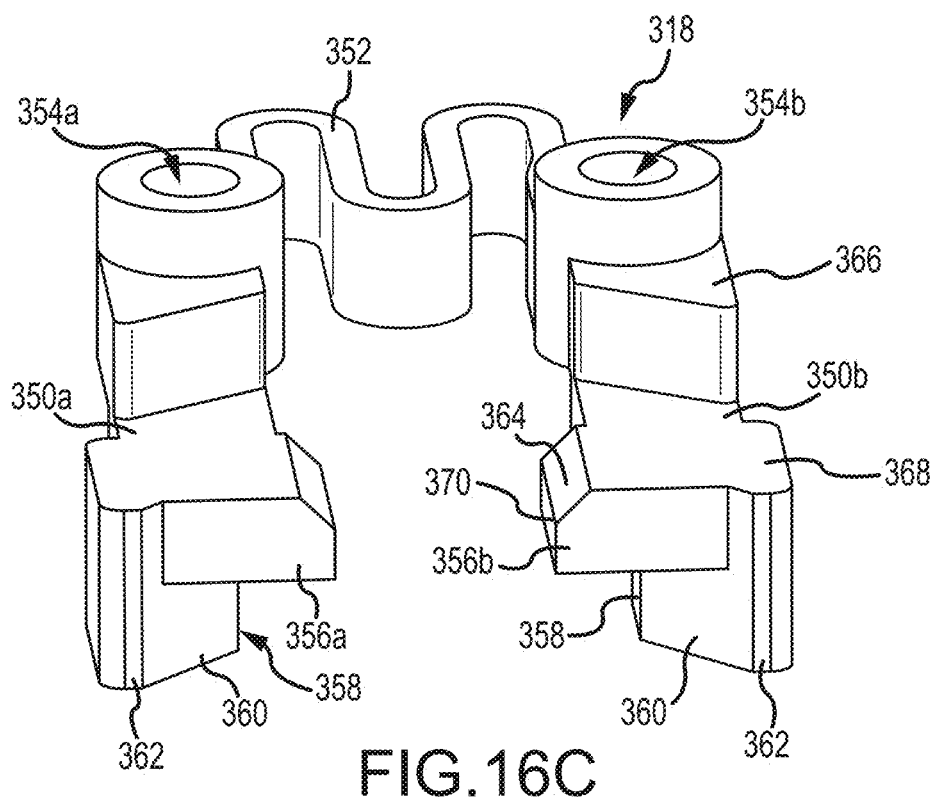
FIG. 16C is a top-front isometric view of the latch of FIG. 16B.

The latch 318 of the tip latch assembly 306 will now be discussed in more detail. FIG. 15 is a cross-section view of the oral irrigator taken along line 15-15 in FIG. 1B. FIGS. 16B and 16C are various views of the latch 318. With reference to FIGS. 14-16C, the latch 318 includes a biasing structure 352 formed at a first end and a pair of engagement arms 350a, 350b extending generally parallel to each other from either end of the biasing structure 352. The biasing structure 352 forms a flexible and resilient element of the latch 318 and is formed integrally with the latch 318. For example, in one embodiment, the biasing structure 352 is a plastic component formed in a undulating or wave pattern that provides flexibility to the structure. As shown in FIGS. 16B and 16C, the biasing structure 352 may be formed in a W shape with rounded corners. However, other structures providing flexibility to the structure are envisioned and the above-mentioned examples are merely illustrative only.

The engagement arms 350a, 350b of the latch 318 include a first portion 366 and a second portion 368, with the first portion 366 being connected to the biasing structure 352 and the second portion extending from the first portion 366. The engagement arms 350a, 350b may be mirror images of each other and so the discussion of any component for one of the arms 350a, 350b may be understood to apply to the other arm. Each arm 350a, 350b may include a fastening aperture 354a, 354b defined on a top surface and extending through a height or a portion of the height of the engagement arm 350a, 350b.

The ends of the engagement arms 350a, 350b are configured to both engage with the tip release 120 as well as the tip 106, as discussed in more detail below. The engagement arms 350a, 350b include a tang 356a, 356b extending towards the opposite arm 350a, 350b from an interior surface 358 of its respective arm 350a, 350b. The tang 356a, 356b includes a locking surface 370 that is somewhat parallel to the extension of the engagement arms 350a, 350b. Additionally, a top surface 364 of each tang 356a, 356b slopes downwards as it extends outwards from the top surface of the engagement arm 350a, 350b to transition into the locking surface 370. The ends of the engagement arms 350a, 350b include an actuation surface 360 that begins at the terminal end of each engagement arm 350a, 350b and extends at an angle in towards the opposite engagement arm and towards the biasing structure 352. For example, the actuation surface 360 may extend at an angle of about 45 degrees from the end of the engagement arm 350a 350b. A lip 362 is formed at the end of the engagement arms 350a, 350b; the lip 362 defines a relatively flat surface that is perpendicular to the top surface of the engagement arms 350a, 350b.

Figure 17:
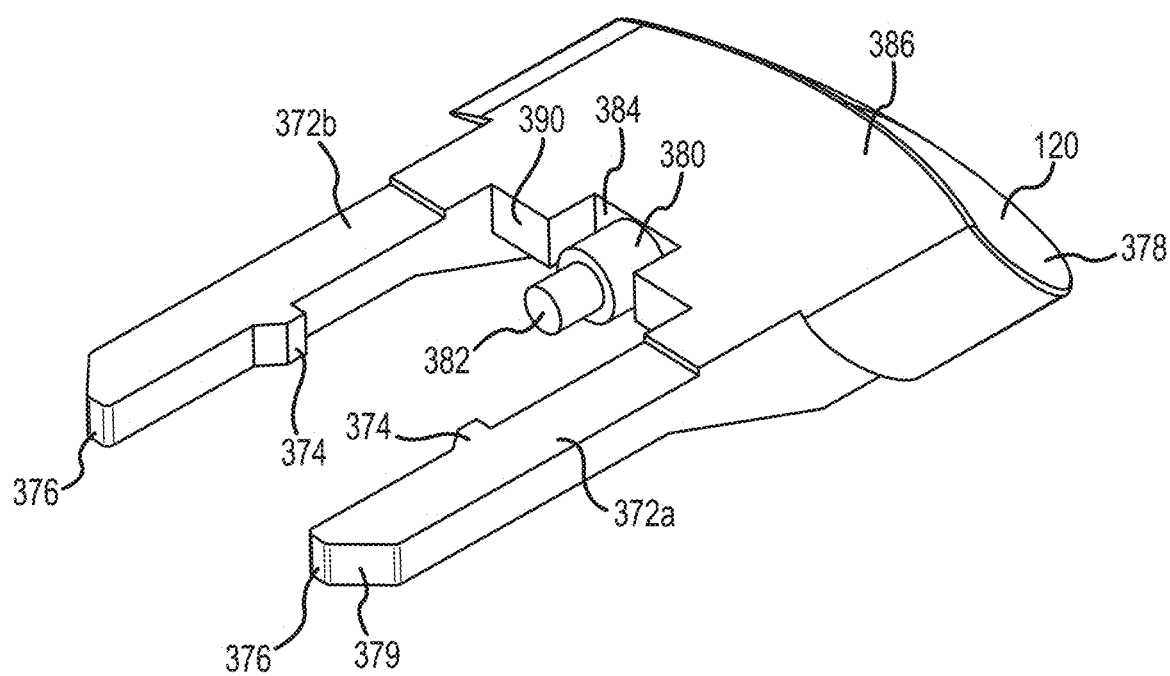
FIG. 17 is a top isometric view of a tip release button for the tip latch assembly for the oral irrigator.

With reference to FIG. 17, the tip release 120 of the tip latch assembly 306 will now be discussed in more detail. The tip release 120 includes an input surface 378 or button that is configured to extend outside of the oral irrigator 100 body. In some embodiments, the input surface 378 may be curved to substantially match the curvature of the tip ring 388 or other exterior surface of the oral irrigator 100. The tip release 120 also includes two actuation prongs 372a, 372b that extend outward from a rear side of the tip release 120. The actuation prongs 372a, 372b are substantially parallel to one another and may be mirror images of each other. In some embodiments, each of the actuation prongs 372a, 372b include a stop 374 projecting outwards from an interior surface of the actuation prong 372a, 372b towards the opposite prong 372a, 372b. The stops 374 may be located along a length of each respective actuation prong 372a, 372b and the location of each stop 374 may be selected based on a desired extension of the input surface 378 from the tip ring 388. In other words, the stops 374 may determine the amount that the input surface 378 extends outwards from the exterior of the oral irrigator. The stops 374 help to prevent the tip release 120 from disconnecting from the tip release assembly 306.

With continued reference to FIG. 17, a terminal end 376 of each actuation prong 372a, 372b may have a flat surface and an angled surface 379. The angled surface 379 may correspond to the angle of the actuation surface 360 of the latch 318. For example the angled surface 379 may be a beveled edge where the angle of the bevel from the terminal end 376 substantially matches as an opposing angle to the angle of the actuation surface 360 of the latch 318.

The tip release 120 may also include a spring seat 380 including a stud 382 portion. The spring seat 380 is formed as a cylindrical extension that extends from a back wall 390 of the tip release 120. The spring seat 380 seats within a recess 384 formed in the back wall 390. The stud portion 382 has a smaller diameter than the spring seat 380 and extends outward from the spring seat 380. The diameter differential between the stud 382 and the seat 380 defines a seat configured to receive a spring 316 as discussed in more detail below.

The tip collar 110 allows a user to change the orientation of the tip 106. FIGS. 18A-18C are various views of the tip collar 110. With reference to FIGS. 18A-18C, the tip collar 110 is generally frustum shaped and includes a relatively flat top end 396 transitioning into a skirt 392 extending outward and downward at an angle therefrom. A bottom end 410 of the skirt 392 defines a bottom of the collar 110. A plurality of finger grips 394 extend outward from and longitudinally along an outer surface of the skirt 392. The finger grips 394 are spatially separated from one another and extend at spaced intervals around the skirt 392.

With continued reference to FIGS. 18A-18C, an inner collar 406 extends downward from the top end 396 of the collar 110. The inner collar 406 defines a tip passageway 398 therethrough, the tip passageway 398 being configured to substantially match the diameter of the support column 322 of the support plate. The tip passageway 398 may vary in diameter along its length. For example, a first shelf 404 and a second shelf 402 may be formed at two separate locations along the length of the tip passageway 398. The first shelf 404 may be positioned closer to the top end 396 of the collar 110 than the second shelf 402. With reference to FIGS. 18A and 18C, a keyed sidewall 400 having a plurality of facets or angled walls are defined on the interior sidewall of the inner collar 406. The facets of the keyed sidewall 400 extend in length between the first shelf 404 and the second shelf 402.

With reference to FIG. 18B, the tip collar 110 further includes a plurality of fluted feedback teeth 408 along an outer surface of the inner collar 406. The feedback teeth 408 are cylindrical bumps extending longitudinally along a length of the inner collar 406. In one embodiment, the feedback teeth 408 extend only along a portion of the inner collar 406. However, the length and other dimensions of the feedback teeth 408 may be varied as desired.

Assembly of the Oral Irrigator

Assembly of the oral irrigator 100 will now be disused in more detail. It should be noted that the below discussion is meant as illustrative only and that although certain components are discussed as being assembled in a particular order, the components of the oral irrigator 100 may be assembled in any manner as desired. With reference to FIGS. 5B and 5A, in one embodiment, the drive assembly 178 may be coupled together first. In this example, the motor 172 may be secured to the drive mount 304 with two fasteners 205a, 205b. The motor 172 may be positioned so that the drive shaft 216 extends through a bottom wall of the drive mount 304. The pinion gear 218 may then be received around the drive shaft 216 and secured thereto.

With reference to FIGS. 5B and 10A, the connecting rod 240 is placed around the cam 226 of the driven gear 220. The driven gear 220 is arranged so as to be substantially perpendicular to the pinion gear 218 where the teeth of both gears 218, 220 mesh together. The driven gear 220 is also mounted between the two sidewalls of the drive mount 304. The gear pin 224 is then connected to a first sidewall of the drive mount 304, through the gear aperture 262 in the driven gear 220 and out through a second sidewall of the drive mount 304 to secure the driven gear 220 and connecting rod 240 in position.

The drive assembly 178 may be received in the lower housing 182. With reference to FIGS. 5B and 12, the drive assembly 178 is connected to the lower housing 182 such that the lower portion of the connecting rod 240, the driven gear 220, and the pinion gear 218 are positioned within the dry cavity 276. Once the drive assembly 178 is positioned within the lower housing, with reference to FIGS. 11B and 12, the diaphragm seal 274 may then be connected to the connecting rod 240. In particular, the connecting rod 240 may be slid through the rod aperture 292 and the engagement wall 290 of the seal 274 may be positioned between the upper rib 244 and the lower rib 246 on the outer surface of the connecting rod 240. As shown in FIG. 12, the engagement wall 290 of the seal 274 may be dimensioned so as to be exactly the same thickness as the space between the ribs 244, 246, so as to prevent the seal 274 from sliding along the outer surface of the connecting rod 240 when the connecting rod 240 moves. In instances where the diaphragm seal 275 of FIG. 11C is used, rather than the diaphragm seal 274 of FIGS. 11A and 11B, the rounded or bead engagement wall 291 may be positioned between the upper rib 244 and the lower rib 246, with the rounded outer surface of the bead engaging the outer surface of the connecting rod 240. Additionally, similar to the engagement wall 290, the engagement wall 291 may be dimensioned so as to fit within the space between the ribs 244, 246.

With reference to FIG. 10B, the ball 242 of the connecting rod 240 may then be connected to the piston 248. Specifically, the ball 242 may be received into the rod cavity 266 defined on the bottom end 268 of the piston 248, the rod cavity 266 may snap fit or otherwise frictionally fit around the ball 242. The connecting rod 240 extends through the rod aperture 286 defined in the top end of the lower housing 182 and the diaphragm seal 274 seats on the sealing end 278 of the lower housing 182. In particular, with reference to FIG. 12, the beaded flange 288 of the seal 274 is positioned in the annular grove 280 between the inner wall 284 and the outer wall 282 of the lower housing 182. In this embodiment, the seal 274 extends from the annular groove 280 upward and over the inner wall 284 and then downward so that the crease 298 extends along a portion of the interior surface of the inner wall 284.

Once the drive assembly 178 is connected to the lower housing 182, the batteries 412a, 412b may be connected to the lower housing 182. In particular, with reference to FIGS. 3 and 8A, the batteries 412a, 412b may be received into respective battery cavities in the lower housing 182. A battery cable 416 may extend between terminals for the two batteries 412a, 412b to electrically couple them together. A seal 414 may be positioned around the battery cap 198, which may then be inserted into a bottom end of the lower housing 182 and connected thereto with a plurality of fasteners 418. In another embodiment, as shown, for example in FIG. 25, the battery cap 198 may be ultrasonically welded to the lower housing 182. In this embodiment, the seal 414 and the fasteners 418 may be omitted as the cap may be connected to the lower housing 182 in a substantially leak proof and secured manner.

With reference to FIG. 6, after the battery cap 198 is connected, the power circuit board 196 may be connected to the lower housing 182. In particular, the circuit board 196 may be positioned within a recess defined by the flange 208 on the outer surface of the lower housing 182. The circuit board 196 may be secured to the lower housing 182 by one or more fasteners. Additionally, the circuit board 196 may be electrically connected to the motor 172 and batteries 412a, 412b by one or more wires connected to the various components within the lower housing 182 and extending through an aperture in the sidewall of the lower housing 182 to connect to the circuit board 196.

The circuit board 196 may be assembled prior to connecting it to the lower hosing 182 and the secondary coil 194 assembly may be positioned on the circuit board 196 and mounted to the lower housing 182 with the circuit board 196.

With reference to FIG. 8B, the drive assembly 178 may then be connected to the pump body 200. In particular, the piston 248 may be received into the pump chamber 260 and the bottom end 422 of the pump body 200 may seal against the flange top surface 294 of the diaphragm seal 274. One or more fasteners may then be used to secure the bottom end 422 of the pump body 200 to the seal end 278 of the lower housing 182.

With continued reference to FIG. 8B, the reed valves 252, 254 may be positioned over the pump inlet 256 and pump outlet 258, respectively. The inlet valve body 250 may then be connected to the valve receiving section 249 of the pump body 200 and may optionally include a seal 438, such as an O-ring, around an outer surface to seal against the outer surface of the inlet valve body 250 and interior surface of the valve receiving section 249 of the pump body 200. Additionally, the outlet valve body 424 may be connected to a top end of the pump body 200 by being received in the valve receiving section 251. For example, the outlet valve body 424 may be inserted into the valve receiving section 251 with the inlet chamber 432 being aligned with the outlet reed valve 254. As with the inlet valve 250, a seal 436 (such as an O-ring or cup seal) may be positioned on an outer surface of the portion of the outlet valve 424 that is received into valve receiving section 251 of the pump body 200 to seal the connection between the two components. Fasteners 434 may then be used to secure the outlet valve body 424 to the top end of the pump body 200.

Once the outlet valve body 424 is connected to the pump body 200, the upper housing 184 may be connected to the assembly. With reference to FIGS. 5B-8B, the pump body 200 and outlet valve body 424 may be received into bottom end of the upper housing 184. A seal 440 may seal against the outer surface of the outlet valve body 424 and the upper housing 184. In some embodiments, the outer flange 210 of the upper housing 184 may extend downwards and outwards over a portion of the lower housing 182 and be aligned with the flange 208 of the lower housing 182 (see, FIG. 7).

With reference to FIG. 6, the control assembly 180 may be connected to the upper housing 184. In particular, the control assembly 180 may be positioned within the recessed area defined by the flange 210 of the upper housing 184 and connected to the upper housing 184 with a plurality of fasteners.

With reference to FIGS. 7 and 8B, when the upper housing 184 is connected to the pump assembly 176, the hose 202 is connected to the bottom tube portion of the inlet valve body 250. The hose 202 may be secured in place with friction fit, one or more hose clamps, adhesive, and/or other types of fasteners.

With reference to FIGS. 3 and 4, the alignment and securing magnets 450a, 450b and the activation magnet 420 for the charger may be connected to the front shell 138. For example, with reference to FIGS. 3 and 4, the activation magnet 420 may be received within the magnet recess 446 and the two lateral magnets 450 may be positioned in the magnet pockets 448a, 448b defined on either side of the sealing feature 144. It should be noted that in embodiments where a non-magnetic charger or a power cord are used the magnets and magnet pockets can be omitted.

After magnets 420, 450 are connected to the front shell 138, with reference to FIGS. 4 and 6, the front and rear shells 138, 140 may be connected together around the pump and drive assemblies 176, 178. The front shell 138 may be connected to and around a portion of the upper and lower housings 182, 184. In particular, the first sealing wall 142 may be placed around the gasket 214 positioned around the flange 210 on the upper housing 184. The sealing feature 142 compresses the gasket 214 and defines a seal around the interior section of the flange 210 to form a first waterproof compartment. The power button 112 of the front shell 138 aligns with the power switch 186 on the control assembly 180 and the mode button 114 aligns with the mode switch 188. The window 146 section of the front shell 138 is aligned with the bottom portion of the control assembly 180 so that the LED windows 148a, 148b, 148c, 148d align with the LEDs 190a, 190b, 190c, 190d.

The second sealing feature 144 of the front shell 138 may be positioned around the outer edge of the second flange 208, compressing the gasket 212 between the feature 144 and the flange 208 to form a second waterproof compartment. A plurality of fasteners, such as press fit pins or screws, may be connected to the lower and upper housings 182, 184 and into the connecting posts 152a-152k to secure the front shell 138 to the upper housing 184 and the lower housing 182. It should be noted that depending on the type of fasteners used, the connecting posts may be omitted.

In some embodiments, the connection wires 192 may then be connected to the control assembly 180 and the power circuit board 196 after the front shell 138 has been connected to the upper and lower housings. In these embodiments, the window panel 146 may not be connected to the front shell 138 until the connection wires 192 are connected. Once the connection wires 192 are connected, the window panel 146 is ultrasonically welded to the front shell 138. The welding connection helps to prevent fluid from entering into the front shell 138 through the window 146 by creating a leak-proof seal, but because the panel 146 may be added after the connection wires 192 have been connected, the wires may be accessible during manufacturing and assembly of oral irrigator 100.

To connect the rear shell 140 to the oral irrigator 100, the hose 202 is connected to the tube projection feature 165 on the rear shell 140 and the reservoir 206 hose is connected to the opposite side of the feature 165, fluidly connecting the reservoir hose 206 to the hose 202 (see FIG. 5B). As shown in FIG. 5B, the rear shell 140 may include a dividing wall 452 that extends outwards from an interior surface of the rear shell 140 and then extends downwards parallel to the lower housing 182. In this manner, the dividing wall 452 acts to fluidly separate the reservoir 154 from the housings 182, 184. The rear shell 140 may then be secured to the front shell 138 and the lower and upper housings 182, 184.

Once the two shells 138, 140 are connected, the reservoir hose 206 is connected to the hose 202 and the reservoir 104 may be secured to the oral irrigator 100. With reference to FIGS. 5A, 5B, and 9, the reservoir 104 may be connected to the bottom end of the rear shell 140. The upper rim 170 of the reservoir 104 is connected to a ledge in the rear shell 140 and the battery platform 158 of the reservoir 104 is positioned beneath the battery cap 198 (see FIG. 5A). The battery platform 158 is raised to provide an increased capacity for the reservoir. The battery cap 198 and the diaphragm seal 274, along with the interior surface of the lower housing 182 act to define a third waterproof compartment for the oral irrigator.

The tip latch assembly 306 may then be connected to the top end of the outlet valve body 424. In one embodiment, the top end of the outlet valve body 424 may be positioned between the outer wall 324 and the tip support column 322 of the latch chassis 308. A seal 442 may be positioned around the outlet valve body 424 to seal against the interior surface of the outer wall 324 of the latch chassis 308.

Once the latch chassis 308 is connected, the remaining components of the tip latch assembly 306 may be connected and secured to the oral irrigator 100. With reference to FIGS. 14 and 16, a first end of the return spring 316 is positioned within the spring recess 344 and a second end of the return spring 316 is placed onto a portion of the stud 382 on the tip release 120. The tip release 120 is then connected to the latch chassis 308 as the actuation prongs 372a, 372b are inserted into the leg notches 342 on the latch chassis 308. The actuation prongs 372a, 372b are positioned so that the stops 374 on each prong 372a, 372b are positioned on an interior side of the brace 340 (see FIG. 14), as will be discussed in more detail below, this positioning of the stops 374 helps to prevent inadvertent removal of the tip release 120.

After the tip release 120 is connected to the latch chassis 308, the latch 318 may be connected to the chassis 308. With reference to FIGS. 14, 16A-16C, the fastening apertures 354a, 354b of the latch 318 are received around the posts 320a, 320b of the latch chassis 308. The engagement arms 350a, 350b of the latch 318 are oriented so as to extend across the latch chassis 308 and interface with the actuation prongs 372a, 372b of the tip release 120 for purposes of selectively releasing the tip 106 as will be discussed in more detail below. Further, the engagement arms 350a, 350b of the latch 318 seat beneath the ribs 326 positioned on either side of the tip support column 322 on the latch chassis 308. The tangs 356a, 356b of each engagement arm 350a, 350b are partially received into the latch windows 336 also defined on opposing sides of the tip support column 322 (see FIG. 13B).

The tip ring 388 may be connected to the tip latch assembly 306. For example, with reference to FIG. 14, the tip release 120 may be positioned through an aperture defined through a sidewall of the tip ring 388 and a plurality of fasteners may be inserted through fastening apertures defined on both the tip ring 388 and on the fastener brackets 332 of the latch chassis 308. The fasteners secure the tip ring 388 to the latch chassis 308 and to the two shells 138, 140.

With continued reference to FIG. 14, the detent spring 310 may be connected to the latch chassis 308. In one embodiment, the detent spring 310 may be a flexible, integral component that includes two post apertures that are received around the posts 314a, 314b of the latch chassis 308. A fastener 312 may then be received through a fastening aperture defined in the top surface of the detent spring 310 and the fastening aperture 334 defined on the top surface of the brace 340 of the latch chassis 308. The detent spring 310 may be oriented so that the arms 346 extend inwards towards and extend on either side of the tip support column 322 of the latch chassis 308. In one embodiment, the terminal end of the arms 346 may be configured to align in part with the ribs 326 on the tip support column 322.

Once the tip latch assembly 306 is connected to the oral irrigator 100, the tip collar 110 is connected to the tip latch assembly 306. With reference to FIG. 13B, the inner collar 406 of the tip collar 110 is received around the outer surface of the tip support column 322 of the latch chassis 308. Additionally, the arms 346 of the detent spring 310 are positioned around the outer surface of the inner collar 406 of the tip collar 110 and each detent 348 prong on the arms 346 engages a channel between a respective pair of teeth 408 on the outer surface of the inner collar 406. The rim 330 of the tip support column 322 seats on top of the second shelf 402 on the interior of the tip passageway 398 of the tip collar 110. The slots 328 defined in the tip support column 322 provide flexibility to the tip support column 322 to allow it to flex radially inward as the inner collar 406 is placed around the tip support column 322 to allow the two components to be more easily connected.

Once the tip collar 110 is connected, the tip 106 may be inserted into the oral irrigator 100. With continued reference to FIG. 13B, the tip 106 is slid into the tip passageway 398 in the tip collar 110 and extends into the tip support column 322. The bottom of the tip 106 causes the latch 318 to open to allow the tip 106 to pass by the latch windows 336 and the engagement tangs 356a, 356b extend into the tip column 322 to grip the tip 106, securing it in position. The identifier ring 128 around the outer surface of the tip 106 is configured to seat on the first shelf 404 of the tip collar 110 once the tip 106 is in the proper position. With reference to FIG. 5B, the bottom end of the tip 106 is received in part into the outlet valve body 424 and is fluidly connected to the pump body 200.

Operation of the Oral Irrigator

Operation of the oral irrigator 100 will now be discussed in more detail. With reference to FIGS. 1A and 6, when the power button 112 is selected by a user, the button 112 compresses, compressing the power switch 186 on the control assembly 180. The power switch 186 causes the control assembly 180 to transmit a signal to activate the motor 172. The speed of the motor 172 may be varied by a user selecting the mode button 114, which activates the mode switch 188. The mode switch 188 varies the average value of the voltage transmitted to the motor to vary the speed of the motor 172. In one embodiment, the motor may be powered by a pulse width modulation signal that is used to vary the motor speed and the mode switch 188 may be used to change the output of the motor by selectively changing the signal applied thereto.

With reference to FIGS. 5B and 10B, as the motor 172 is powered the motor drive shaft 216 rotates, causing the pinion gear 218 to rotate. The gear teeth 230 of the pinion gear 218 mesh with the gear teeth 232 on the driven gear 220. The helical shape of the gears 230, 232 causes the teeth to engage along their entire length, increasing the torque transmitted between the pinion gear 218 and the driven gear 220. The rotation of the pinion gear 218 causes the driven gear 220 to rotate about the gear pin 224. The connecting rod 240, connected to the cam 226 of the driven gear 220 also begins to move. The cam 226 acts to convert the rotational movement of the motor drive shaft 216 and driven gear 220 into a longitudinal reciprocal displacement of the piston 240 within the pump body 200.

FIG. 23A is a partial cross-section enlarged view of the oral irrigator during an upstroke of the pump assembly. FIG. 23B is a partial cross-section enlarged view of the oral irrigator transitioning between the upstroke and a down-stroke. FIG. 23C is a partial cross-section enlarged view of the oral irrigator during the down-stroke. With reference to FIGS. 23A-23C, the piston 248 moves longitudinally within the pump cavity 260 to varyingly increase and decrease the volume of the pump cavity 260. As the piston 248 moves due to the movement of the connecting rod 240, the diaphragm seal 274 moves therewith to maintain the seal between the pump cavity 260 and the drive assembly. As can be seen by comparing FIGS. 23A-23C, the depth of the crease 298 increases as the piston 248 moves from the upstroke position to the down-stroke position. The bellows allows the seal 274 to deform with movement of the connecting rod 240 without introducing friction into the system.

Due to the bellows of the seal 274 forming the crease 298, the seal 274 allows the piston to reciprocate linearly without introducing friction into the system. In particular, the diaphragm seal 274 deforms as the connecting rod 240 moves longitudinally and as the perimeter edge forming the beaded flange 288 of the diaphragm seal 274 is clamped and prevented from moving, the seal 274 does not rub against any surfaces as it deforms, reducing the risk of wear and tear on the seal 274. Additionally, as there is substantially no friction between the seal 274 and the connecting rod 240, parasitic energy losses are reduced as compared to conventional oral irrigators with piston seals, as the motor 172 does not have to overcome friction in addition to the energy required to deform the seal 274. The configuration of the diaphragm seal allows it to stay in position relative to the connecting rod and pump body, even at high frequencies such as those typically used with oral irrigators. Additionally, the diaphragm seal allows the omission of a radial shaft seal or lip seal that are typically placed on rotary elements, such as the motor or driven gear. These seals are prone to leak and wear over time and create friction on the rotary element, which requires more energy to operate and reduces the efficiency of the irrigator.

With reference to FIG. 8B, on a down-stroke of the piston 248, a vacuum is created in the pump body 200, which causes fluid to flow from the reservoir cavity 154 into the reservoir hose 206, into the hose 202, and into the inlet valve body 250. The fluid flows through the passageway defined in the inlet valve body 250 and causes the flap of the reed valve 252 to open, allowing the fluid to flow into the pump chamber 260. With continued reference to FIG. 8B, on an upstroke of the piston 248, the connecting rod 240 forces the piston 248 upwards, thus pushing the fluid in the pump chamber 260 upwards into the pump fluid passageway 264 towards the pump outlet 258. The fluid forces the reed valve 254 open and closes the inlet reed valve 252 so that the fluid flows into the inlet chamber 432 of the valve outlet body 424. The fluid then enters the outlet passageway 426 and flows into the tip 106 connected to the outlet valve body 424 and is expelled into a user's oral cavity.

With reference to FIG. 13B, if a user wishes to vary the orientation and position of the tip 106, he or she may grip and rotate the tip collar 110. As the tip collar 110 rotates, the teeth 408 on the inner collar 406 are rotated past the arms 346 and the detent spring 310 deforms slighting and the detents 348 on the arms 346 of the return spring 310 provide haptic feedback to the user. As the tip collar 110 rotates, the tip 106 which is engaged with the keyed sidewall 400 of the tip collar 110 rotates therewith. Thus, the tip collar 110 allows a user to more easily rotate the tip 106 to a desired location as the tip collar 110 provides a larger gripping surface than rotating the tip 106 itself and also provides feedback via the teeth 408 regarding the rotational movement of the tip 106.

Tip Release Operation

Figure 24:
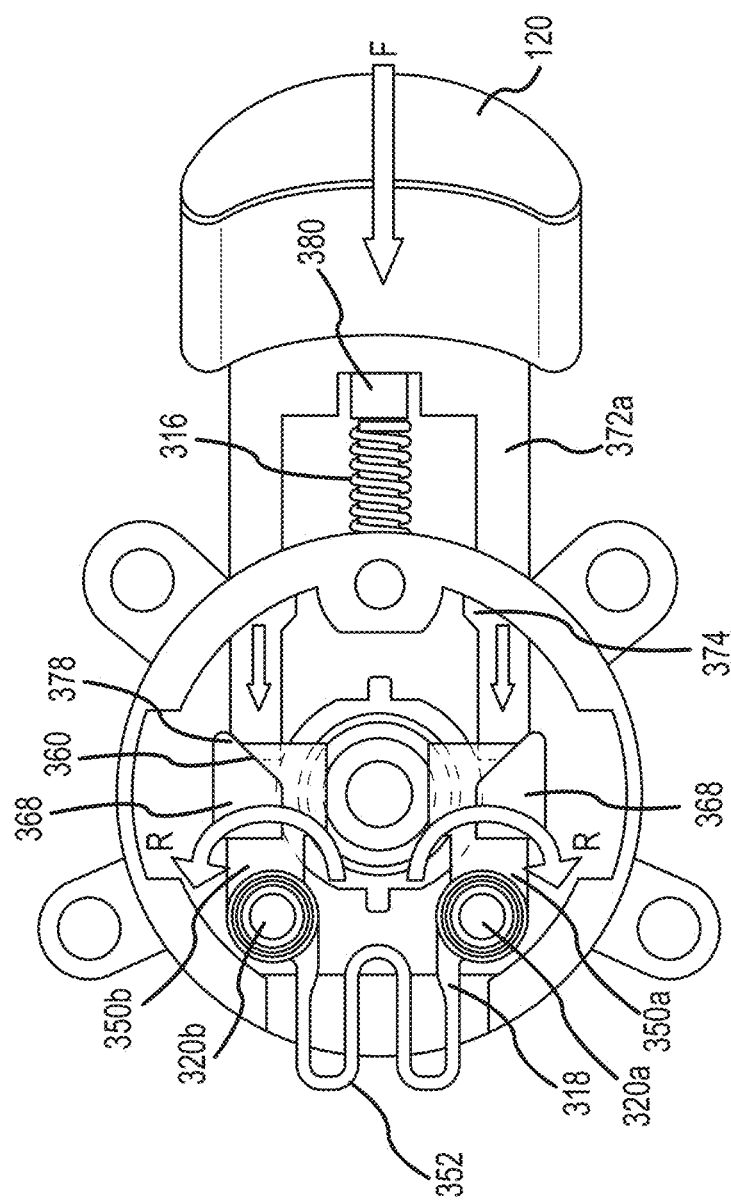
FIG. 24 is a simplified view of the tip latch assembly with select elements removed for clarity.

The operation of the tip latch assembly 306 will now be discussed in more detail. FIG. 24 is a cross-section view of the oral irrigator 100 with select elements removed for clarity. With reference to FIGS. 15, 16B, 17, and 24, to release the tip 106, the user exerts a force F on the input surface 378 of the tip release 120. The force F overcomes the biasing force exerted by the retention spring 316 and the actuation prongs 372a, 372b translate laterally towards the latch 318. As the tip release 120 moves laterally, the spring 316 is compressed. The chamfered or angled surfaces 378 on the ends of the actuation prongs 372a, 372b interface with the actuation surface 360 of the latch 318 and the terminal ends 372 of each prong 372a, 372b exert a portion of the force F against the actuation lip 362 of each engagement arms 350a, 350b of the latch 318. For example, each side may exert half of the force F, and the force F is translated into a perpendicular force component due to the interface of the angled faces of the tip release 120, and then into torque around pins 320 (which is resisted by biasing element 352).

The force exerted by the tip release 120 causes the engagement arms 350a, 350b of the latch 318 to pivot in the rotation direction R. In particular, the engagement arms 350a, 350b pivot around the posts 320a, 320b. This pivoting motion causes the tangs 356a, 356b of each arm 350a, 350b to pivot away from the center of the oral irrigator 100 and move out of the latch windows 336 in the latch chassis 308. With reference to FIG. 13B, the movement of the tangs 356a, 356b causes the tangs 356a, 356b to disengage from the groove 317 formed in the tip 106. Once the tangs 356a, 356b are disengaged from the groove 317, the tip 106 can be easily removed by the user.

With reference again to FIGS. 15 and 24, once the user force F is removed from the tip release 120, the retention spring 316 exerts a biasing force in the opposite direction of the user force F and the tip release 120 moves laterally away from the latch 318. As the tip release button 120 moves, the actuation prongs 372a, 372b disengage from the engagement arms 350a, 350b and the biasing structure 352 of the latch 318 exerts a biasing force to cause the engagement arms 350a, 350b to move into the latch windows 336 of the latch chassis 308. That is, biasing structure 352 of the latch 318 will return to its natural shape after being deformed by the user force F and will move back inward when the force F is removed. If a new tip 106 has been inserted into the tip support column 322, the tangs 356a, 356b will be inserted into the groove of the tip 106 and if a tip is not inserted, the tangs 356a, 356b will protrude into the interior passage of the tip support column 322.

It should be noted that in some embodiments, the retention spring 316 may be omitted and the biasing force of the biasing structure 352 of the latch 318 may be configured to exert a sufficient force to not only pivot the engagement arms 350a, 350b back to a locked position, but also force the actuation prongs 372a, 372b of the release button 120 laterally away from the latch 318 to the locked orientation.

The movement of the tip release button 120 by the retention spring 316 is limited by the stops 374 on the interior surfaces of the actuation prongs 372a, 372b. In particular, with reference to FIGS. 15 and 24, the stops 374 abut against the brace 340 to prevent further movement away from the latch 318 to help prevent the button 120 from being inadvertently removed from the tip latch assembly 306.

With the latch assembly 306, both engagement arms 350a, 350b of the latch 318 may engage with the tip 106 in the locked position. This structure is more reliable than conventional tip latch assemblies where a single arm engaged with the tip 106. Further, the dual-arms allow greater assembly tolerances and help to prevent inadvertent disengagement of the tip 106 from the oral irrigator 100. Further, the integrated biasing structure 352 of the latch 318 reduces the complexity and number of components for the tip latch assembly 306, which makes manufacturing easier as the chances for error during assembly are reduced. The biasing structure 352 allows the latch 318 to be created as a single part and thus a single mold is needed to form the latch 318 of the present disclosure as compared to other latch assemblies including separate biasing elements.

The Charger and Charging the Oral Irrigator

Figure 19:
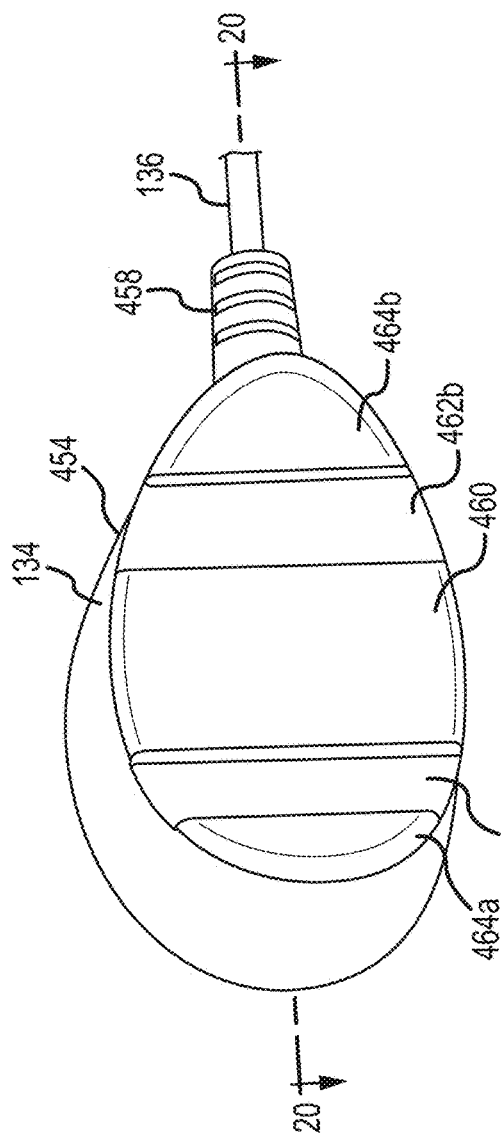
FIG. 19 is a rear isometric view of a charging unit for the oral irrigator.
Figure 20:
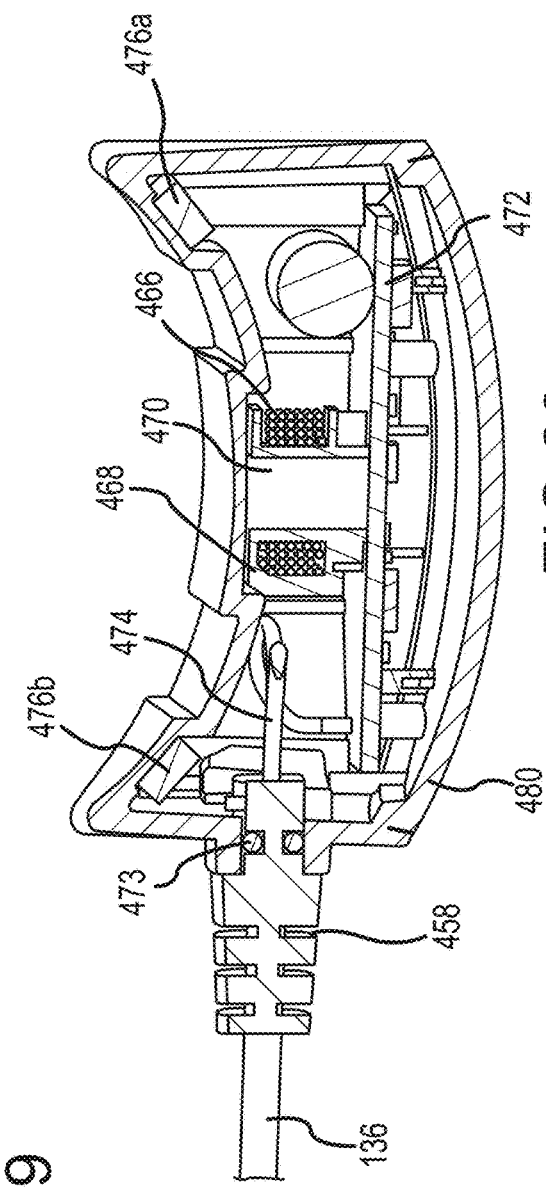
FIG. 20 is a cross-section view of the charging unit taken along line 20-20 in FIG. 19.
Figure 21:
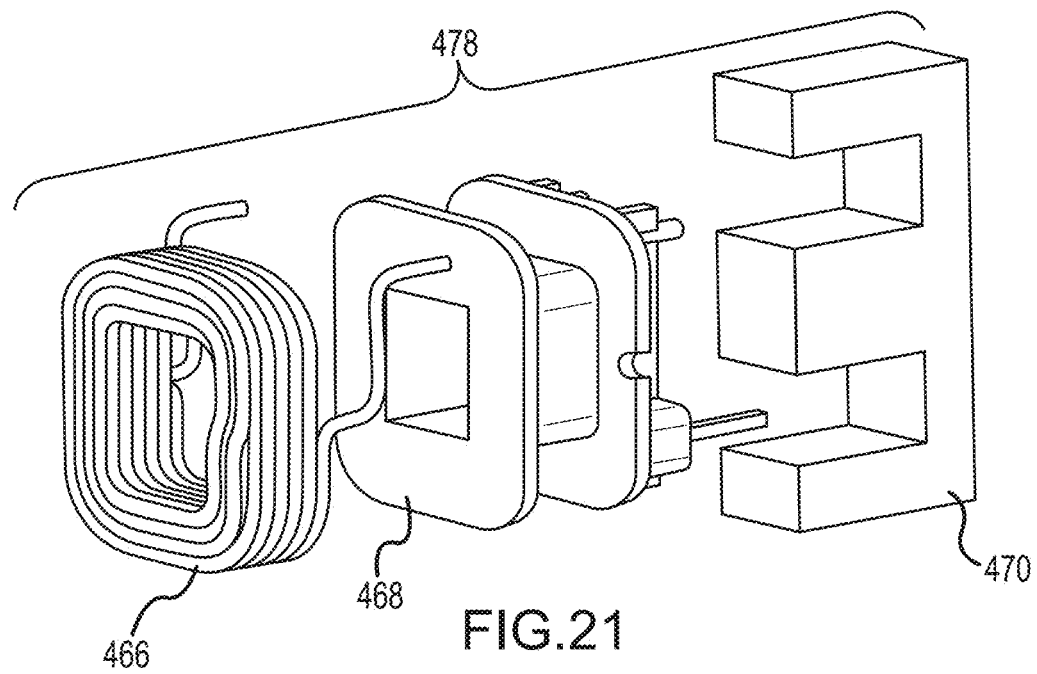
FIG. 21 is an exploded view of a coil assembly for the charging unit of FIG. 20.

The charger 134 for the oral irrigator 100 will now be discussed in more detail. FIG. 19 is a rear isometric view of the charger 134. FIG. 20 is a cross-section view of the charger taken along line 20-20 in FIG. 19. FIG. 21 is an exploded view of a primary charging coil assembly 478 for the charger 134. With reference to FIGS. 19-21, the charger 134 may include a charger housing 454, a power cord 136, a primary coil assembly 478, and interior electronic components. Each will be discussed in turn below.

The charger housing 454 may define a somewhat oval shaped body having a curved interior surface 460 configured to match the exterior curve of the front shell 138 of the oral irrigator 100, as well as be aesthetically appealing. The interior source 460 may include two cooling grooves 462a, 462b that extend parallel to each other from a top end to a bottom end of the charger 134. The cooling grooves 462a, 462b allow airflow between the charger 134 and the oral irrigator 100 when the charger is connected. The shape and dimensions of the cooling grooves 462a, 462b may be configured not only to enhance airflow but also to provide an aesthetically appealing appearance for the charger 134. The exterior surface 480 may be convexly curved and bow outwards at a middle section (see FIG. 20). In some embodiments, the exterior surface 480 may be removable from the charger housing 434 and may connect to the sidewalls of the charger 434.

With reference to FIGS. 19 and 20, the charger 134 may also include a power cord 136 electronically coupled via a wire 474 to a circuit board 472 positioned within the charger housing 454. The power cord 136 extends from a sidewall of the charger housing 454 and may include a strain relief 458 section at the connection location to help prevent the cord from being damaged due to bending and flexing at the connection to the housing 454. In some embodiments, an O-ring 473 may be received between the strain relief 458 and the charger housing 453 to help prevent fluids from entering into the charger housing.

Adjacent the outer edges of each of the cooling grooves 462a, 462b the charger 134 may include one or more magnet pockets 464a, 464b configured to receive one or more magnets 476a, 476b (see FIG. 20).

The charger 134 may also include one or more activation switches that activate the charger 134 when it is connected to the oral irrigator 100. In one embodiment, the activation switch 487 may be a Hall effect sensor that interacts with magnet 420 on the oral irrigator to activate the charger 134. This type of activation prevents the charger from being activated when it is not in a position to charge the oral irrigator 100, which reduces power consumption and increases the energy efficiency of the irrigator 100 and charger. Other types of sensors or switches may also be used, for example, mechanical or optical switches, that switch the charger into a charging mode once it is secured to the body of the oral irrigator 100. However, in embodiments where waterproofing is desired, a magnetic sensor, such as a Hall effect sensor, may be preferred as the sensor is not affected by fluids, such as water or mouthwash and the magnets can be concealed within the housings of the oral irrigator and charger to allow for a cleaner aesthetic appearance.

With reference to FIGS. 20 and 21, the charger 134 also includes the primary coil assembly 478. The primary coil assembly 478 may include a primary coil 466, a bobbin 468, and a core 470. The primary coil assembly 478 may be substantially similar to the secondary coil assembly 486. For example, with reference to FIG. 22, the secondary coil assembly 194 in the lower housing 112 of the oral irrigator 100 may include a secondary coil 486, a bobbin 488, and a core 490, each being substantially similar to its counterpart in the primary coil assembly 478. As will be discussed in more detail below, the coil assembly 478 is configured to couple with circuit board 196 in the oral irrigator 100 to charge the batteries 412a, 412b.

In one embodiment, the primary coil 466 and the secondary coil 486 may include a plurality of twisted copper wires, such as Litz wires, and each of the multiple wires may be insulated from each other. In these embodiments, the coils 466, 486 may allow for fast inductive charging of the oral irrigator 100, while having a low amount of heat generation. In conventional charging devices for oral care products, such as electric toothbrushes, an inductive coil may be made from a solid enameled copper wire. However, these types of coils have a low charging rate to prevent heat generation. On the contrary by using the twisted wires for the coils 466, 486, the multiple wires reduce the heat generated by the coils during charging due to reduced skin effect and proximity effect losses. This allows the charger 134 to be made of plastic or other low-heat resistant products since the heat generated by the coils 466, 486 is much lower. Further, the coil 466, 486 configurations with multiple wires charges faster than conventional single-wire structures as current has multiple pathways to flow.

It should be noted that in some embodiments, the primary coil 466 and the secondary coil 486 may be made with multiple parallel wires, rather than twisted wires. As another example, in some embodiments, the coils 466, 486 may be braided, woven, or otherwise formed. The wires forming the coils 466, 486 may be substantially any type of multiple wire arrangement and may be round or rectangular in cross section and may include a core, such as a fiber core that the wires are wound around, and/or may include insulating sleeves or the like around the group of wires, individual wires, or the like.

The core 470 may be a ferrite core or other type of magnetic core. In one embodiment, the core 470 may be "E" shaped and include a central prong and two peripheral prongs on either side of the central prong.

With reference to FIGS. 20 and 21, to assemble the charger 134, the coil assembly 478 is connected together. In particular, the primary coil 466 is wound around the outer surface of the bobbin 468 and the central prong of the core 470 may be inserted through a center of the bobbin 468 with the outer prongs be positioned on a top and a bottom of the bobbin 468 and primary coil 466. The coil assembly 478 is then mounted to the circuit board 472, which may be a printed circuit board, and electronically connected to the connection wire 474.

With reference to FIGS. 19 and 20, the magnets 476a, 476b may be inserted into the respective magnet pockets 464a, 464b in the charger housing 434. The coil assembly 478 and circuit board 472 can then be received into the charger housing 434 and the connection wire 474 may be electrically connected to the power cord 136. The exterior surface 480 may then be connected to the charger housing 434 and secured thereto.

Operation of the charger 134 to charge the batteries of the oral irrigator 100 will now be discussed in more detail. With reference to FIGS. 2A and 2B, the user aligns the charger 134 with the outer surface of the front shell 138 of the oral irrigator 100. In particular, the interior surface 460 is aligned and abuts the outer surface of the front shell 138. The magnets 476a, 476b of the charger 134 are attracted to and align with the magnets 450a, 450b connected to the front shell 138 to align the charger 134 with the power assembly circuit board 196 and secure the charger 134 to the oral irrigator 100. Additionally, the activation switch 487 interacts with the magnets within the front shell 138 to turn on the charger 134. For example, when the activation switch is a Hall effect sensor, as the charger 134 is secured in position, the magnet activates the Hall effect sensor, allowing the charger to begin to charge the batteries of the oral irrigator.

Figure 22:
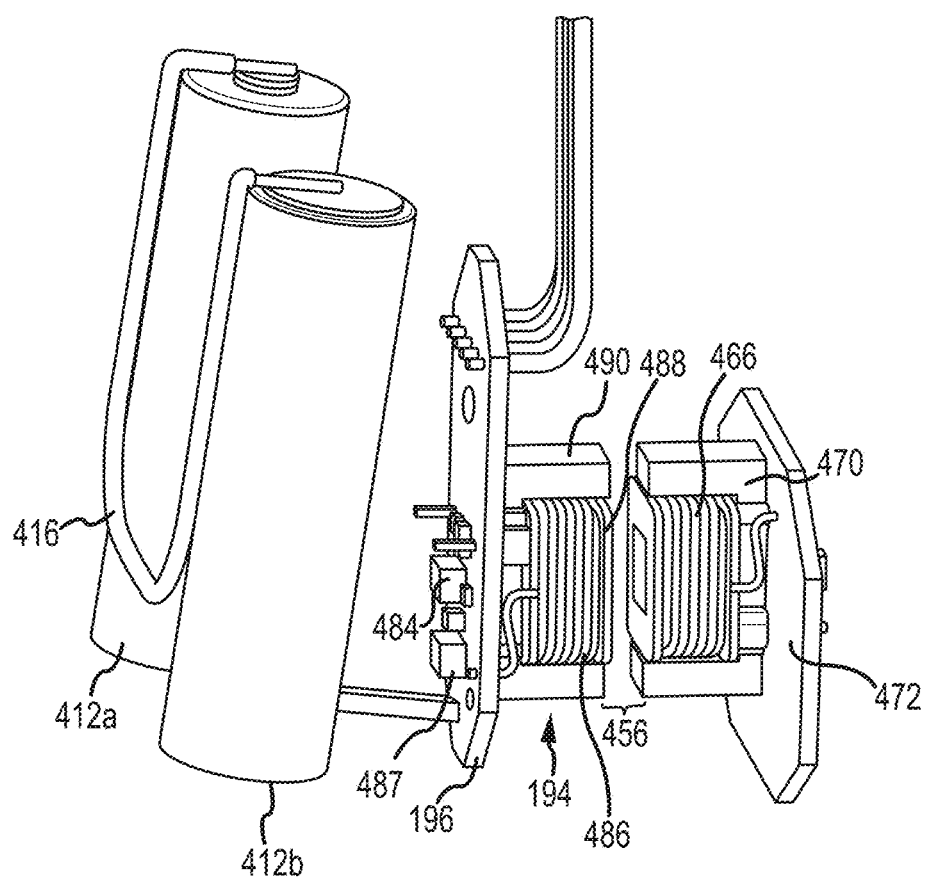
FIG. 22 is an isometric view of the charging unit connected to the oral irrigator with select components removed for clarity.

Once the charger 134 is connected to the oral irrigator 100, the user may connect the power cord 136 to an electrical source, such as a wall outlet, battery, or the like. Once connected to a power source, the charger 134 causes a current to be induced in the coil assembly 194 of the oral irrigator. FIG. 22 is a simplified diagram illustrating the operation of the charger 134. With reference to FIG. 22, during charging, current is transmitted from the power cord 136 of the charger 134 to the primary coil assembly 478 via the circuit board 472 and wire 474. Current moves through the primary coil 466, which creates a magnetic field due to the core 470. As the two coil assemblies 194, 478 for the oral irrigator 100 and charger 134 are separated by a small gap 456 (defined by the thickness of the front shell 138 and the charger housing 454); the magnetic field generated by the primary coil assembly 478 induces a current in the secondary coil 486 of the secondary coil assembly 194. The current induced in the secondary coil 486 is then transmitted to the batteries 412a, 412b to charge the battery pack.

As discussed above, due to the twisted copper wire configuration of the coils 466, 486 the charge currents generated are larger as compared to conventional inductive charging devices. This allows the oral irrigator 100 to charge more quickly than conventional inductive devices. Additionally, the multiple wires reduce heat generated by the coils during charging, which reduces the risk of damage to other components of the oral irrigator 100, such as the shell 138, housings, etc., and helps to prevent the outer surfaces of the oral irrigator 100 from becoming heated, which could present a risk to a user.

Further, the cooling grooves 462a, 462b allow airflow to flow between the charger 134 and the outer surface of the oral irrigator 100, even when the charger 134 is connected to the irrigator 100. The cooling grooves 462a, 462b may be spaced around the primary coil assembly 478 to allow heat dissipation from the coil assembly 478 during charging. The heat dissipation provided by the cooling grooves 462a, 462b helps to cool the coil 478 and helps to prevent the heat generated during charging from damaging other components, such as the charger housing 454 and/or oral irrigator housing. This allows the charger housing 454 to be made out of plastics or other similar materials as the risk of melting or other damage is minimized by the cooling grooves 462a, 462b.

With continued reference to FIG. 22, during charging, the microprocessor 484 or microcontroller (or other processing element), which may be on the main circuit board 204 and/or the circuit board 196, may monitor the status of the batteries 412a, 412b. When the voltage (or other characteristic, e.g., a "battery full signal") sensed by the microprocessor 484 drops below a predetermined threshold, the microprocessor 484 may determine that the batteries 412a, 412b are charged to a desired percentage. The microprocessor 484 may then deactivate the charger to preserve energy. For example, the microprocessor 484 may send a signal to the charger 134 to indicate that the connection to the power supply should be deactivated. By deactivating the charging process when the batteries have been fully charged, the lifespan of the batteries 412a, 412b may be increased. For example, in some instances the batteries 412a, 412b may be nickel metal hydride (NiMH) batteries 412a, 412b and overcharging the batteries once they have reached capacity may reduce the life span. Because the charging system of the oral irrigator 100 may monitor the charging capacity of the batteries during charging, and deactivate the charging when capacity is reached, the batteries 412a, 412b may have an increased life span as compared to conventional batteries. Further, because the charging system terminates charging when capacity is reached, the charging system is more energy efficient.

Slide Latch for the Removable Reservoir

Figure 26:
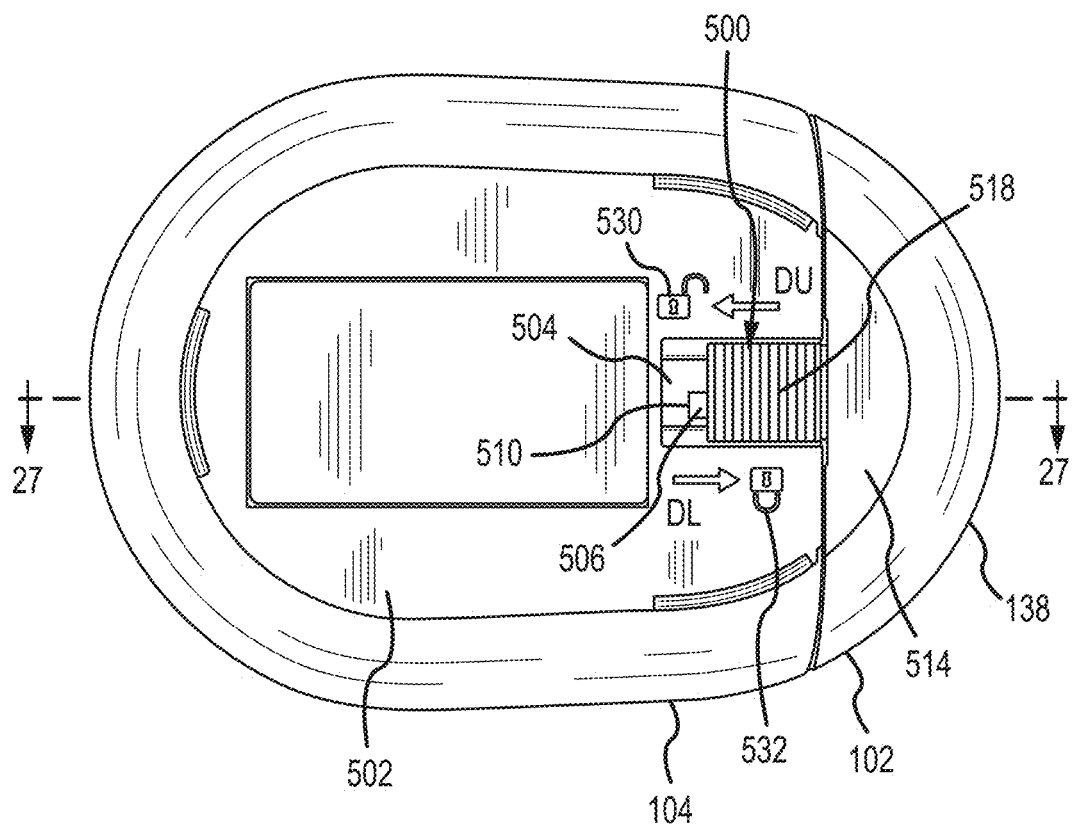
FIG. 26 is bottom plan view of the oral irrigator of FIG. 1 including a slide latch.
Figure 27:
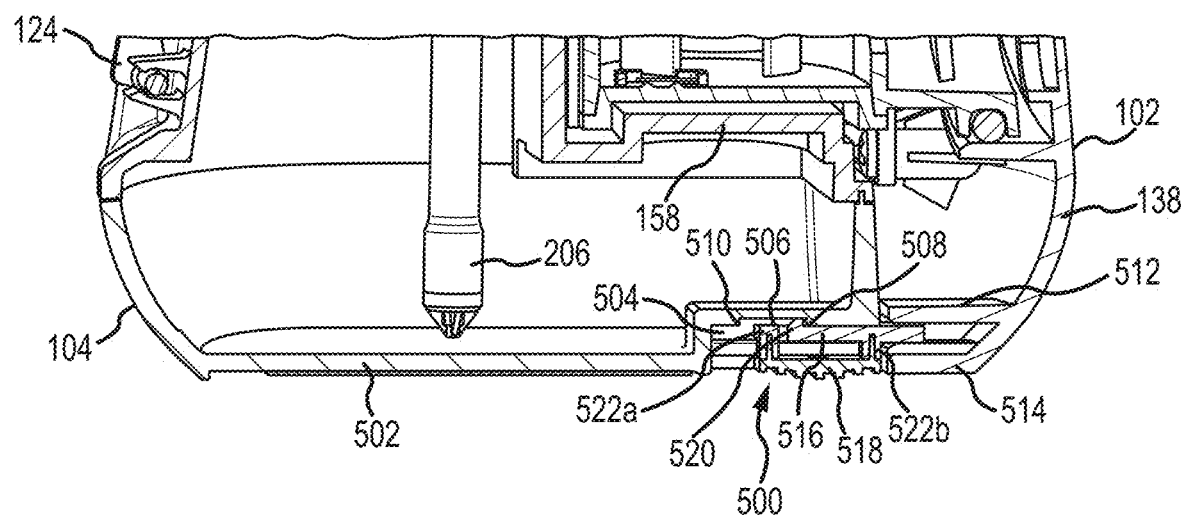
FIG. 27 is an enlarged cross-section view of the oral irrigator of FIG. 26 taken along line 27-27 in FIG. 26.
Figure 28:
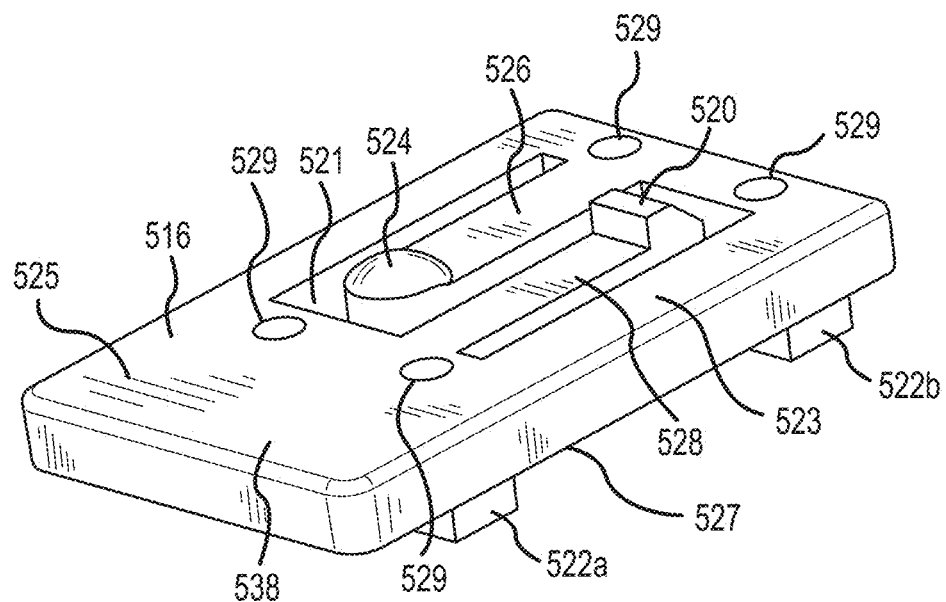
FIG. 28 is an isometric view of a latch for the slide latch of FIG. 26.

As discussed above, in some embodiments, the reservoir 104 may be removable from the body 102. In these embodiments, the oral irrigator 100 may include a latching system to selectively secure and release the reservoir 104 from the body 102. FIGS. 26-28 illustrate a slide latch for the oral irrigator. With reference to FIGS. 26-28 in this embodiment, a latch assembly 500 may include a latch 516 and a button 518 connected thereto. The latch assembly 500 is connected to reservoir 104 and assists in securing the reservoir 104 to the body 102.

With reference to FIG. 28, the latch 516 may be formed as a latch body 538 that defines a void area 521 surrounded by a perimeter 523. A first finger 526 and a second finger 528 may each extend from the perimeter 523 into the void area 521 parallel to each other. The two fingers 526, 528 are connected on one end to the latch body 538 and are free on the opposite end so that the fingers 526, 528 are flexible relative to the latch body 538. The two fingers 526, 528 may be secured on opposite ends relative to each other so that the secured end of the first finger 526 is adjacent to the free end of the second finger 528 and vice versa. Each of the fingers 526, 528 may include a securing element on their respective free ends. For example, the first finger 526 may include a nub 524 formed on its free end and the second finger 528 may include a tang 520 formed on its free end. The two securing elements may be oriented so as to extend upwards from a top surface 525 of the latch 516.

With reference to FIGS. 27 and 28, the latch 516 may also include two pegs 522a, 522b extending from a bottom surface 527 of the latch body 538. The pegs 522a, 522b may be parallel to each and extend from the latch body 538 so as to border the ends of the fingers 526, 528 on the bottom surface 527. The button 518 of the latch assembly 500 may be connected to the latch 516 via the pegs 522a, 522b. For example, the pegs 522a, 522b may include apertures 529 defined therein may extend through the latch body 538 to the top surface 525 and that may be configured to receive corresponding pegs on the button 518. This may allow the button 518 to be removable from the latch 516. However, in other embodiments, the latch 516 and the button 518 may be formed as an integral, single component or be permanently connected to one another.

Figure 29:
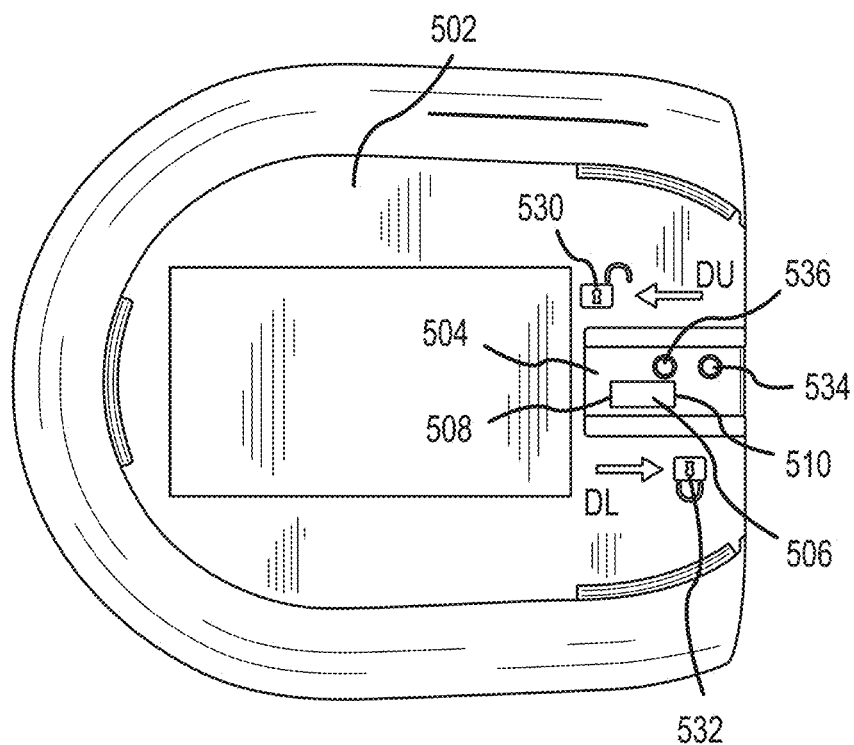
FIG. 29 is a bottom plan view of the reservoir for the oral irrigator of FIG. 26.

With reference to FIG. 29, in embodiments including the latch assembly 500, the reservoir 104 may include a latch cavity 504 or recess defined on a bottom surface 502. The latch cavity 504 may include a track 506 for the latch 516, the track 506 including a first end and a second end forming a first stop 508 and a second stop 510, respectively. The latch cavity 504 may also include a first detent 534 and a second detent 536 aligned adjacent to and set off from the track 506. The bottom surface 502 of the reservoir 104 may also include an unlock icon 530 and a lock icon 532 painted, molded, etched, or otherwise formed in the bottom surface 502. Alternatively, the icons may be attached via adhesive or the like (e.g., as a decal or sticker). The unlock icon 530 corresponds to a position of the latch 516 where the reservoir 104 is removable from the body 102 and the lock icon 532 corresponds to a position of the latch 516 where the reservoir 104 is secured to the body 102.

With reference to FIGS. 26-29, the latch assembly 500 may be connected to the reservoir 104 and body 102 so that the latch 516 is arranged in the latch cavity 504 with the first finger 526 being aligned with the first and second detents 534, 536 and the second finger 528 being aligned with the track 506. The tang 520 is positioned between the first stop 508 and the second stop 510 within the track 506 and the nub 524 is positioned within one of the detents 534, 536. The button 518 is connected so as to face away from the bottom surface 502 of the reservoir 104.

Operation of the latch assembly 500 will now be discussed in more detail. With continued reference to FIGS. 26-29, in the locked position, the latch 516 may be positioned so that a first end of the button 518 abuts against the body 102 and the latch body 538 extends between a first shelf 512 and a bottom surface 514 of the front shell 138 of the body 102. The first shelf 512 and the bottom surface 514 act to sandwich the latch 516 therebetween and prevent vertical movement of the latch 516. This restraint assists in securing the reservoir 104 to the body 102. The reservoir 104 may be restrained from lateral movement by the flange 171 that seals against the interior surface of the front shell 138. Thus, when in the locked position, the latch assembly 500 helps to prevent the reservoir 104 from being removed from the body 102.

To unlock the reservoir 104, a user slides the button 518 in the DU direction towards the unlock icon 530. As the button 518 slides, the latch 516 moves correspondingly, and the first finger 526 flexes downward and the nub 524 disengages from the first detent 534 and slides towards the second detent 536, flexing upwards to seat the nub 524 in the second detent 536. At the same time, the second finger 528 moves within the track 506 and the tang 520 moves from abutting against the second stop 510 to abutting against the first stop 508. Once the tang 520 abuts against the first stop 508 and the nub 524 is seated in the second detent 536, the latch 516 is positioned in the unlock position and adjacent the unlock icon 530. This lateral movement of the latch 516 within the latch cavity 504 locates the latch 516 so that the latch 516 is no longer positioned between the first shelf 512 and the bottom surface 514 of the front shell 138. With the latch 516 disengaged from the front shell 138, a user may move the reservoir 104 vertically downwards away from the body 102 and front shell 138, disconnecting the flange 171 of the reservoir 104 from its sealed position, allowing the reservoir 104 to be removed.

To secure the reservoir 104 back to the body 102, the reservoir 104 flange 171 is repositioned within the body 102 and the bottom surface 502 of the reservoir 104 is aligned with the bottom surface 514 of the front shell 138. Once aligned, the user slides the button 518 in the lock direction DL towards the lock icon 532. As the button 518 moves laterally, the latch 516 moves correspondingly and seats between the first shelf 512 and the bottom surface 514 and the fingers 526, 528 move to the locked positions, with the nub 524 seated in the first detent 534 and the tang 520 positioned adjacent the second stop 510. In these embodiments, the tang 520 and nub 524 provide haptic and audible feedback to a user to indicate that the latch 516 has moved to the unlocked or locked positions.

It should be noted that in embodiments where the reservoir 104 is removable from the body 102, other latching or securing mechanisms may be used as well. For example, a spring latch including a molded integral spring body may be used. The type of latch or securing assembly may be varied based on the shape and configuration of the reservoir and body.

Battery Venting

Figure 30A:
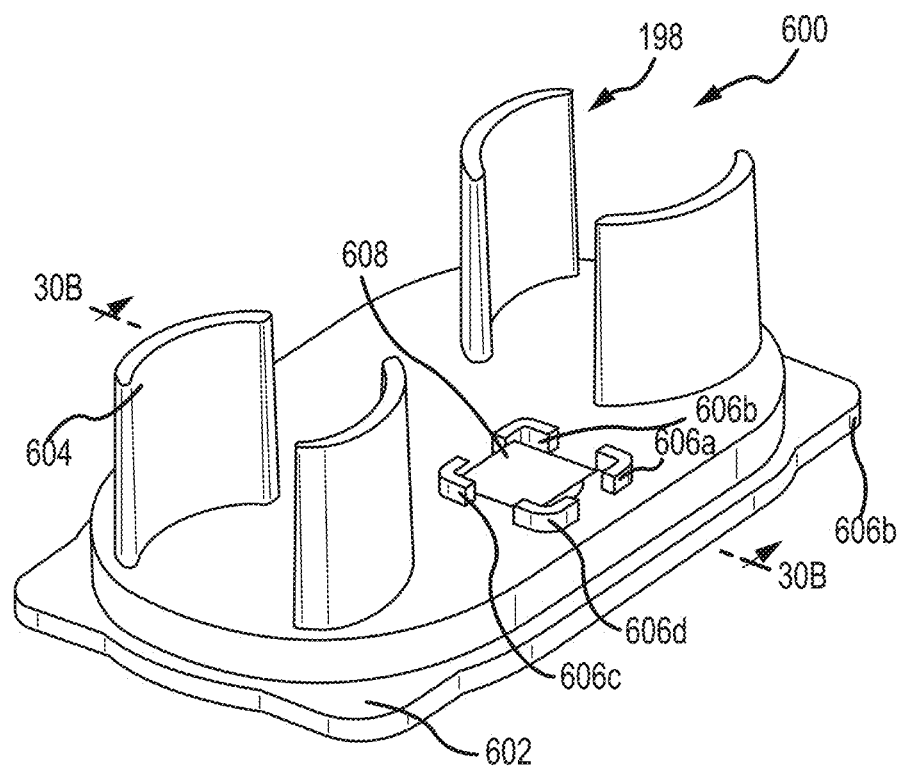
FIG. 30A is a top isometric view of a venting assembly for the battery compartment.
Figure 30B:
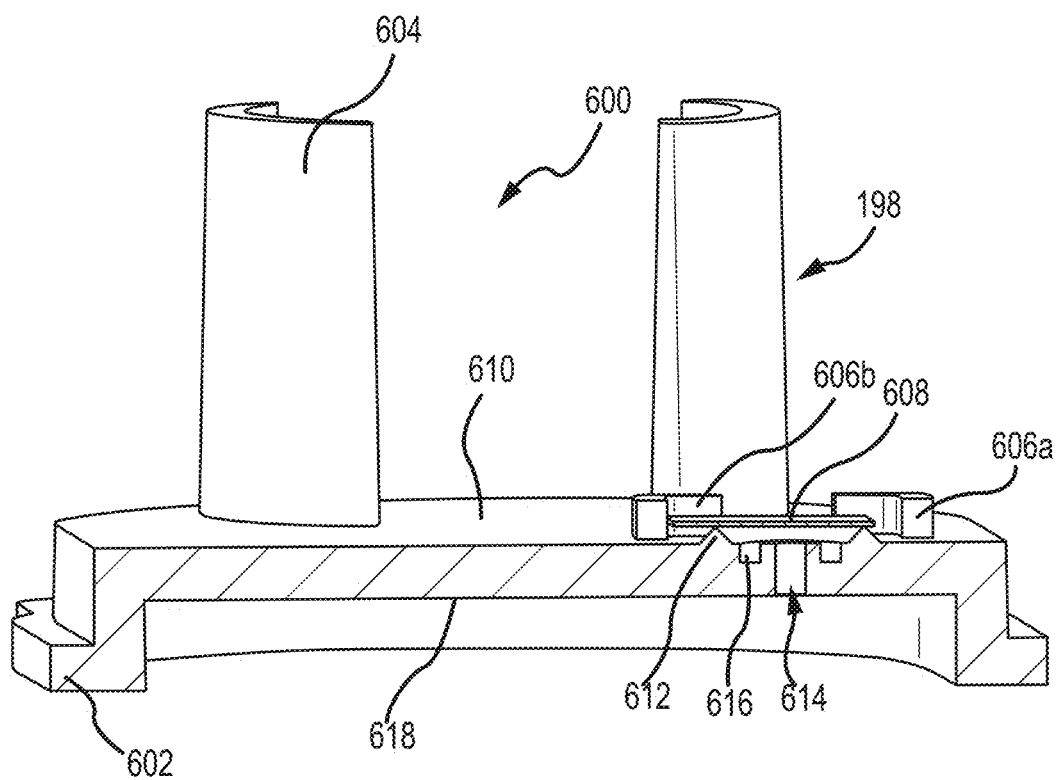
FIG. 30B is a cross-sectional view of the venting assembly of FIG. 30A taken along line 30B-30B in FIG. 30A.

In some embodiments, the oral irrigator includes a venting assembly for the battery compartment. FIGS. 30A and 30B illustrate various views of the venting assembly. With reference to FIGS. 30A and 30B, the venting assembly 600 is formed as a part of the battery cap 198 and includes a vent 608 that attaches to the battery cap 198. As will be discussed below, the vent 608 provides mitigation for battery outgassing and will equalize the pressure within the battery compartment. Depending on the configuration of the oral irrigator and batteries, the vent assembly 600 may be positioned on a number of different walls of the battery compartment. However, in the embodiment shown in FIGS. 30A and 30B, the venting assembly 600 is formed as part of the battery cap 198.

With reference to FIGS. 30A and 30B, the battery cap 198 in this example includes one or more battery stabilizing walls 604 extending upwards from a top surface 610 of the cap base 602. The stabilizing walls 604 may be shaped so as to match the diameter and shape of the batteries and may be modified depending on the configuration and desired stabilization of the batteries. The top surface 610 of the cap base 602 may be raised or elevated relative to the edge of the base 602, which allows the reservoir to have an increased capacity as discussed above. The top surface 610 may also include a plurality of positioning brackets 606a, 606b, 606c, 606d that are used to position the vent 608 on the battery cap 198. The positioning brackets 606a, 606b, 606c, 606d may be substantially any type of configuration, but in one embodiment are L or U shaped brackets having rounded corners. The positioning brackets 606a, 606b, 606c, 606d may be spaced apart from one another and are typically configured so that the vent 608 can be positioned within a space defined between each of the brackets 606a, 606b, 606c, 606d.

With reference to FIG. 30B, the battery cap 198 also includes a venting aperture 614 defined through the top surface 610 of the cap base 602. The venting aperture 614 is positioned in generally a central region between each of the positioning brackets 606a, 606b, 606c, 606d. The venting aperture 614 has a diameter selected to allow proper venting for the battery cavity and may be determined based on the size, number, and type of batteries used for the oral irrigator 100.

With continued reference to FIG. 30B, in some embodiments, the venting assembly 600 may also include an attachment protrusion 612 extending upwards from the top surface 610. The attachment protrusion 612 may surround the venting aperture 614 but be spaced apart therefrom by a groove 616 concentric with the venting aperture 614. The attachment protrusion 612 is used to form a seal with the vent 608 as will be discussed in more detail below.

The vent 608 is positioned over the venting aperture 614 and is a material impermeable to fluids, but allows gases and air to pass therethrough. For example, the vent 608 may be a laminated product of porous polytetrafluoroethylene (PTFE) or porous ultra-high-molecular-weight polyethylene (UHMW-PE), such as DeWAL 235ep by DeWal Industries. The vent 608 is sized and shaped so as to cover the vent aperture 614 and may be varied as desired.

With reference to FIGS. 30A and 30B, the connection of the venting assembly 600 will now be discussed in more detail. The vent 608 is positioned between the positioning brackets 606a, 606b, 606c, 606d and over the vent aperture 614 and the attachment protrusion 612. The vent 608 typically may be centered over the vent aperture 614, but as long as the vent 608 is positioned so as to completely cover the vent aperture 614 and the attachment protrusion 612, it does not need to be centered (e.g., as shown in FIG. 30A). Once the vent 608 is aligned with the venting aperture 614 and the attachment protrusion 612, the vent 608 is attached to the battery cap 198. For example, a heat staking process may be used that heats the vent 608 and the battery cap 198 so that the material forming the attachment protrusion 612 melts to the vent 608 material and fuses therewith. As the material from the attachment protrusion 612 melts to the battery cap 198, a seal is formed around the venting aperture 614, which acts to prevent liquids from entering in or exiting the battery compartment via the venting aperture 614, as well as secures the vent 608 to the battery cap 198. After the vent 608 is attached to the battery cap 198, the battery cap 198 is connected to the oral irrigator as discussed above.

In operation, the venting assembly 600, in particular the vent 608 and venting aperture 614 allow gasses, such as gases due to outgassing from the batteries, to pass through the battery cap 198 and exit the battery compartment. This allows the pressure within the battery compartment and other locations within the dry compartments to be equalized with ambient pressure. This equalization feature helps to prevent the sealing features, such as the diaphragm seal 274, from being damaged due to variations in air pressure (e.g., shipping the product from a low altitude to a high altitude).

CONCLUSION

As discussed above, the oral irrigator of the present disclosure may be waterproof and be able to be immersed within 1 meter of water without damage to the internal components. Further, internal leakage, such as leakage from the pump, may be sealed from reaching any electronic components. In some embodiments, the oral irrigator may also include a waterproofing spray, such as a super-hydrophobic coating, on certain electronic components, such as the batteries, circuit boards, and so on. In these embodiments, the coating may repel water and some fluids and thus further help to prevent damage to the electronic components due to fluid.

It should be noted that any of the features in the various examples and embodiments provided herein may be interchangeable and/or replaceable with any other example or embodiment. As such, the discussion of any component or element with respect to a particular example or embodiment is meant as illustrative only. It should be noted that although the various examples discussed herein have been discussed with respect to oral irrigators, the devices and techniques may be applied in a variety of applications, such as, but not limited to, toothbrushes, bath appliances, or the like.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the invention, and do not create limitations, particularly as to the position, orientation, or use of the invention unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In some instances, components are described by reference to "ends" having a particular characteristic and/or being connected with another part. However, those skilled in the art will recognize that the present invention is not limited to components which terminate immediately beyond their point of connection with other parts. Thus the term "end" should be broadly interpreted, in a manner that includes areas adjacent rearward, forward of or otherwise near the terminus of a particular element, link, component, part, member or the like. In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

We claim:

1. An oral irrigator comprising:
   a handle fluidly connected to a reservoir; and
   a tip latch assembly connected to the handle comprising
      a latch comprising:
         an integrally formed biasing structure;
         a first engagement arm extending from a first end of the biasing structure;
         a second engagement arm extending from a second end of the biasing structure; and
         at least one prong selectively movable from an engaged position to a disengaged position; and
      a tip release button engaging at least one surface of the latch;
   wherein a force on the tip release button causes the tip release button to exert a force against the at least one surface of the latch, overcoming a biasing force exerted by the biasing structure and causing the first engagement arm and the second engagement arm to pivot away from one another and the at least one prong to move from the engaged position to the disengaged position; and
      when the force is removed from the tip release button, the biasing structure exerts the biasing force on the tip release button as the at least one prong moves from the disengaged position back to the engaged position.

2. The oral irrigator of claim 1, wherein the latch comprises the first engagement arm is integrally formed with and extends directly from the first end of the biasing structure and the second engagement arm is integrally formed with and extends directly from the second end of the biasing structure.

3. The oral irrigator of claim 1, wherein the at least one prong comprises a first prong extending from the first engagement arm and a second prong extending from the second engagement arm.

4. The oral irrigator of claim 1, wherein when the force is removed from the tip release button, the first engagement arm and the second engagement pivot towards one another.

5. The oral irrigator of claim 1, wherein the tip latch assembly further comprises a first post secured in position relative to the handle and a second post secured in position relative to the handle, wherein the first engagement arm pivots about the first post and the second engagement arm pivots about the second post.

6. The oral irrigator of claim 1, wherein the latch is a single part.

7. A waterproof oral irrigator comprising:
   a body comprising a front shell and a rear shell connected together to define a housing cavity;
   an interior housing received within the housing cavity comprising a first sealing flange extending from an outer surface thereof;
   a control assembly connected to an outer surface of the interior housing and positioned between an interior surface of the rear shell and the interior housing; and
   a first sealing member connected to the front shell and the interior housing and surrounds the control assembly; wherein
   the first sealing flange extends around the control assembly to define a control assembly cavity within the housing cavity, wherein the control assembly cavity is separated from other portions of the housing cavity.

8. The waterproof oral irrigator of claim 7, wherein:
   the interior housing comprises a first sealing flange extending from the outer surface, wherein the control assembly is surrounded by the first sealing flange and the first sealing member is positioned around the first sealing flange; and
   the front shell comprises a first sealing feature extending from the interior surface; wherein the first sealing feature fits around the first sealing flange and the first sealing member to define a first waterproof compartment including the control assembly cavity.

9. The waterproof oral irrigator of claim 8, wherein the interior housing comprises an upper housing and a lower housing, wherein the first sealing flange extends from an outer surface of the upper housing.

10. A waterproof oral irrigator comprising:
    a body comprising a front shell and a rear shell connected together to define a cavity, wherein the front shell comprises a first sealing feature and a second sealing feature extending from an interior surface of the front shell;
an interior housing received within the cavity, the interior housing comprises:
an upper housing;
a lower housing;
a first sealing flange extending from an outer surface of the upper housing; and
a second sealing flange extending from an outer surface of the lower housing and positioned below the first sealing flange;
a control assembly connected to an outer surface of the interior housing and positioned between an interior surface of the rear shell and the interior housing;
a first sealing member connected to the front shell and the interior housing that surrounds the control assembly;
a second sealing member positioned around the second sealing flange; wherein
the control assembly is surrounded by the first sealing flange;
the first sealing member is positioned around the first sealing flange;
the first sealing feature fits around the first sealing flange and the first sealing member to define a first waterproof compartment; and
the second sealing feature fits over the second sealing flange and the second sealing member to define a second waterproof compartment.

11. The waterproof oral irrigator of claim 10, further comprising:
a cap seal connected to an interior surface of the interior housing; and
a battery cap connected to a bottom end of the interior housing and positioned within the cavity defined by the body;
wherein the cap seal, the battery cap, and the interior housing define a third waterproof compartment.

12. The waterproof oral irrigator of claim 11, further comprising a vent coupled to the battery cap, wherein the vent allows gasses to pass therethrough.

13. An oral irrigation assembly comprising:
an oral irrigator comprising
a housing comprising a bottom wall and a sidewall extending vertically from the bottom wall;
at least one rechargeable battery received within the housing; and
at least one housing magnet connected to the sidewall of the housing; and
a charging unit selectively connectable to the sidewall of the oral irrigator and configured to provide a charge to the at least one rechargeable battery, the charging unit comprising
at least one charger magnet connected to the charging unit;
wherein the at least one housing magnet and the at least one charger magnet cooperate to removably connect the charging unit to the sidewall of the oral irrigator.

14. The oral irrigation assembly of claim 13, wherein:
the oral irrigator comprises a secondary charging coil; and
the charging unit comprises a primary charging coil, wherein at least one of the secondary charging coil or the primary charging coil include a plurality of twisted copper wires.

15. The oral irrigation assembly of claim 13, wherein the charging unit is made of plastics or other low-heat resistant products.

16. The oral irrigation assembly of claim 13, wherein the charging unit includes a plurality of cooling grooves defined in a side of a housing of the charger unit.

17. The oral irrigation assembly of claim 13, wherein the charging unit generally conforms to the shape of the oral irrigator body.

18. The oral irrigation assembly of claim 13, wherein the at least one housing magnet and the at least one charger magnet cooperate to suspend the charging unit above the bottom wall of the housing.

* * * * *